(12) United States Patent
Keesling Contreras et al.

(10) Patent No.: US 12,051,520 B2
(45) Date of Patent: Jul. 30, 2024

(54) NEUTRAL ATOM QUANTUM INFORMATION PROCESSOR

(71) Applicants: President and Fellows of Harvard College, Cambridge, MA (US); Massachusetts Institute of Technology, Cambridge, MA (US); California Institute of Technology, Pasadena, CA (US)

(72) Inventors: Alexander Keesling Contreras, Cambridge, MA (US); Hannes Bernien, Somerville, MA (US); Sylvain Schwartz, Somerville, MA (US); Harry Jay Levine, Cambridge, MA (US); Ahmed Omran, Somerville, MA (US); Mikhail D. Lukin, Cambridge, MA (US); Vladan Vuletic, Cambridge, MA (US); Manuel Endres, Padaena, CA (US); Markus Greiner, Belmont, MA (US); Hannes Pichler, Tyrol Innsbruck (AT); Leo Zhou, Somerville, MA (US); Shengtao Wang, Somerville, MA (US); Soonwon Choi, El Cerrito, CA (US); Donggyu Kim, Arlington, MA (US); Alexander S. Zibrov, Cambridge, MA (US)

(73) Assignees: President and Fellows of Harvard College, Cambridge, MA (US); California Institute of Technology, Pasadena, CA (US); Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/205,758

(22) Filed: Jun. 5, 2023

(65) Prior Publication Data
US 2023/0326623 A1    Oct. 12, 2023

Related U.S. Application Data

(63) Continuation of application No. 17/830,609, filed on Jun. 2, 2022, now Pat. No. 11,710,579, which is a
(Continued)

(51) Int. Cl.
*G21K 1/06*      (2006.01)
*G02F 1/33*      (2006.01)
(Continued)

(52) U.S. Cl.
CPC .................. *G21K 1/06* (2013.01); *G02F 1/33* (2013.01); *G06N 10/00* (2019.01); *G21K 1/006* (2013.01);
(Continued)

(58) Field of Classification Search
CPC .......... G21K 1/06; G21K 1/006; G21K 1/093; G21K 2201/062; G02F 1/33; G02F 1/11;
(Continued)

(56) References Cited

U.S. PATENT DOCUMENTS

| | | |
|---|---|---|
| 3,872,470 A | 3/1975 | Hoerz et al. |
| 4,479,199 A | 10/1984 | Friedlander et al. |

(Continued)

FOREIGN PATENT DOCUMENTS

| | | |
|---|---|---|
| CN | 106980178 A | 7/2017 |
| EP | 3113084 A1 | 1/2017 |

(Continued)

OTHER PUBLICATIONS

Adachi et al., "Application of Quantum Annealing to Training of Deep Neural Networks," arXiv.org: 18 pages (2015).
(Continued)

*Primary Examiner* — Ajay Ojha
(74) *Attorney, Agent, or Firm* — FOLEY HOAG LLP

(57) ABSTRACT

Systems and methods relate to arranging atoms into 1D and/or 2D arrays; exciting the atoms into Rydberg states and evolving the array of atoms, for example, using laser manipulation techniques and high-fidelity laser systems
(Continued)

described herein; and observing the resulting final state. In addition, refinements can be made, such as providing high fidelity and coherent control of the assembled array of atoms. Exemplary problems can be solved using the systems and methods for arrangement and control of atoms.

8 Claims, 56 Drawing Sheets

Related U.S. Application Data continuation of application No. 16/630,719, filed as application No. PCT/US2018/042080 on Jul. 13, 2018, now Pat. No. 11,380,455.

(60) Provisional application No. 62/589,716, filed on Nov. 22, 2017, provisional application No. 62/531,993, filed on Jul. 13, 2017.

(51) Int. Cl.
   G06N 10/00 (2022.01)
   G21K 1/00 (2006.01)
   G21K 1/093 (2006.01)
   B82Y 10/00 (2011.01)

(52) U.S. Cl.
   CPC ............. *G21K 1/093* (2013.01); *B82Y 10/00* (2013.01); *G21K 2201/062* (2013.01)

(58) Field of Classification Search
   CPC ........ G06N 10/00; B82Y 10/00; B82Y 40/00; G01K 1/02; G01K 1/06
   See application file for complete search history.

(56) References Cited

U.S. PATENT DOCUMENTS

| | | | |
|---|---|---|---|
| 5,684,621 A | 11/1997 | Downing | |
| 6,988,058 B1 | 1/2006 | Sherwin et al. | |
| 11,380,455 B2 | 7/2022 | Keesling Contreras et al. | |
| 11,710,579 B2 | 7/2023 | Keesling Contreras et al. | |
| 2002/0089718 A1 | 7/2002 | Penninckx et al. | |
| 2004/0000666 A1 | 1/2004 | Lidar et al. | |
| 2004/0017833 A1* | 1/2004 | Cundiff ................. H01S 3/1112 372/18 |
| 2004/0126114 A1 | 7/2004 | Liu et al. | |
| 2006/0225165 A1 | 10/2006 | Maassen van den Brink et al. | |
| 2007/0113012 A1 | 5/2007 | Cable et al. | |
| 2008/0116449 A1 | 5/2008 | Macready et al. | |
| 2008/0185576 A1 | 8/2008 | Hollenberg et al. | |
| 2008/0237579 A1 | 10/2008 | Barker et al. | |
| 2008/0313430 A1 | 12/2008 | Bunyk | |
| 2009/0204877 A1 | 8/2009 | Betts | |
| 2009/0299947 A1 | 12/2009 | Amin et al. | |
| 2011/0238607 A1 | 9/2011 | Coury et al. | |
| 2014/0025926 A1 | 1/2014 | Yao et al. | |
| 2014/0200689 A1 | 7/2014 | Utsunomiya et al. | |
| 2014/0253987 A1 | 9/2014 | Christmas | |
| 2015/0317558 A1 | 11/2015 | Adachi et al. | |
| 2016/0064108 A1 | 3/2016 | Saffman et al. | |
| 2016/0125311 A1 | 5/2016 | Fuechsle et al. | |
| 2016/0328253 A1 | 11/2016 | Majumdar | |
| 2017/0300817 A1 | 10/2017 | King et al. | |
| 2018/0217629 A1 | 8/2018 | Macfaden | |
| 2018/0218279 A1 | 8/2018 | Lechner et al. | |
| 2018/0260731 A1 | 9/2018 | Zeng et al. | |
| 2019/0266508 A1 | 8/2019 | Bunyk et al. | |
| 2020/0185120 A1 | 6/2020 | Keesling Contreras et al. | |
| 2021/0279631 A1* | 9/2021 | Pichler ................... G06N 10/60 |
| 2021/0365827 A1 | 11/2021 | Monroe et al. | |
| 2021/0383189 A1 | 12/2021 | Cong et al. | |
| 2022/0060668 A1 | 2/2022 | Kim et al. | |
| 2022/0197102 A1 | 6/2022 | Christen et al. | |
| 2022/0293293 A1 | 9/2022 | Contreras et al. | |
| 2022/0391743 A1 | 12/2022 | Wild et al. | |
| 2023/0400492 A1 | 12/2023 | Xu et al. | |
| 2024/0029911 A1 | 1/2024 | Lukin et al. | |

FOREIGN PATENT DOCUMENTS

| | | | |
|---|---|---|---|
| EP | 3438726 A1 | 2/2019 | |
| GB | 0205011 A | 10/1923 | |
| JP | 2007/233041 A | 9/2007 | |
| JP | 2008/134450 A | 6/2008 | |
| JP | 2008/158325 A | 7/2008 | |
| JP | 2014-197733 A | 10/2014 | |
| JP | 2017/078832 A | 4/2017 | |
| WO | WO-2014/051886 A1 | 4/2014 | |
| WO | WO-2019/014589 A1 | 1/2019 | |
| WO | WO-2020/072981 A1 | 4/2020 | |
| WO | WO-2020/172588 A1 | 8/2020 | |
| WO | WO-2020/236574 A1 | 11/2020 | |
| WO | WO-2021/007560 A1 | 1/2021 | |
| WO | WO-2021/141918 A1 | 7/2021 | |
| WO | WO-2022/132388 A2 | 6/2022 | |
| WO | WO-2022/132389 A2 | 6/2022 | |
| WO | WO-2022/174072 A1 | 8/2022 | |
| WO | WO-2022/132388 A3 | 9/2022 | |
| WO | WO-2022/132389 A3 | 9/2022 | |
| WO | WO-2023/287503 A2 | 1/2023 | |
| WO | WO-2023/287503 A3 | 1/2023 | |
| WO | WO-2023/287503 A9 | 1/2023 | |
| WO | WO-2023/080936 A2 | 5/2023 | |
| WO | WO-2023/080936 A3 | 7/2023 | |
| WO | WO-2023/132865 | 7/2023 | |
| WO | WO-2023/132865 A2 | 7/2023 | |

OTHER PUBLICATIONS

Aliferis et al., "Computation by measurements: A unifying picture," Arxiv: 13 pages (2004).
Anonymous., "Magneto-optical trap," Wikipedia, retrieved online <https://web.archive.org/web/20210125084412/https://en.wikipedia.org/wiki/Magneto-optical_trap>: 7 pages (2022).
Auger et al., "Blueprint for fault-tolerant quantum computation with Rydberg atoms." Physical Review A 96(5): 052320 (2017).
Barredo et al., "An atom-by-atom assembler of defect-free arbitrary 2d atomic arrays," arXiv:1607.03042, Jul. 11, 2016, pp. 1-7.
Barredo et al., "An atom-by-atom assembler of defect-free arbitrary two-dimensional atomic arrays," Science, 354(6315): 1021-1023 (2016).
Barredo et al., "Synthetic three-dimensional atomic structures assembled atom by atom," Nature, 561: 79-82 (2018).
Baur et al., "Single-Photon Switch Based on Rydberg Blockade," Phys. Rev. Lett., 112: 073901 (2014).
Beugnon et al., "Two-dimensional transport and transfer of a single atomic qubit in optical tweezers" Nature Physics, vol. 3, p. 1-4 (2007).
Brion et al., "Quantum Computing with Collective Ensembles of Multilevel Systems," Phys. Rev. Lett., 99: 260501 (2007).
Browaeys et al., "Many-body physics with individually controlled Rydberg atoms," Nature Physics, 16: 132-142 (2020).
Bruzewicz et al., "Trapped-Ion Quantum Computing: Progress and Challenges," Applied Physics Reviews, 6(2): 021314 (2019).
Chao et al., "Fault-tolerant quantum computation with few qubits." npj Quantum Information 4.1 (2018): 42.
Cong et al., "Hardware-efficient, fault-tolerant quantum computation with Rydberg atoms", Physical Review X 12(2): 021049 (2022).
Cong et al., "Quantum convolutional neural networks" Nature Physics, vol. 15, p. 1273-78 (2019).
Couvert et al., "Optimal transport of ultracold atoms in the non-adiabatic regime" Europhysics Letters, 83: 5 pages (2008).
Debnath et al., "Demonstration of a small programmable quantum computer with atomic qubits," Nature, 536(7614): 63-66 (2016).
Dordevic et al., "Entanglement transport and a nanophotonic interface for atoms in optical tweezers" arXiv: 16 pages (2021).

(56) References Cited

OTHER PUBLICATIONS

Ebert et al., "Coherence and Rydberg Blockade of Atomic Ensemble Qubits," Phys. Rev. Lett., 115: 093601 (2015).
Endres et al., "Atom-by-atom assembly of defect-free one-dimensional cold atom arrays," Science, 354 (6315): 1024-1027 (2016).
Endres et al., "Cold Matter Assembled Atom-by-Atom," arXiv: 1607.03044, Jul. 11, 2016, pp. 1-12.
Engstrom et al., "Calibration of spatial light modulators suffering from spatially varying phase response," Optics Express, 21(13): 16086-16103 (2013).
Extended European Search Report for EP Application No. 19854402.5 dated May 9, 2022.
Extended European Search Report for EP Application No. 19868908.5 dated Jun. 13, 2022.
Extended European Search Report for EP Application No. EP 18831504 mailed Mar. 30, 2021.
Farhi et al., "Classification with Quantum Neural Networks on Near Term Processors," arXiv:1802.06002, 1-21 (2018).
Fienup., "Phase retrieval algorithms: a comparison," Applied Optics 21(15): 2758-2769 (1982).
Fowler et al., "Surface code quantum communication" arXiv, pp. 1-4 (2010).
Fowler et al., "Surface codes: Towards practical large-scale quantum computation," Phys. Rev. A, 86: 032324 (2012).
Fowler et al., "Surface Codes: Towards practical large-scale quantum computation" Physical Review, vol. 86 (3), p. 1-54 (2012).
Gerchberg et al., "A Practical Algorithm for the Determination of Phase from Image and Diffraction Plane Pictures," Optik, 35(2): 237-246 (1972).
Gorniaczyk et al., "Single-Photon Transistor Mediated by Interstate Rydberg Interactions," Phys. Rev. Lett., 113: 053601 (2014).
Graham et al., "Demonstration of multi-qubit entanglement and algorithms on a programmable neutral atom quantum computer" arXiv, p. 1-25 (2022).
Grant et al., "Hierarchical quantum classifiers" Arxiv, p. 1-16 (2018).
Gunter et al., "Interaction Enhanced Imaging of Individual Rydberg Atoms in Dense Gases," Phys. Rev. Lett., 108: 013002 (2012).
Gunter et al., "Observing the Dynamics of Dipole-Mediated Energy Transport by Interaction- Enhanced Imaging," Science, 342(6161): 954-956 (2013).
Haegeman et al., "Order Parameter for Symmetry-Protected Phases in One Dimension," Phys. Rev. Lett., 109(5): 050402-1-5 (2012).
Haldane, "Nonlinear Field Theory of Large-Spin Heisenberg Antiferromagnets: Semiclassically Quantized Solitons of the One-Dimensional Easy-Axis Neel State," Phys. Rev. Lett., 50(15): 1153-1156 (1983).
Hashizume et al., "Deterministic Fast Scrambling with Neutral Atom Arrays" Physical Review Letters, vol. 126: 14 pages (2021).
International Search Report and Written Opinion for Application No. PCT/US2021/060136 dated Aug. 11, 2022.
International Search Report and Written Opinion for Application No. PCT/US2022/039189 dated Aug. 4, 2023.
International Search Report and Written Opinion for International Application No. PCT/US18/42080 dated Oct. 22, 2018.
International Search Report and Written Opinion for International Application No. PCT/US2019/049115 dated Jan. 7, 2020.
International Search Report and Written Opinion for International Application No. PCT/US2019/054831 dated Feb. 6, 2020.
International Search Report and Written Opinion for International Application No. PCT/US2020/019309 dated Jul. 14, 2020.
International Search Report and Written Opinion for International Application No. PCT/US2020/033100 dated Sep. 2, 2020.
International Search Report and Written Opinion for International Application No. PCT/US2020/041709 dated Oct. 28, 2020.
International Search Report and Written Opinion for International Application No. PCT/US2021/012209 mailed May 3, 2021.
International Search Report and Written Opinion for International Application No. PCT/US2022/016173 dated May 24, 2022.
International Search Report and Written Opinion for International Application No. PCT/US2022/031297 dated Feb. 21, 2023.
International Search Report and Written Opinion of Application No. PCT/US2021/060138 dated Aug. 19, 2022.
Isenhower et al., "Demonstration of a neutral atom controlled-NOT quantum gate," arXiv:0907.5552, Nov. 24, 2009, pp. 1-5.
Jahromi et al., "Topological spin liquids in the ruby lattice with anisotropic Kitaev interactions," Physical Review B, 94(12): (10 pages) (2016).
Jahromi et al., "Topological $Z_2$ RVB quantum spin liquid on the ruby lattice," Physical Review B, 101(11): (10 pages) (2020).
Jaksch et al., "The cold atom Hubbard toolbox," Arxiv, (30 pages) (2004).
Johnson et al., "Rabi Oscillations between Ground and Rydberg States with Dipole-Dipole Atomic Interactions," Physical Review Letters, 110(11): 113003-1-4 (2008).
Kaufman et al., "Hong-Ou-Mandel atom interferometry in tunnel-coupled optical tweezers," arXiv:1312.7182, Jun. 17, 2014, pp. 1-17.
Kaufman et al., "Quantum thermalization through entanglement in an isolated many-body system" arXiv: 19 pages (2016).
Killoran et al., "Continuous-variable quantum neural networks" Arxiv, p. 1-21 (2018).
Kim and Swingle., "Robust entanglement renormalization on a noisy quantum computer" Arxiv, p. 1-17 (2017).
Labuhn et al., "Realizing quantum Ising models in tunable two-dimensional arrays of single Rydberg atoms" arXiv: 1-12 (2016).
Labuhn et al., "Tunable two-demensional arrays of single Rydberg atoms for realizing quantum Ising models," Nature, 534(7609): 667-670 (2016).
Lengwenus et al., "Coherent Transport of Atomic Quantum in a Scalable Shift Register" Physical Review Letters, 105: 4 pages (2010).
Leonardo et al., "Computer generation of optimal holograms for optical trap arrays," Optics Express, 15(4): 1913-1922 (2007).
Lester et al., "Rapid production of uniformly-filled arrays of neutral atoms," arXiv:1506.04419, Jun. 14, 2015, pp. 1-5.
Levine, "Quantum Information Processing and Quantum Simulation with Programmable Rydberg Atom Arrays" The Department of Physics at Harvard University, PHD Thesis (2021).
Low et al., "Practical trapped-ion protocols for universal qudit-based quantum computing", Physical Review Research 2(3): 033128 (2020).
Lu et al., "Aluminum nitride integrated photonics platform for the ultraviolet to visible spectrum," Optics Express, 26(9): 11147 (2018).
Ma et al., "Generation of three-dimensional optical structures by dynamic holograms displayed on a twisted nematic liquid crystal display," Applied Physics B Lasers and Optics, 110(4): 531-537 (2013).
Matsumoto et al., "High-quality generation of a multispot pattern using a spatial light modulator with adaptive feedback," Optics Letters, 37(15): 3135-3137 (2012).
Mazurenko, "Optical Imaging of Rydberg Atoms," Thesis (S.B.)—Massachusetts Institute of Technology, Dept. of Physics (2012).
Mehta et al., "Towards fast and scalable trapped-ion quantum logic with integrated photonics," Proc. SPIE 10933, Advances in Photonics of Quantum Computing, Memory, and Communication XII, 109330B (2019).
Morgado et al., "Quantum simulation and computing with Rydberg-interacting qubits," Arxiv, Cornell University Library: 36 pages (2020).
Murmann et al., "Two Fermions in a Double Well: Exploring a Fundamental Building Block of the Hubbard Model," arXiv:1410.8784, Feb. 17, 2015, pp. 1-12.
Negretti et al., "Quantum computing implementation with neutral particles," Arxiv, (19 pages) (2011).
Nogrette et al., "Single-Atom Trapping in Holographic 2D Arrays of Microtraps with Arbitrary Geometries," Physical Review X, 4: Article 021034 pp. 1-9 (2014).
Perez-Garcia et al., "PEPS as unique ground states of local Hamiltonians," Quant. Inf. Comp., 8: 0650 (2008).

(56) References Cited

OTHER PUBLICATIONS

Persson et al., "An algorithm for improved control of trap intensities in holographic optical tweezers," Proceedings of SPIE, 8458: 8 pages (2012).
Persson et al., "Minimizing intensity fluctuations in dynamic holographic optical tweezers by restricted phase change," Optics Express, 18(11): 11250-11263 (2010).
Persson et al., "Real-time generation of fully optimized holograms for optical trapping applications," Proceedings of SPIE, 8097: 10 pages (2011).
Persson et al., "Reducing the effect of pixel crosstalk in phase only spatial light modulators," Optics Express, 20(20): 22334-22343 (2012).
Persson., "Thesis for the Degree of Doctor of Philosophy: Advances in Holographic Optical Trapping," Department of Physics University o Gothenburg: 82 pages (2013).
Pichler et al., "Computational complexity of the Rydberg blockade in two dimensions," arXiv: 1809.04954 (2018).
Poland et al., "Development of a doubly weighted Gerchberg-Saxton algorithm for use in multibeam imaging applications," Optics Letters, 39(8): 2431-2434 (2014).
Pollmann et al., "Detection of symmetry-protected topological phases in one dimension," Phys. Rev. B, 86(12): 125441-1-13 (2012).
Prongue et al., "Optimized kinoform structures for highly efficient fan-out elements," Applied Optics, 31(26): 5706-5711 (1992).
Rehn et al., "A fractionalised "Z2" classical Heisenberg spin liquid" arXiv: 5 pages (2016).
Reichle et al., "Transport Dynamics of single ions in segmented microstructed Paul trap arrays" Forschritte der Physik Progress of Physics, 54 (8-10): 666-685 (2006).
Saffman et al., "Quantum information with Rydberg atoms," Rev. Mod. Phys., 82(3): 2313-2363 (2010).
Saffman et al., "Scaling the neutral-atom Rydberg gate quantum computer by collective encoding in holmium atoms," Phys. Rev. A, 78: 012336 (2008).
Satzinger et al. "Realizing topologically ordered states on a quantum processor," 27 pages, (2021).
Savary et al., "Quantum Spin Liquids" arXiv: 60 pages (2016).
Shi, "Deutsch, Toffoli, and CNOT Gates via Rydberg Blockade of Neutral Atoms," Arxiv.org, Cornell University Library, 201 Olin Library Cornell University Ithaca, NY (2018).
Shi, "Fast, Accurate, and Realizable Two-Qubit Entangling Gates by Quantum Interference in Detuned Rabi Cycles of Rydberg Atoms," Arxiv.org, Cornell University Library, 201 Olin Library Cornell University Ithaca, NY (2019).
Sorace-Agaskar et al., "Multi-layer integrated photonics from the ultraviolet to the infrared," Proc. SPIE 10510, Frontiers in Biological Detection: From Nanosensors to Systems X, 105100D (2018).
Tamura et al., "Highly uniform holographic microtrap arrays for single atom trapping using a feedback optimization of in-trap fluorescence measurements," Optics Express, 24(8): 8132-8141 (2016).
Tanasittikosol et al., "Microwave dressing of Rydberg dark states," Arxiv, Cornell University Library: 12 pages (2011).

Thimons et al., "Investigating the Gerchberg-Saxton Phase Retrieval Algorithm," SIAM: 11 pages (2018).
Torlai et al., "Integrating Neural Networks with a Quantum Simulator for State Reconstruction," Cornell University Library, (15 pages) (2019).
Urban et al., "Observation of Rydberg blockade between two atoms," Nature Physics, 5: 110-114 (2009).
Verdon et al., "A Universal Training Algorithm for Quantum Deep Learning" Arxiv, p. 1-83, (2018).
Verresen et al., "One-dimensional symmetry protected topological phases and their transitions," Phys. Rev. B, 96(16): 165124-1-23 (2017).
Verstraete et al., "Criticality, the Area Law, and the Computational Power of Projected Entangled Pair States," Phys. Rev. Lett., 96: 220601 (2006).
Vidal, "Class of Quantum Many-Body States That Can Be Efficiently Simulated," Phys. Rev. Lett., 101(11): 110501-1-4 (2008).
Wang et al., "Coherent Addressing of Individual Neutral Atoms in a 3D Optical Lattice," Physical Review Letters, 115(4): 043003-1-5 (2015).
Wu et al., "Erasure conversion for fault-tolerant quantum computing in alkaline earth Rydberg atom arrays," arXiv.org: 16 pages (2022).
Yang et al., "Coherence Preservation of a Single Neutral Atom Qubit Transferred between Magic-Intensity Optical Traps" Physical Review Letter, 117: 6 pages (2016).
Yavuz et al., "Fast Ground State Manipulation of Neutral Atoms in Microscopic Optical Traps," Physical Review Letters, 96(6): 063001-1-4 (2006).
Ying, "Entangled Many-Body States as Resources of Quantum Information Processing," Center for Quantum Technologies National University of Singapore (2013).
Yoder et al., "Universal fault-tolerant gates on concatenated stabilizer codes", Physical Review X 6(3): 031039 (2016).
Zimmermann et al., "High-resolution imaging of ultracold fermions in microscopically tailored optical potentials," arXiv:1011.1004, Apr. 8, 2011, pp. 1-15.
Du et al., "Superconducting circuit probe for analog quantum simulators", *Physical Review A* 92(1): 012330 (2015).
International Search Report and Written Opinion for International Application No. PCT/US22/37325 dated Jun. 16, 2023.
Keating et al., "Adiabatic quantum computation with Rydberg-dressed atoms", Physical Review A 87, 052314, May 2013.
Meschede, "Quantum engineering with neutral atoms one by one", *Conference on Lasers and Electro-Optics/Pacific Rim*. Optica Publishing Group, 2007.
Wang et al., "Quantum state manipulation of single-Cesium-atom qubit in a micro-optical trap", *Frontiers of Physics* 9: 634-639 (2014).
Willner et al., "Optics and photonics: Key enabling technologies", *Proceedings of the IEEE* 100.Special Centennial Issue: 1604-1643 (2012).
Levine, "Quantum Information Processing and Quantum Simulation with Programmable Rydberg Atom Arrays" The Department of Physics at Harvard University, PHD Thesis, published Jan. 12, 2022.
Monroe et al., "Remapping the quantum frontier." Physics World 21.08 (2008): 32.

* cited by examiner

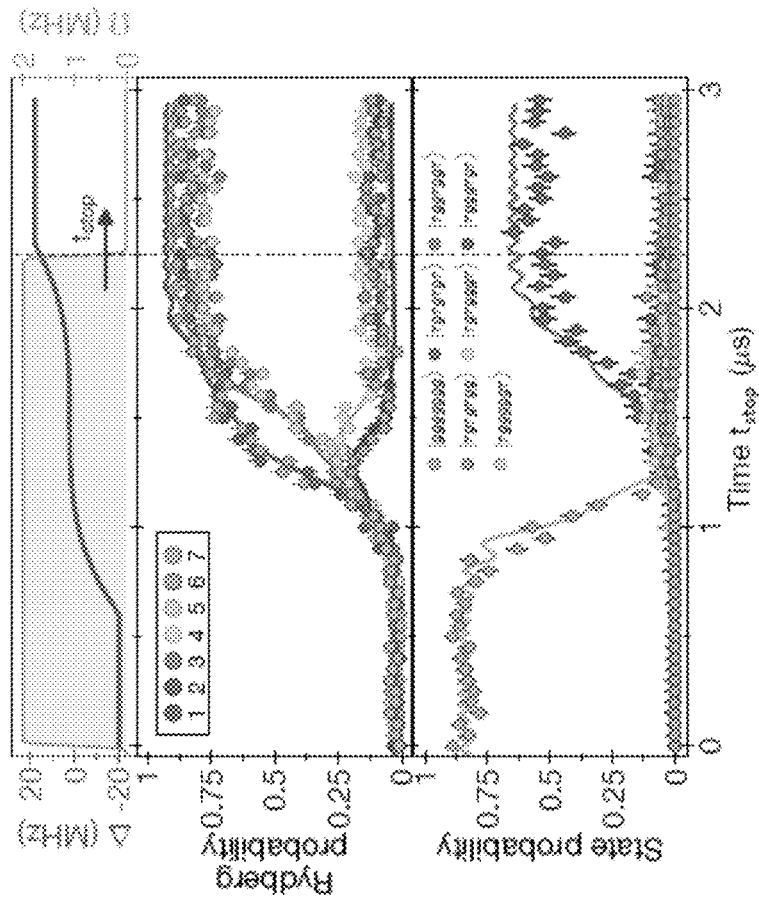

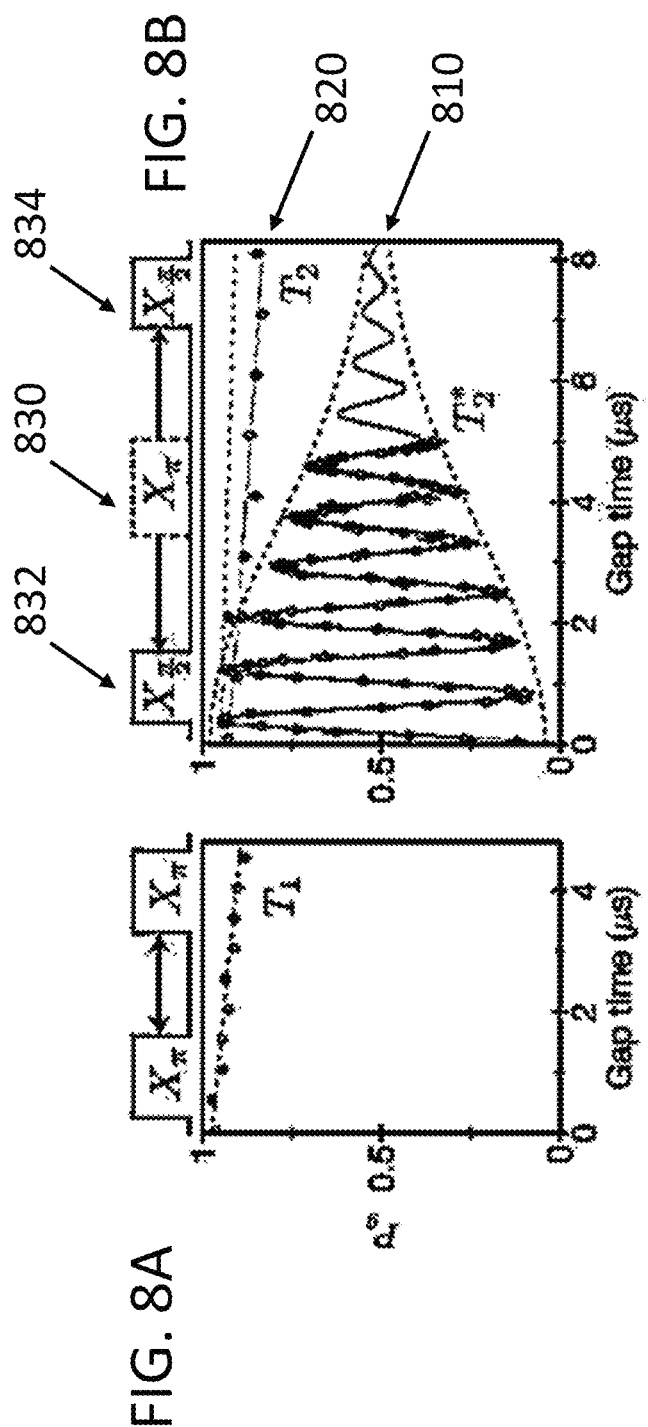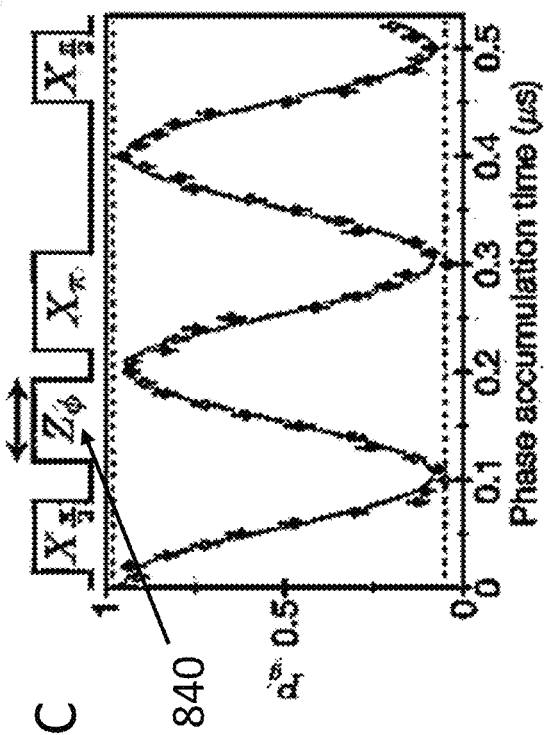
FIG. 8A
FIG. 8B
FIG. 8C

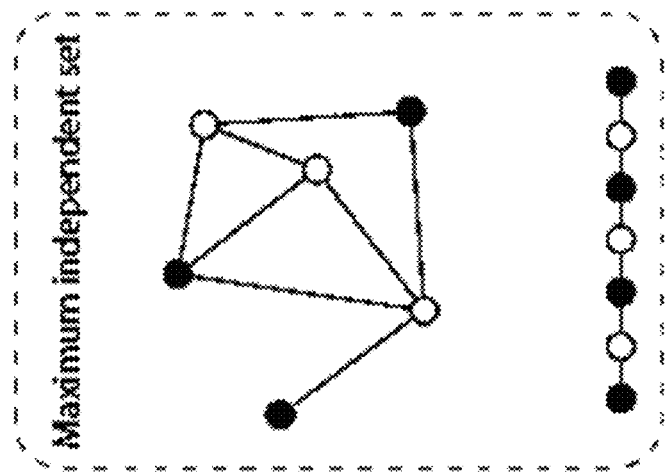
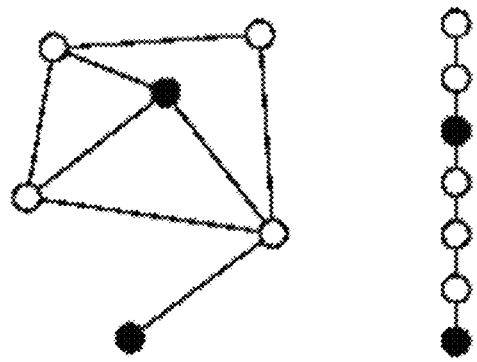
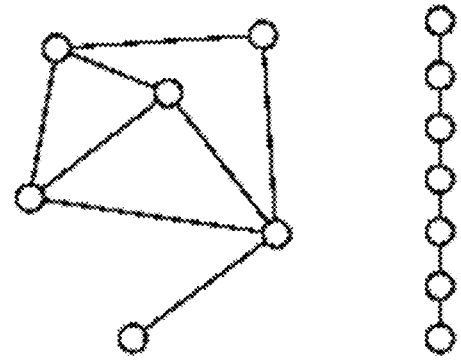
FIG. 11A
FIG. 11B

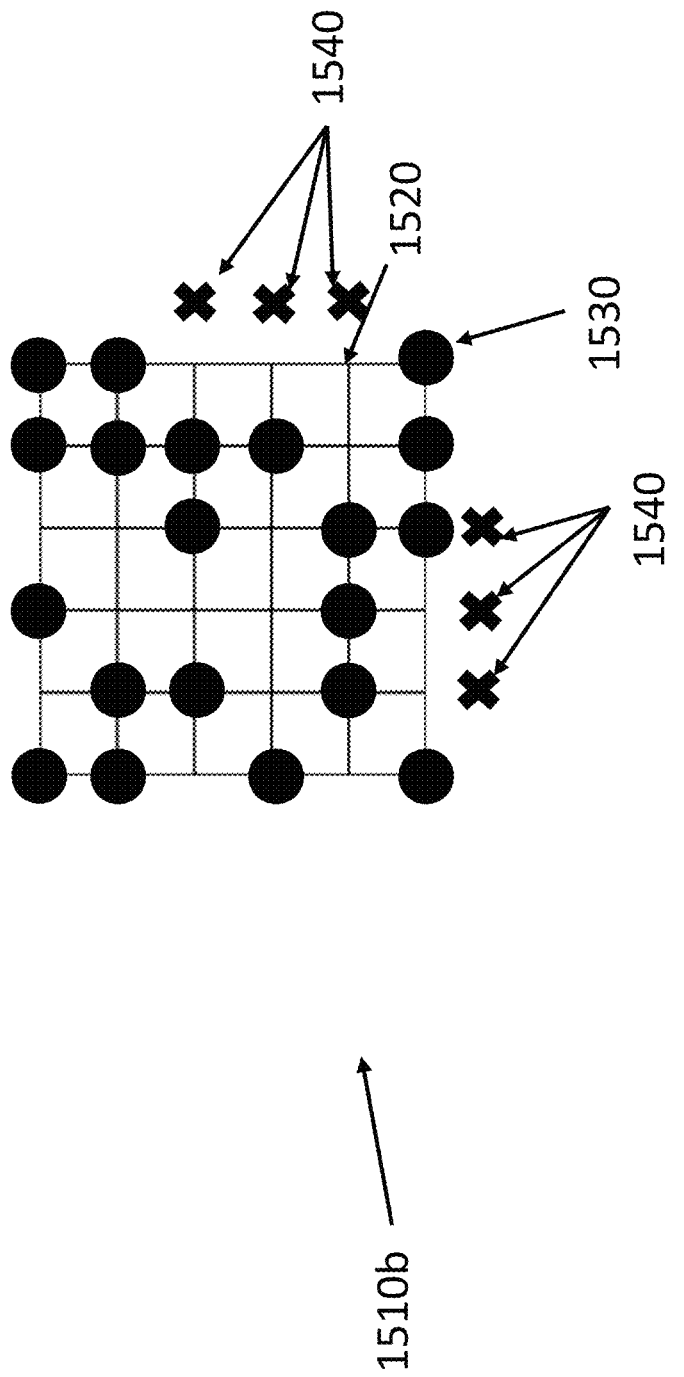

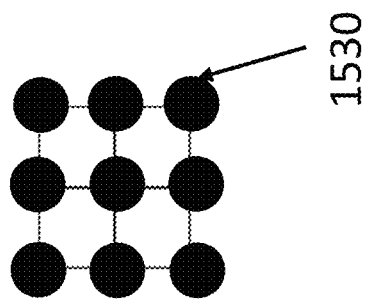

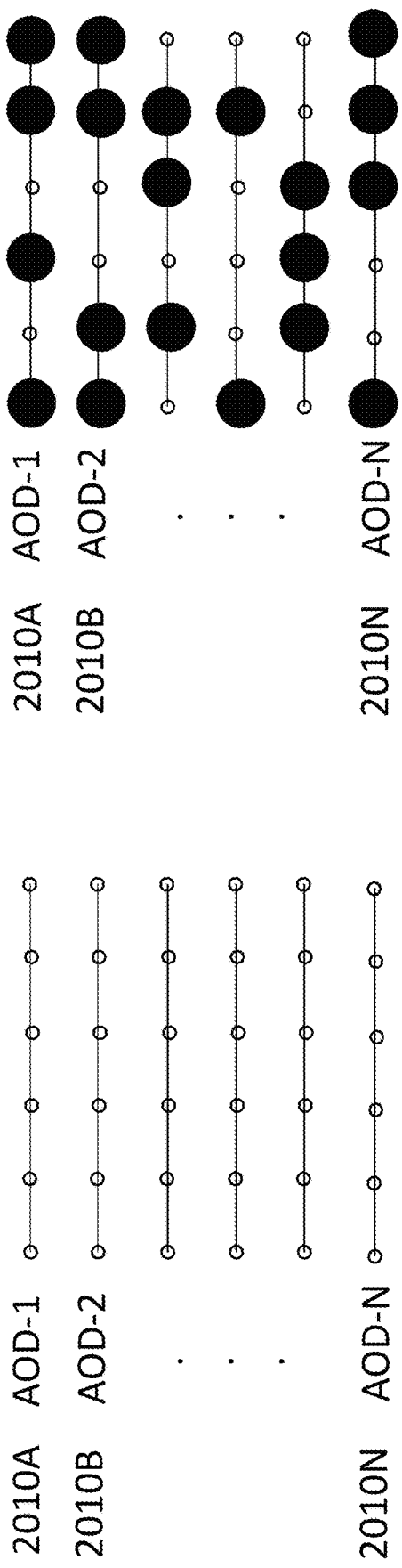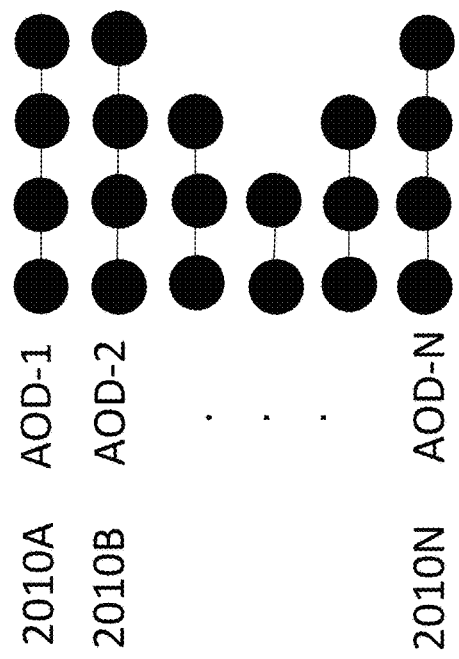

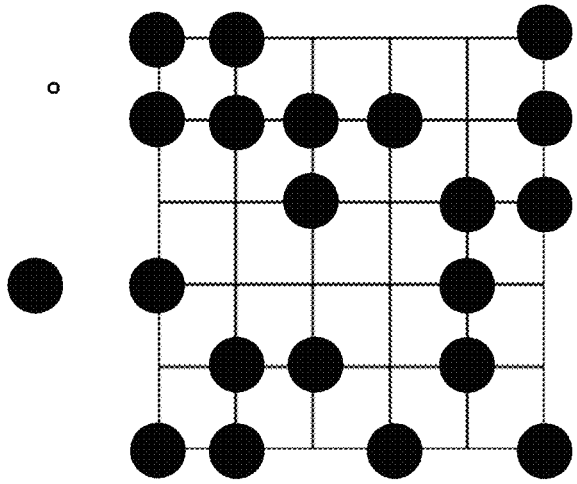
FIG. 22B
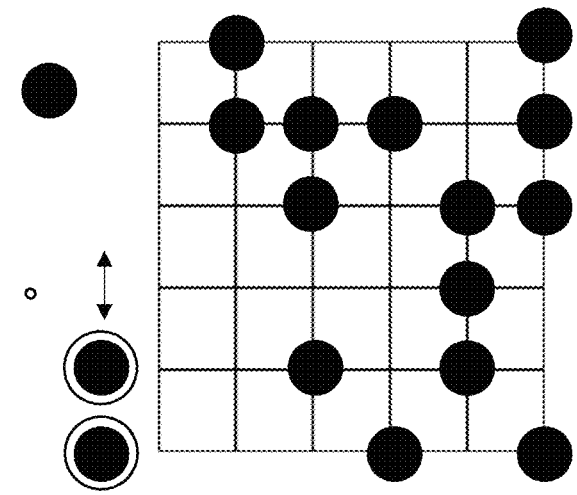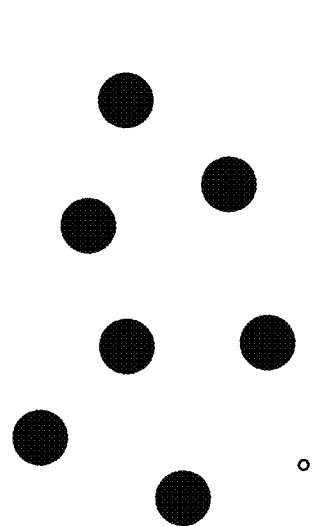
FIG. 22A

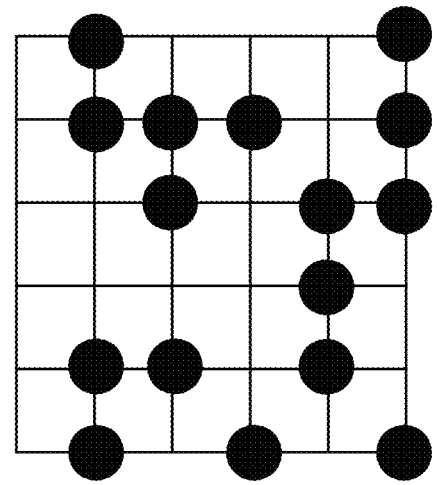
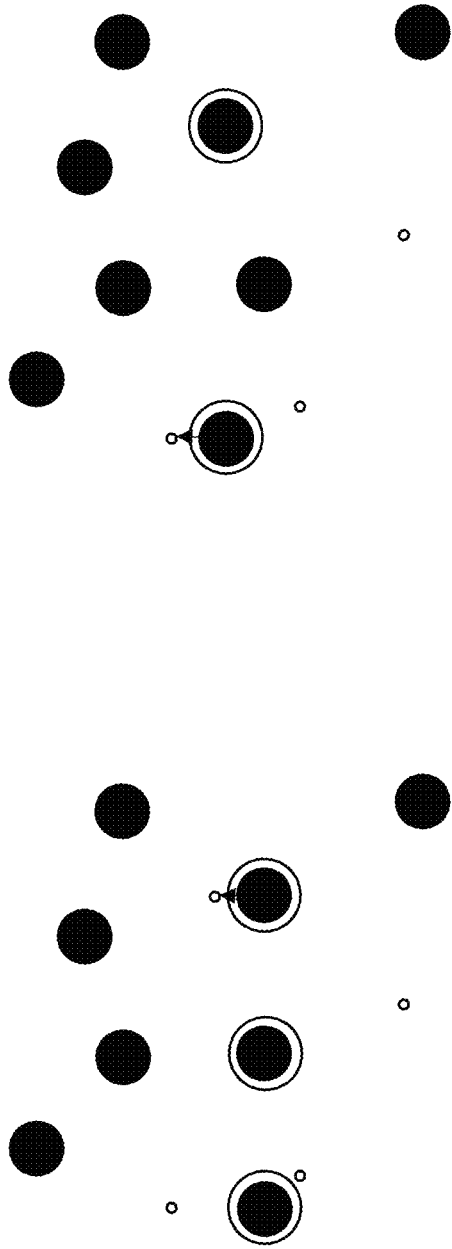
FIG. 22J
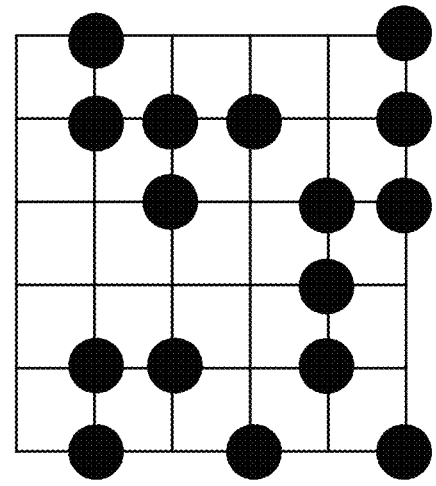
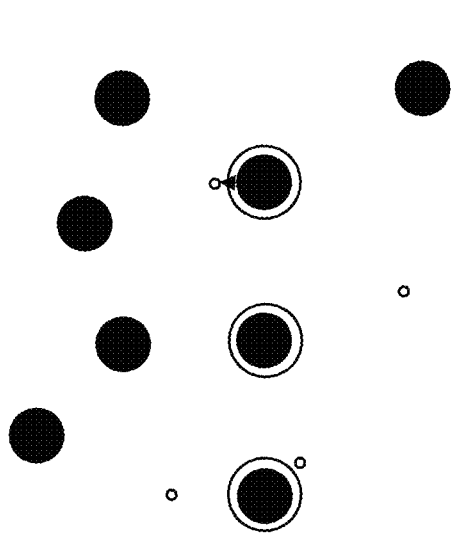
FIG. 22I

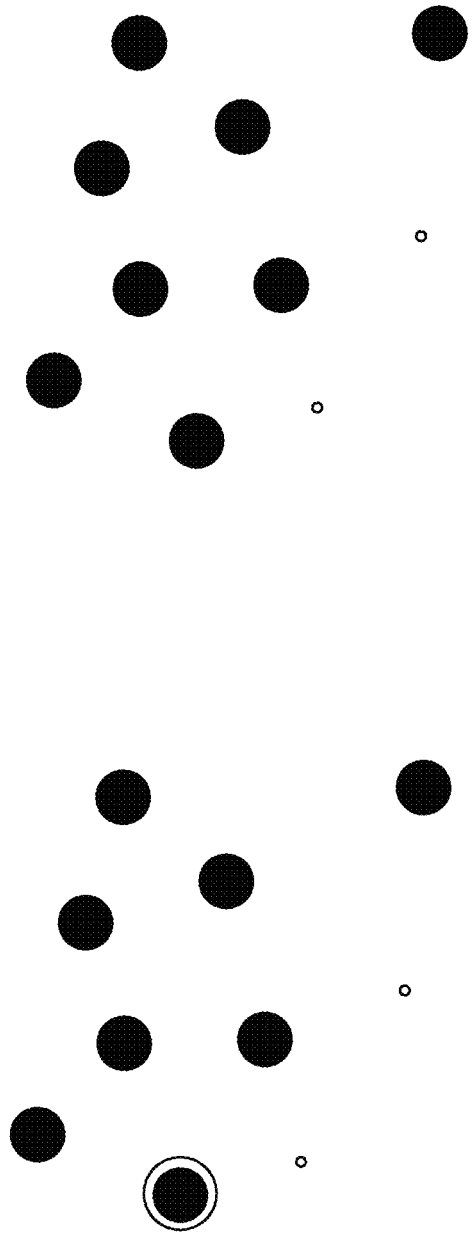
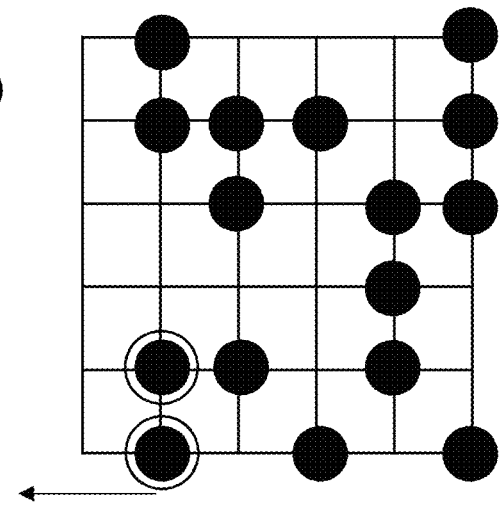
FIG. 22L
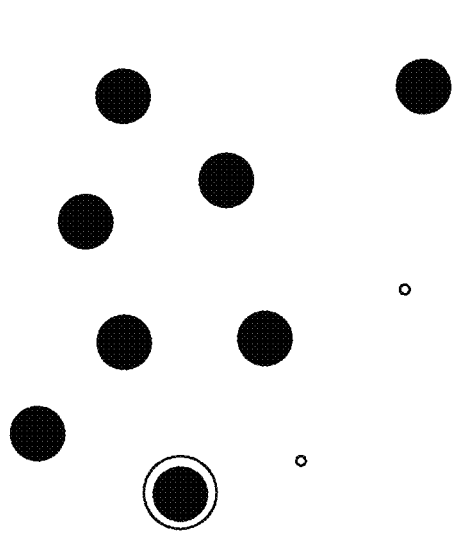
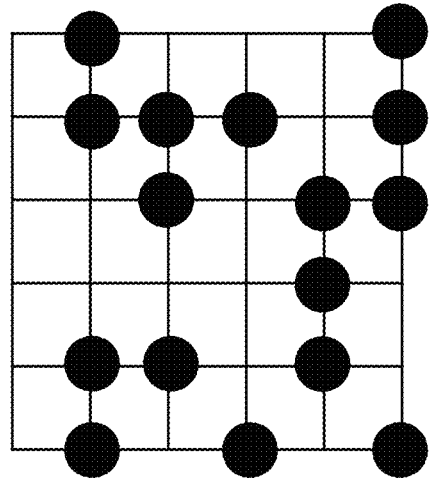
FIG. 22K

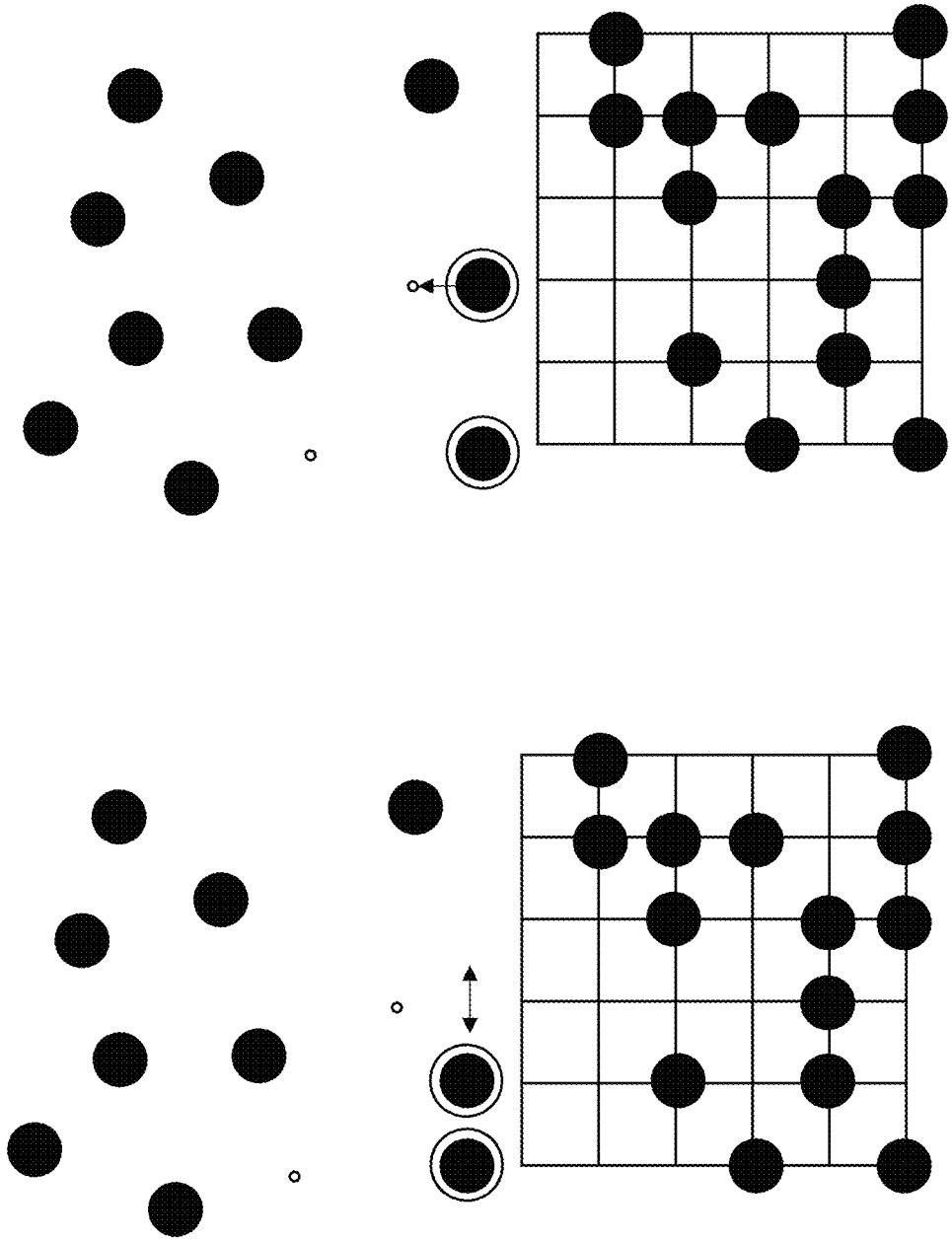

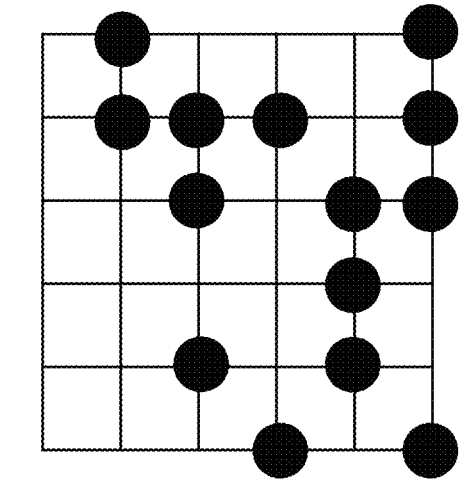
FIG. 22P
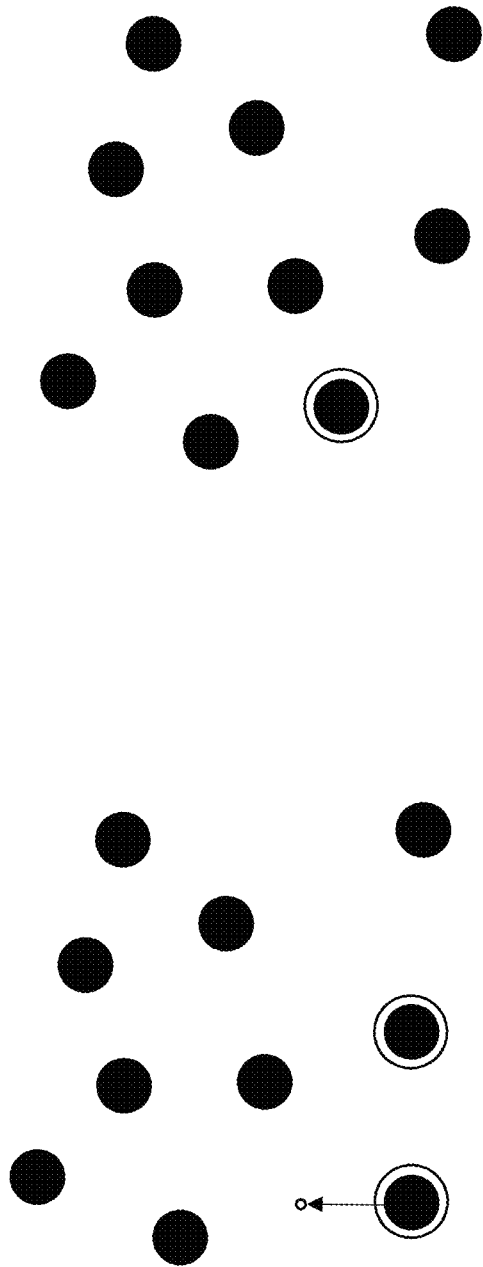
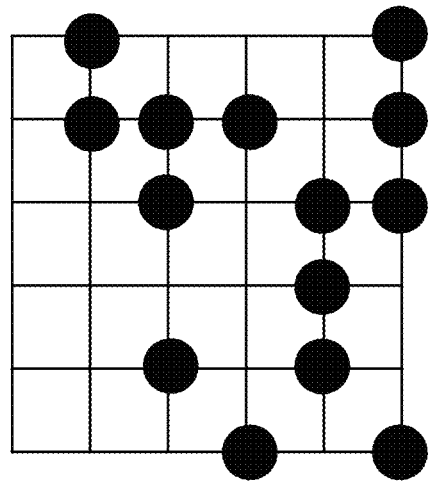
FIG. 22O

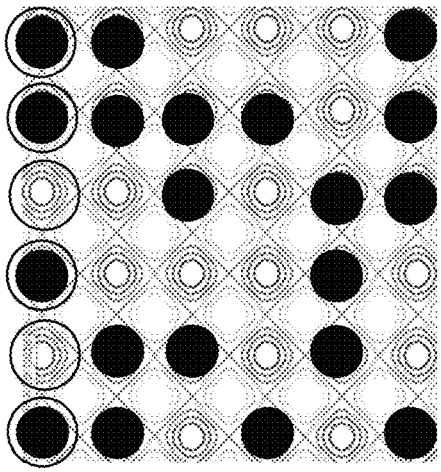
FIG. 24A
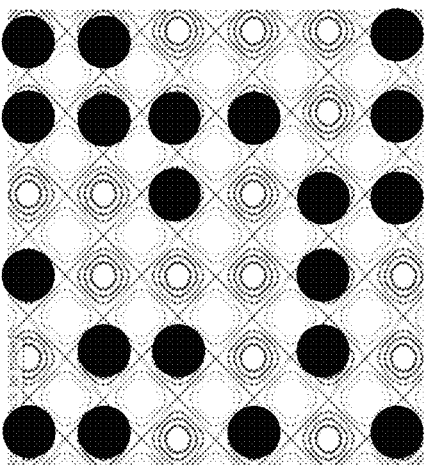
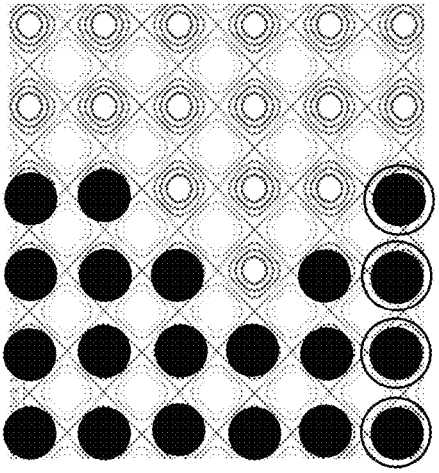
FIG. 24B
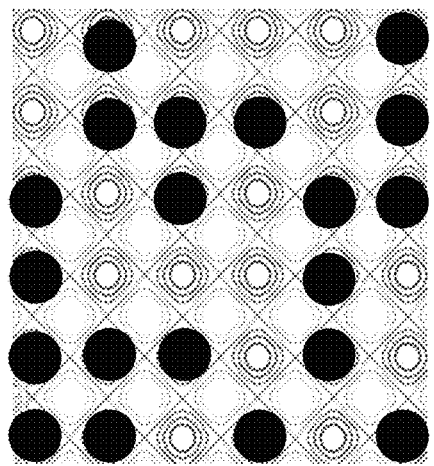
FIG. 24D
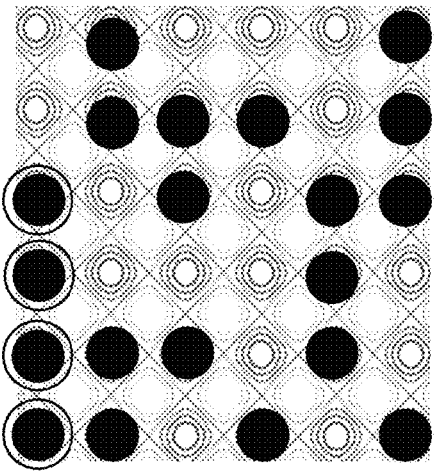
FIG. 24C
FIG. 24E

NEUTRAL ATOM QUANTUM INFORMATION PROCESSOR

CROSS-REFERENCE TO RELATED APPLICATIONS

This application is a continuation U.S. application Ser. No. 17/830,609, filed on Jun. 2, 2022, which is a continuation of U.S. application Ser. No. 16/630,719, filed on Jan. 13, 2020, which is the U.S. National Stage of International Application No. PCT/US2018/042080, filed on Jul. 13, 2018, published in English, which claims the benefit of priority to U.S. Provisional Application No. 62/531,993, filed on Jul. 13, 2017 and 62/589,716, filed on Nov. 22, 2017. The entire teachings of the above application(s) are incorporated herein by reference.

GOVERNMENT SUPPORT

This invention was made with government support under 1521560 and 1506284 and 1125846 awarded by National Science Foundation (NSF) and under W911NF-14-1-0344 awarded by U.S. Army Research Office (ARO) and under FA9550-17-1-0002 awarded by U.S. Air Force Office of Scientific Research (AFOSR) and under N00014-15-1-2846 awarded by U.S. Office of Naval Research (NAVY/ONR). The government has certain rights in the invention.

COPYRIGHT NOTICE

This patent disclosure may contain material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

TECHNICAL FIELD

This patent relates to quantum computing, and more specifically to preparing and evolving an array of atoms.

SUMMARY OF THE INVENTION

According to some embodiments, the system and methods described herein relate to arranging atoms into 1D and/or 2D arrays; exciting the atoms into Rydberg states and evolving the array of atoms, for example, using laser manipulation techniques and high fidelity laser systems described herein; and observing the resulting final state. In addition, refinements can be made to the system and methods described herein, such as providing high fidelity and coherent control of the assembled array of atoms. Exemplary problems are discussed which can be solved using the system and methods described herein.

In one or more embodiments, a method includes forming an array of atoms in a first array state, wherein said forming includes: exciting a crystal with a plurality of discrete adjustable acoustic tone frequencies, passing a laser through the crystal to create a plurality of confinement regions, wherein each acoustic tone frequency corresponds to an individual confinement region for a single atom, trapping at least two atoms in at least two of said plurality of confinement regions, correlating the discrete adjustable acoustic tone frequencies to identify the confinement regions that contain the trapped atoms, and adjusting a spacing between at least two of the trapped atoms by sweeping at least one correlated adjustable acoustic tone frequency; evolving the plurality of atoms in the first array state into a plurality of atoms in a second array state by subjecting at least some of the trapped atoms to photon energy to transition at least some of the trapped atoms into an excited state; and observing the plurality of atoms in the second array state.

In one or more embodiments, the excited state is a Rydberg state.

In one or more embodiments, the plurality of atoms in the first array state includes between 7 and 51 atoms.

In one or more embodiments, the evolving the plurality of atoms includes preparing at least some of the atoms in the first array state into a Zeeman sublevel of the ground state before subjecting at least some of the atoms to photon energy.

In one or more embodiments, the preparing the atoms in the first array state into a Zeeman sublevel of the ground state includes optical pumping in a magnetic field.

In one or more embodiments, the subjecting at least some of the atoms to photon energy includes applying light having two different wavelengths, and wherein the transition of the at least some of the atoms into an excited state includes a two photon transition.

In one or more embodiments, the two different wavelengths are approximately 420 nm and approximately 1013 nm.

In one or more embodiments, the method further includes applying a phase gate with a third wavelength.

In one or more embodiments, the third wavelength is approximately 809 nm.

In one or more embodiments, the subjecting the at least some of the atoms to photon energy includes applying two half-pi pulses.

In one or more embodiments, the subjecting the at least some of the atoms to photon energy further includes applying a pi pulse between the two half-pi pulses.

In one or more embodiments, the trapping the at least two at least two atoms includes trapping at least two atoms from a cloud of atoms and dispersing atoms from the cloud of atoms not trapped in one of said plurality of confinement regions.

In one or more embodiments, the crystal and laser comprise a first control acousto-optic deflector (AOD), and wherein the trapping the at least two atoms includes trapping atoms from a hold trap array having at least three traps spaced apart in two dimensions.

In one or more embodiments, the hold trap array is generated by at least one of at least one hold AOD, a spatial light modulator (SLM), and an optical lattice.

In one or more embodiments, the method further includes a second control AOD configured in a crossed relationship with the first control AOD, and wherein: the correlating the discrete adjustable acoustic tone frequencies to identify the confinement regions that contain the trapped atoms includes correlating with discrete adjustable acoustic tone frequencies of the first control AOD and the second control AOD, and the adjusting the spacing between the at least two of the trapped atoms includes sweeping at least one correlated adjustable acoustic tone frequency of the first control AOD or the second control AOD.

In one or more embodiments, the adjusting the spacing between the at least two of the trapped atoms further includes adjusting the position of multiple atoms in a row.

In one or more embodiments, the method further includes: forming a second array of atoms in a third array state adjacent to the first array of atoms, wherein said forming includes: exciting a second crystal with a plurality of second discrete adjustable acoustic tone frequencies, passing a second laser through the second crystal to create a plurality of second confinement regions, wherein each second acoustic tone frequency corresponds to an individual second confinement region for a single atom, trapping at least two second atoms in at least two of said plurality of second confinement regions, correlating the second discrete adjustable acoustic tone frequencies to identify the second confinement regions that contain the trapped atoms, and adjusting a spacing between at least two of the trapped second atoms by sweeping at least one second correlated adjustable acoustic tone frequency; wherein the evolving the plurality of atoms in the first array state into a plurality of atoms in a second array state by subjecting at least some of the trapped atoms to photon energy to transition the at least some of the trapped atoms into the excited state further includes evolving the plurality of second atoms in the third array state into a plurality of second atoms in a fourth array state by subjecting at least some of the second trapped atoms to photon energy to transition at least some of the second trapped atoms into an excited state; and wherein the observing the plurality of atoms in the second array state further includes observing the plurality of second atoms in the fourth array state.

In one or more embodiments, the adjusting the spacing between at least two of the trapped atoms by sweeping at least one correlated adjustable acoustic tone frequency includes encoding a quantum computing problem; the evolving the plurality of atoms in the first array state into the plurality of atoms in the second array state produces a solution to the quantum computing problem; and the observing the plurality of atoms in the second array state includes reading out the solution to the quantum computing problem.

In one or more embodiments, the quantum computing problem includes at least one of an Ising-problem and a maximum independent set (MIS) optimization problem.

In one or more embodiments, a system includes: a confinement system for arranging an array of atoms in a first array state, the confinement system comprising: a crystal, an adjustable acoustic tone frequency application source configured to selectively apply a plurality of discrete adjustable acoustic tone frequencies to the crystal, and a laser source arranged pass light through the crystal to create a plurality of confinement regions, wherein each acoustic tone frequency corresponds to an individual confinement region, a source of an atom cloud, the atom cloud capable of being positioned to at least partially overlap with the plurality of confinement regions; an excitation source for evolving at least some of the plurality of atoms in the first array state into a plurality of atoms in a second array state, the excitation source comprising at least one source of photon energy; an observing system for observing the plurality of atoms in the second array state.

In one or more embodiments, the excitation source is configured to excited at least some of the plurality of atoms in the first array state into a Rydberg state In one or more embodiments, the plurality of atoms in the first array state includes between 5 and 51 atoms.

In one or more embodiments, the excitation source is configured to excited at least some of the plurality of atoms in the first array state into a Zeeman sublevel of the ground state before subjecting at least some of the atoms to photon energy.

In one or more embodiments, claim 0, the excitation source further includes an optical pumping system and a magnetic field generator.

In one or more embodiments, the at least one source of photon energy includes light sources having a first wavelength and a second wavelength for producing a two photon transition of the at least some of the plurality of atoms in the first array state.

In one or more embodiments, the two different wavelengths are approximately 420 nm and approximately 1013 nm.

In one or more embodiments, the at least one source of photon energy includes a source having a third wavelength for applying a phase gate.

In one or more embodiments, the third wavelength is approximately 809 nm.

In one or more embodiments, the excitation source is configured to apply two half-pi pulses.

In one or more embodiments, the excitation source is configured to apply a pi pulse between the two half-pi pulses.

In one or more embodiments, the confinement system is a first control acousto-optic deflector (AOD), and wherein the system further includes a hold trap array having at least three traps spaced apart in two dimensions, the hold trap array being generated by a hold trap source.

In one or more embodiments, the hold trap source includes at least one of at least one hold AOD, a spatial light modulator (SLM), and an optical lattice.

In one or more embodiments, the system further includes a second control AOD in a crossed relationship with the first control AOD, wherein the first control AOD controls deflection of light beams in a first direction, and the second control AOD controls deflection of light beams from the first AOD in a second direction different from the first direction.

In one or more embodiments, the confinement system is a first control acousto-optic deflector (AOD), and wherein the system further includes a second control AOD in a stacked relationship with the first control AOD, wherein the first control AOD is configured to produce a plurality of confinement regions in a first array having a first direction, and the second control AOD controls is configured to produce a plurality of confinement regions in a second array that is substantially parallel to the first direction.

In one or more embodiments, a system for controlling an array of trapped atoms includes: a laser source for producing a laser output; a laser source controller that controls the laser source; a Pound-Drever-Hall (PDH) lock optically coupled to the laser source that receives at least some of the laser output and provides a feedback signal to the laser source controller for stabilizing the laser output; a reference optical cavity optically coupled to the laser source, the reference optical cavity configured to receive at least some of the laser output and to transmit a reference optical cavity output, the reference optical cavity output corresponding to a portion of the at least some of the laser output that falls within a reference optical cavity transmission window; and an optical isolator optically coupled to the reference optical cavity, the optical isolator configured to split the reference optical cavity output and to provide at least a portion of the split reference optical cavity output to a Fabry-Perot laser diode to injection lock the reference optical cavity output, wherein the optical isolator provides injection locked light to at least some of the trapped atoms.

In one or more embodiments, the PDH further includes a photodetector that receives at least some of the laser output and outputs a photodetector signal to the laser controller.

In one or more embodiments, the system further includes a second laser source for providing a second laser output at a different wavelength from the first laser output.

In one or more embodiments, the system further includes: a second laser source controller that controls the second laser source; a second Pound-Drever-Hall (PDH) lock optically coupled to the second laser source that receives at least some of the second laser output and provides a second feedback signal to the second laser source controller for stabilizing the second laser output; a second reference optical cavity optically coupled to the second laser source, the second reference optical cavity configured to receive at least some of the second laser output and to transmit a second reference optical cavity output, the second reference optical cavity output corresponding to a portion of the at least some of the second laser output that falls within a second reference optical cavity transmission window; and an second optical isolator optically coupled to the second reference optical cavity, the second optical isolator configured to split the second reference optical cavity output and to provide at least a portion of the split second reference optical cavity output to a second Fabry-Perot laser diode to injection lock the second reference optical cavity output, wherein the second optical isolator provides second injection locked light to at least some of the trapped atoms.

In one or more embodiments, the second laser source produces light at approximately 1013 nm.

In one or more embodiments, the second reference optical cavity and the first reference optical cavity are the same element.

In one or more embodiments, the first injection locked light and the second injection locked light are provided to the at least some of the trapped atoms in a counterpropagating configuration.

In one or more embodiments, the first laser source produces light at approximately 420 nm.

In one or more embodiments, the system further includes optics positioned optically between the optical isolator and the array of trapped atoms configured to focus the injection locked light onto the at least some of the trapped atoms.

In one or more embodiments, the system further includes a spatially resolved imaging device configured to pick off at least a portion of the injection locked light in order to align the injection locked light.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIGS. 3A-C show a comparison of the methods described in the present disclosure with a simulation, according to some embodiments.

FIGS. 8A-8C show graphs characterizing single-atom coherence and phase control, according to some embodiments.

FIGS. 11A-11B show examples of independent sets including maximum independent sets, according to some embodiments.

FIGS. 15A-15H show methods for two-dimensional ordering of atoms, according to some embodiments.

FIGS. 20A-20C show methods for two-dimensional ordering of atoms, according to some embodiments.

FIGS. 24A-24E show methods for two-dimensional ordering of atoms, according to some embodiments.

DETAILED DESCRIPTION

Figure 1A:
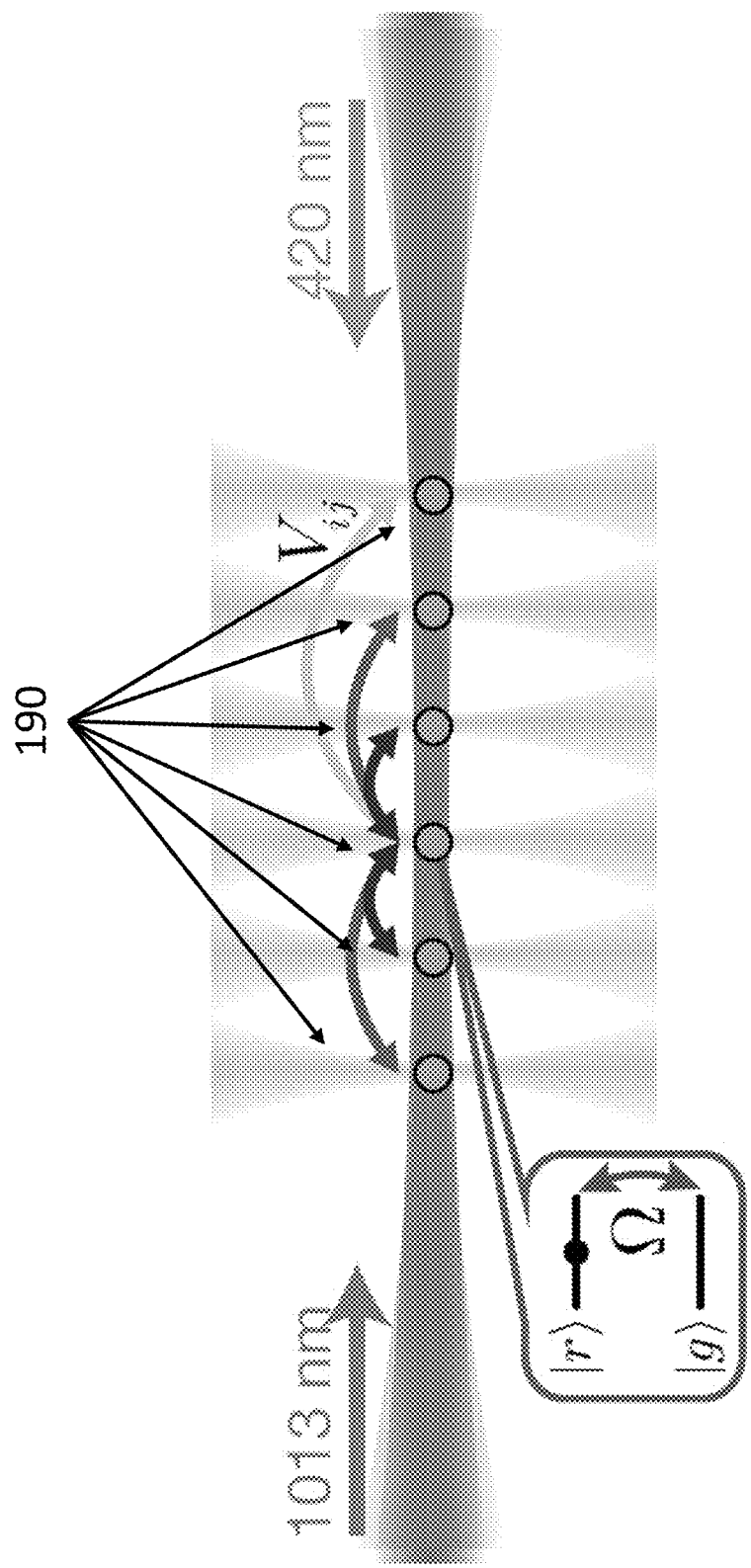
FIGS. 1A-F show aspects of a system and method for preparing an array of atoms, according to some embodiments.

As quantum simulators, fully controlled, coherent many-body quantum systems can provide unique insights into strongly correlated quantum systems and the role of quantum entanglement, and enable realizations and studies of new states of matter, even away from equilibrium. These systems also form the basis for the realization of quantum information processors. While basic building blocks of such processors have been demonstrated in systems of a few coupled qubits, increasing the number of coherently coupled qubits to perform tasks that are beyond the reach of modern classical machines is challenging. Furthermore, current systems lack coherence and/or quantum nonlinearity for achieving fully quantum dynamics.

Neutral atoms can serve as building blocks for large-scale quantum systems. They can be well isolated from the environment, enabling long-lived quantum memories. Initialization, control, and read-out of their internal and motional states is accomplished by resonance methods developed over the past four decades. Arrays with a large number of identical atoms can be rapidly assembled while maintaining single-atom optical control. These bottom-up approaches are complementary to the methods involving optical lattices loaded with ultracold atoms prepared via evaporative cooling, and generally result in atom separations of several micrometers. Controllable interactions between the atoms can be introduced to utilize these arrays for quantum simulation and quantum information processing. This can be achieved by coherent coupling to highly excited Rydberg states, which exhibit strong, long-range interactions. This approach provides a powerful platform for many applications, including fast multi-qubit quantum gates, quantum simulations of Ising-type spin models with up to 250 spins, and the study of collective behavior in mesoscopic ensembles. Short coherence times and relatively low gate fidelities associated with such Rydberg excitations are challenging. This imperfect coherence can limit the quality of quantum simulations, and can dim the prospects for neutral atom quantum information processing. The limited coherence becomes apparent even at the level of single isolated atomic qubits.

The present disclosure describes embodiments relating quantum computing. According to some embodiments, methods and systems for quantum computing involve first trapping individual atoms and arranging them into particular geometric configurations of multiple atoms, for example, using the disclosed acousto-optic deflector system and technique. Systems and methods that allow for precise placement of individual atoms assist in encoding a quantum computing problem. Next, one or more of the arranged atoms may be excited into a Rydberg state, which, as described below, produces particular interactions between the atoms in the array. Next, the system may be evolved. Finally, the state of the atoms may be read out in order to observe the solution to the encoded problem. According to some embodiments, the system and methods described herein relate to (1) arranging atoms into 1D and/or 2D arrays (see Section 1), (2) exciting the atoms into Rydberg states and evolving the array of atoms, for example, using the laser manipulation techniques and high fidelity laser systems described herein (see Section 2), and (3) observing the resulting final state (see Section 3). In addition, additional refinements to the system and methods described herein, such as to provide a high fidelity and coherent control of the assembled array of atoms are described in Section 4. Moreover, in Section 5, exemplary problems are discussed which can be solved using the system and methods described herein.

Section 1: Arranging Atoms into 1D and/or 2D Arrays

According to some embodiments, the states and positions of neutral atoms may be tightly controlled using focus lasers in a vacuum in order to arrange atoms into arrays for encoding problems solvable by quantum computing. A system and method thereof described in the present disclosure provides for control of larger number of atoms than previously reported, which vastly expands the set of problems solvable by such quantum systems. These atoms may be prepared in 1D or 2D arrays using, for example, acoustically excited crystal(s) and laser(s). Systems and methods described in the present disclosure allow for fine control of the position of the individual atoms in these 1D or 2D arrays.

The initial states of the atoms can be prepared according to techniques described in the present disclosure, and the system can then be adiabatically evolved to produce a solution. Accordingly, the system may be prepared in the lowest-energy state for given initial parameters, which are then evolved to their final values sufficiently slowly for the system to remain in the instantaneous lowest-energy state. Furthermore, according to some embodiments, such as described in conjunction with FIGS. 7-10, particular laser control techniques allow for high-fidelity and coherent control of individual atoms after they are arranged into 1D or 2D arrays. Such techniques allow for greater control over the quantum mechanical system, which therefore produces more accurate solutions to encoded problems.

Section 1.A: Acousto-Optic Deflector for Arranging Atoms into 1D Arrays

According to an embodiment, a positioning system and method provides for the preparation of a large number of atoms, for example, 51 or more, to be encoded with an initial problem. A laser may pass through a crystal, which may be controlled with one or more discrete acoustic tones (tone frequencies which vibrate the crystal) to create discrete deflections of the laser path corresponding to the applied tone frequencies. The number of deflections may be controlled by the number of tone frequencies provided to the crystal. Tone frequencies are electronic radio-frequency signals in the VHF band, chosen between, for example, 75 MHz and 125 MHz. Tone frequencies can include acoustic waves that are narrow in frequency. Multiple tone frequencies may be overlayed to produce a signal comprising multiple tones. These tone frequencies may then be applied to the crystal to cause compression or vibration of the crystal. According to some embodiments, these tone frequencies may be provided to the crystal using, for example, one or more piezoelectric transducers that may be bonded to the crystal. According to some embodiments, the tone frequencies may be chosen based on the acoustic and/or other properties of the crystal. Furthermore, adjusting the frequency of each individual tone may adjust the amount of deflection for each discrete deflection, thereby creating a controllable spacing between each deflected beam of light. Tone frequencies may be converted from a digital waveform, produced, for example, by a computer controller, to an analog signal by a software-defined radio (SDR) or an arbitrary waveform generator may be implemented that synthesizes the superposition of all desired tone frequencies in the time domain. The frequencies may be adjusted by updating the digital waveforms output by the computer controller.

The tone frequencies used depend on a number of factors, such as, but not limited to, the number of deflections desired, the particular crystal being used, the wavelength of the light applied to the crystal, and the desired spacing of the confinement regions/traps. The range of frequencies of the acoustic waves applied to the crystal may have limits based on the speed of sound in the crystal material, and may be, for example, between 50-500 MHz. According to some embodiments, a set of discrete frequencies in the range of approximately 75-125 MHZ may be used. According to some embodiments, 100 traps may be generated by spacing individual tone frequencies apart by approximately ~0.5 MHz. According to some embodiments, when adjusting individual tone frequencies to the spacing of the traps, the angle as a function of applied acoustic frequency may be on the order of approximately 0.1 to 10 mrad/MHz. One exemplary value may be approximately 1.2 mrad/MHz. However, this value is merely exemplary, and changes drastically based on the particular crystal and optics used.

The output laser array beams from the crystal may be focused into a cloud of cooled atoms. The atoms may be cooled by the radiation pressure of additional counter-propagating laser beams, with a magnetic quadrupole field to induce a spatially dependent radiation pressure that counters the atomic motion in all directions and produces a restoring force to the center of the quadrupole field. The output laser array may be focused such that each laser array beam may only trap a single atom. The cloud may then be dispersed, leaving only trapped atoms. An image may then be taken of the atoms in the trap, e.g., based on light scattering by the atoms. In a measurement and feedback procedure, the trapped atoms may then be correlated with individual of the tone frequencies provided to the crystal, for example, by once averaging a multitude of images of atoms loaded in the traps. The established positions may be recorded and assigned to individual tone frequencies. In subsequent loading of atoms into the traps, tone frequencies without associated trapped atoms may then be turned off after taking an image and locating trap positions where atomic fluorescence is absent. Each of the remaining tone frequencies (e.g., those that have not been turned off) may then be swept by adjusting each tone frequency to position the remaining trapped atoms. Thus, according to some embodiments, even if each confinement region does not trap an atom, the system may be adjusted so as to reposition the confinement regions to form the desired array spacing. Such techniques and systems can significantly improve the number of atoms that may be reliably trapped in an array, such as 51 atoms or more, and allow for accurate control of the spaced atoms. After arranging the atoms in the array, the system may be excited and evolved as discussed in more detail below, and the resulting changes observed in order to read out a solution to an encoded problem.

Figure 1B:
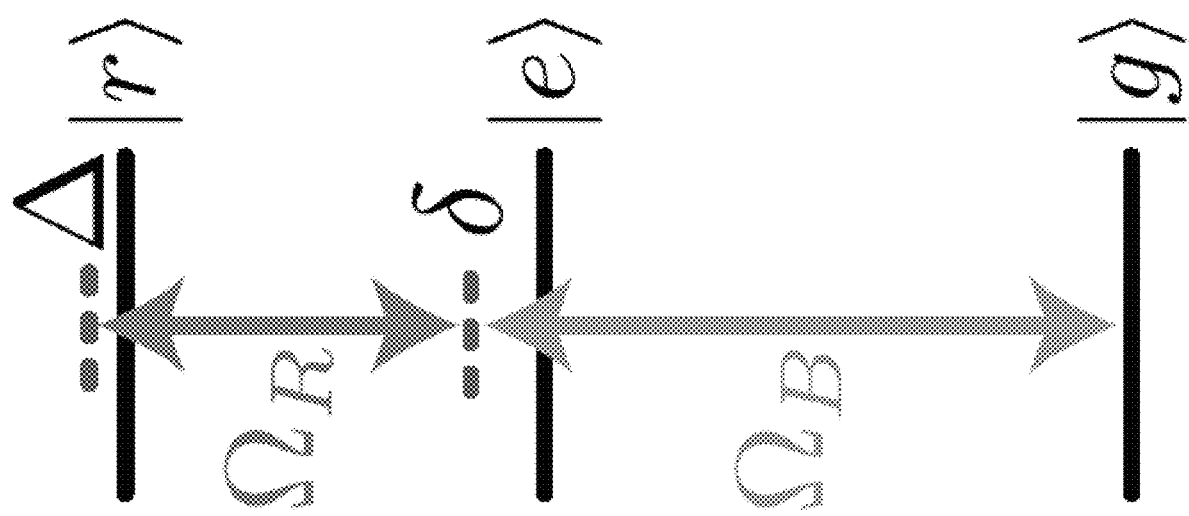
Figure 1C:
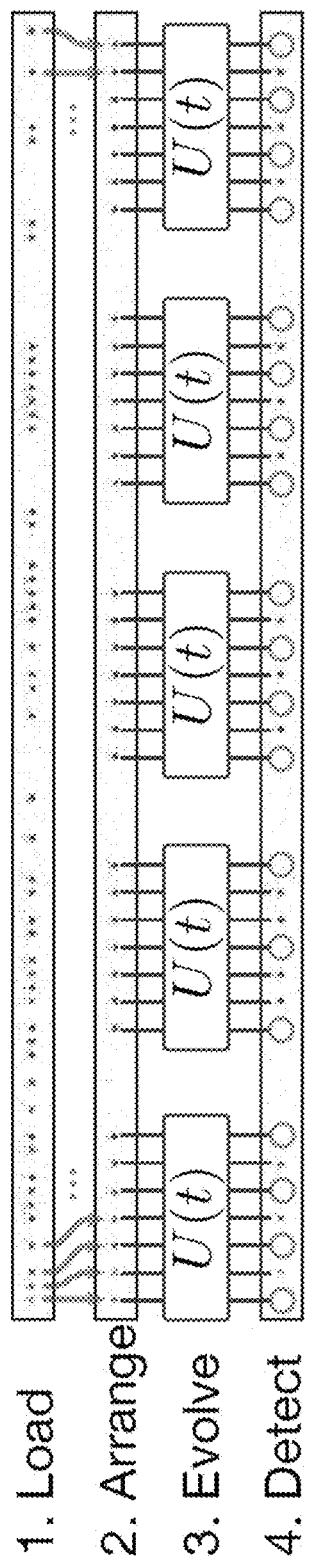
Figure 1D:
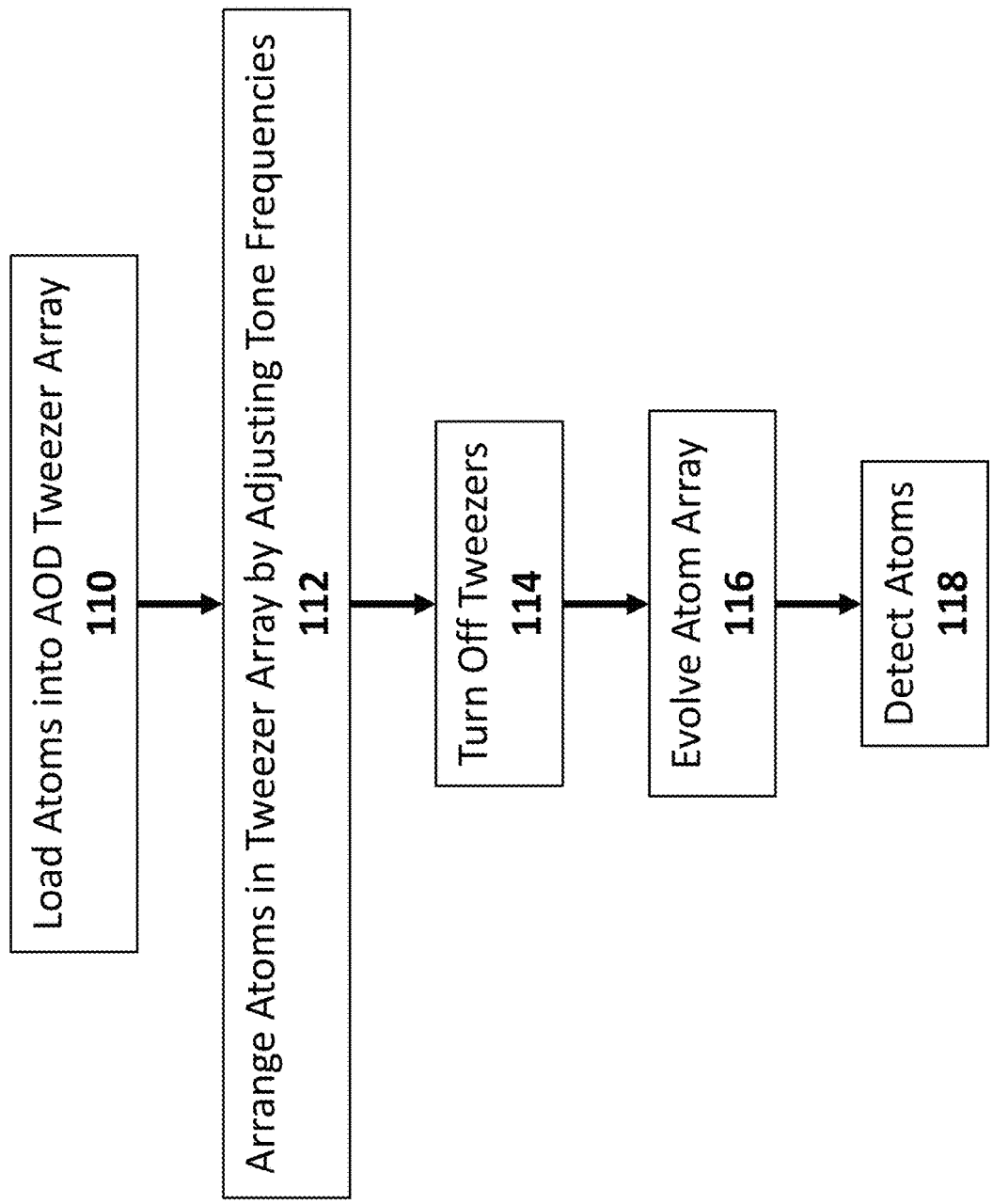
Figure 1E:
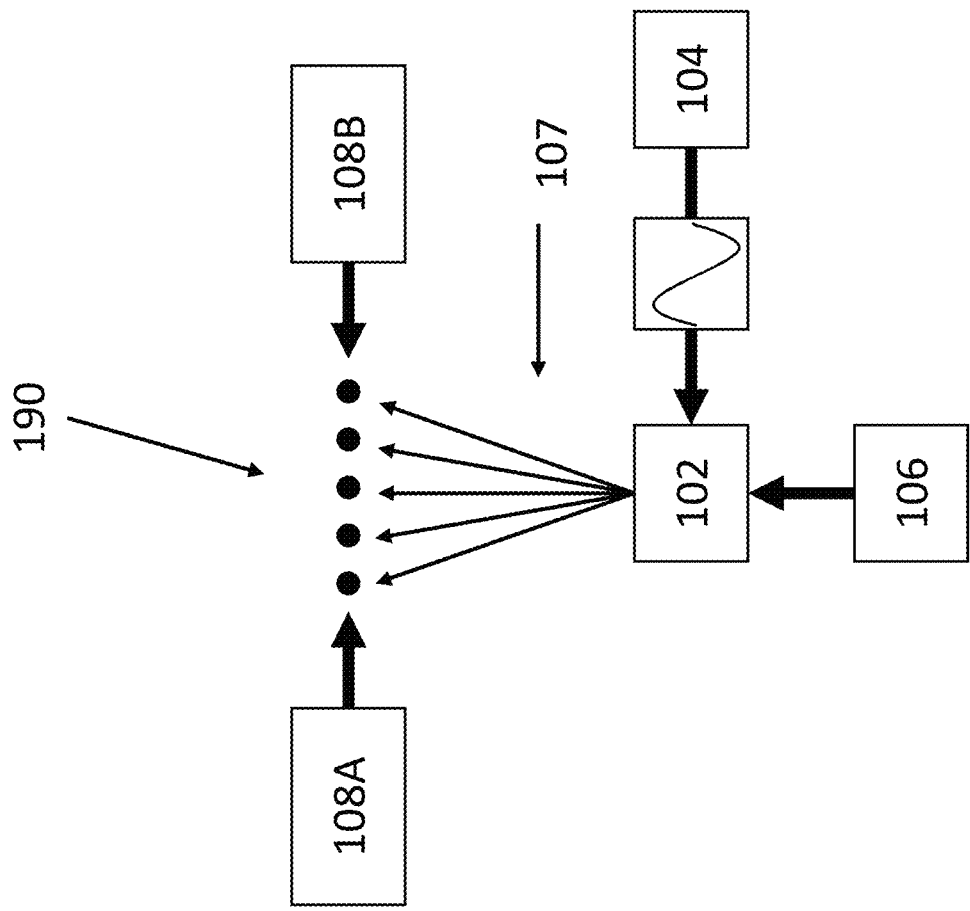

FIGS. 1C-1E show an experimental protocol and setup for arranging and evolving an array of atoms, according to an embodiment. FIG. 1E shows a schematic of a system for arranging and controlling an array of atoms, according to some embodiments. As shown in FIG. 1E, the system may include a crystal 102, a tweezer laser source 106, an acoustic tone generator 104, and manipulation laser sources 108A, 108B. Acoustic tone generator produces one or more (n) tone frequencies which are applied to the crystal 102. The tweezer laser source 106 supplies light to the crystal 102, which is then deflected into n separate tweezer beams that form a tweezer array 107, each associated with one of the one or more tone frequencies. The frequency of each individual tone frequency determines the deflection of the respective tweezer beam. The tweezer beams may be used to trap atoms 190. The individual tone frequencies may be adjusted in frequency in order to adjust the spacing of the atoms 190. Atoms 190 may then be manipulated by manipulation laser sources 108A and 108B in order to evolve the system.

First, as shown in FIG. 1D, in step 110, atoms are loaded from a magneto-optical trap (not shown) into a tweezer array 107 created by an acousto-optic deflector (AOD) including, for example crystal 102 and acoustic tone generator 104. For example, as discussed above, a cloud of atoms may be prepared, for example in a magneto-optical trap. An AOD may provide a plurality of tone frequencies via acoustic tone generator 104 to crystal 102 to create a 1D tweezer array 107. Each laser tweezer is associated with one discrete tone frequency applied to the crystal. Then, the atoms may be brought to the tweezer array 107 (or vice versa) in order to trap individual atoms 190 in the tweezers associated with tone frequencies applied to the crystal 102. As shown in FIG. 1C, the spacing of the loaded atoms may be arbitrary for at least two reasons. First, not every tone frequency is guaranteed to trap an atom from the cloud. Thus, certain tone frequencies may not be associated with atoms. Second, the tone frequencies need not be prepared in a specifically ordered state in order to trap atoms. Thus, the atoms 190 may be spaced at arbitrary frequencies (and thus arbitrary relative spacings) before and during the loading process. After trapping the atoms in the AOD tweezers, the cloud of atoms may be dispersed. A measurement and feedback procedure discussed above may be used to eliminate the entropy associated with the probabilistic trap loading and results in the rapid production of defect-free arrays with over 50 laser cooled atoms.

Next, at step 120, the trapped atoms 190 may be prepared in a preprogrammed spatial configuration in a well defined internal ground state g. As discussed above, each atom in the array 190 may be associated with one of the tone frequencies applied to the crystal 102, though not all of the resulting traps may be occupied by trapped atoms. The trapped atoms may be imaged, and the locations of the atoms may be correlated to tone frequencies. Occupied tone frequencies may be noted and maintained, while unoccupied tone frequencies may be cut from the acoustic signal from acoustic tone generator 104 applied to the crystal 102. Next, the occupied tone frequencies may be adjusted in order to rearrange the atoms 190, for example, into the patterns shown in the arrange row of FIG. 1C. Because the relative spacing of each deflected laser beam in the tweezer array 107 (and thus each tweezer) is dependent on the particular tone which causes that deflection, the relative spacing of the tweezers in the tweezer array 107 may be adjusted by adjusting the individual tone frequencies supplied by acoustic tone generator 104. Thus, each trapped atom 190 may be repositioned in 1D by adjusting its associated tone frequency. As shown in FIG. 1C, the arbitrarily spaced atoms in the load position can be arranged in a particular pattern, such as in evenly spaced groups of seven atoms, using this technique.

In step 114, the optical traps or tweezers may then be turned off, for example by shutting off tweezer laser source 106, to let the system evolve under the unitary time evolution $U(\Omega, \Delta, t)$ in a sufficiently short time as to neglect atomic motion while avoiding detrimental effects of the trapping potential on the unitary evolution U(t). The evolution U(t) may be realized by coupling the atoms to the Rydberg state $|r\rangle = |70S_{1/2}\rangle$ with laser light along the array axis, as shown in FIGS. 1A and 1n step 116. As shown in FIG. 1E, laser light from one or more manipulation lasers 108A, 108B may be applied to the atom array 190 during evolution. This is shown in FIG. 1C as the application of the function U(t). Various control techniques are discussed throughout the present disclosure, for example with reference to FIGS. 7-10 below. The final states of individual atoms are detected in step 118 by turning the traps back on, and imaging the recaptured ground state atoms via atomic fluorescence using, for example, a camera, while the anti-trapped Rydberg atoms are ejected. This is shown in the detect line of FIG. 1C, where dots represent atomic fluorescence associated with present ground state atoms and circles mark sites where atoms are lost owing to Rydberg excitation.

Section 1.B: Two-Dimensional Ordering of Atoms for Encoding More Complex Problems According to some embodiments, the techniques described in the present disclosure can be applied and adapted to prepare arrays of several hundred individual atoms arranged in a 2D geometry. 2D arrays of atoms can be used to solve a wider range of problems than 1D arrays. While some of the techniques and systems described in the present disclosure reference 1D arrays, they can be applied to 2D arrays using the 2D array systems and methods described below. Combined with the laser control system and methods for controlling and manipulating atoms into Rydberg and other quantum states described below, quantum optimization algorithms can be implemented to solve real-world problems, such as, but not limited to the maximum independent set optimization problems described in the present disclosure.

According to some embodiments, systems and methods described in the present disclosure provide for the creation of a large number of traps in 2D. When atoms are loaded into these traps, they are loaded into each trap with finite probability of ~0.5. A procedure performed in 1D can then sort the atoms after identifying their locations. According to some additional embodiments, this sorting (or 'rearrangement') procedure can be applied for 2D arrays of traps.

Crossed-AODs: According to some embodiments, multiple copies of a single beam in one direction may be created to generate a 1D pattern using an Acousto-Optic Deflector (AOD) (see above for an explanation of operation of an AOD). Then, a second AOD can be used to create copies of the one-dimensional system in a different (for example, perpendicular) direction to generate a 2D pattern. Other orientations are contemplated. Next, atoms may be loaded into this pattern and defects removed by successively turning off the frequencies in either of the AODs that correspond to rows or columns containing the largest number of empty traps. Next, the frequencies may be modified on both AODs to reshape the fully loaded pattern into the target 2D array.

Figure 14:
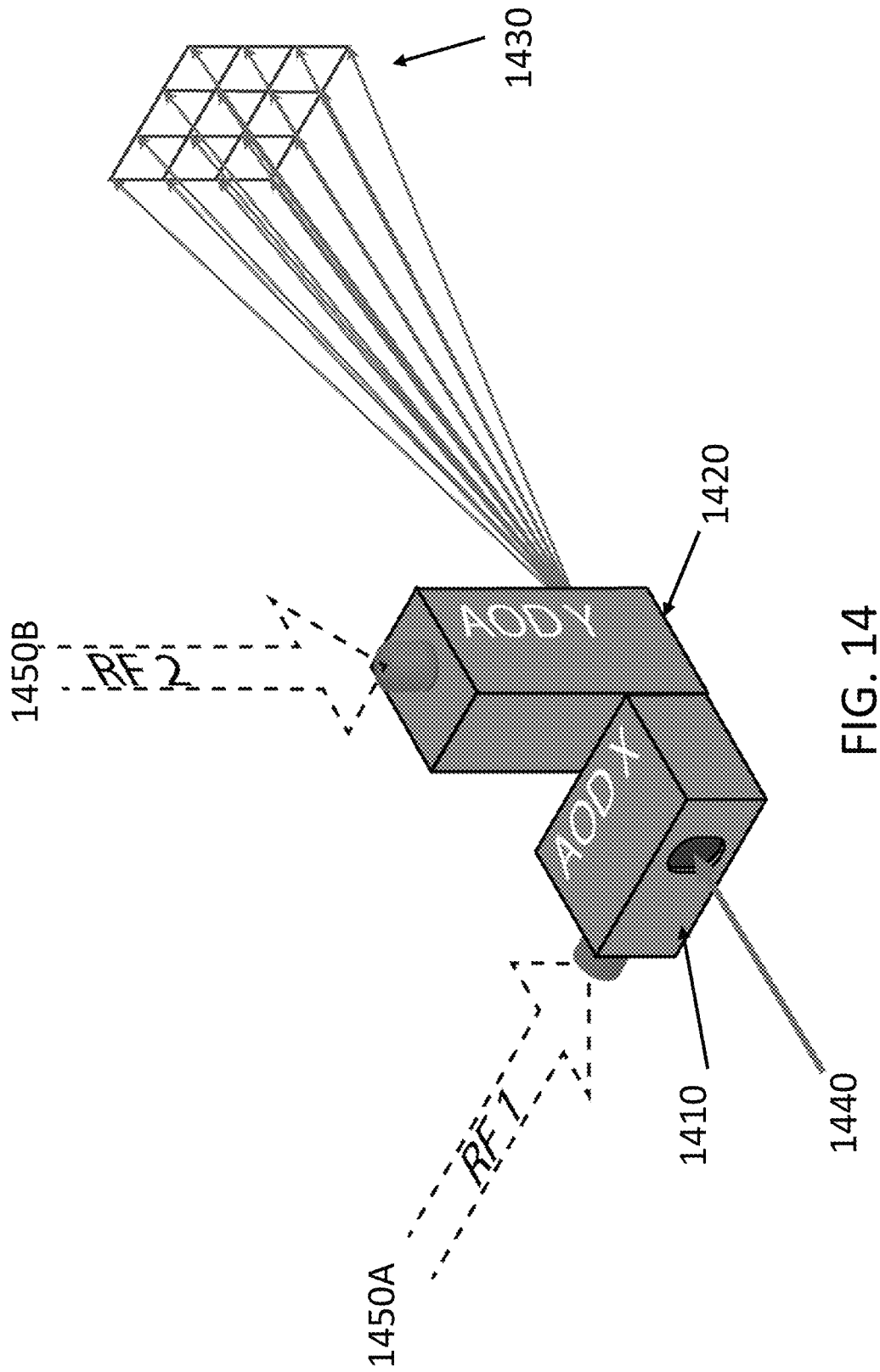
FIG. 14 shows a system for two-dimensional ordering of atoms, according to an embodiment.

As shown in FIG. 14, two AODs 1410 and 1420 may be placed close to one another and used to generate a 2D set of traps, according to some embodiments. Each AOD 1410 and 1420 may have acoustic drivers which are driven by RF signals 1450A and 1450B, respectively, to split the incident light 1440 according to the specific tone frequencies applied. As the 1D light array output from AOD 1410 becomes incident on AOD 1420, AOD 1420 may further split each beam in the 1D array into additional beams in another direction. As shown in FIG. 14, the AODs 1410 and 1420 may be held at a relative angle to one another, for example, 90 degrees. The relative angle between the two AODs 1410 and 1420 determines the relative orientation of the "rows" and "columns" of the 2D trapping pattern. For instance, 2 AODs 1410 and 1420 perpendicular to one another can create a square pattern 1430; 2 AODs with a relative angle of 60 degrees can create a triangular pattern (not shown). Such a procedure can create any geometry in which all "rows" are identical to one another, and all "columns" are identical to one another. Atoms may be loaded into the set of traps generated using this technique. Frequencies associated to individual "rows" (AOD1) and "columns" (AOD2) may be turned off in order to ensure that the remaining traps contain atoms in the desired pattern. The set of frequencies in each of the AODs can be modified to transport the atoms to a final configuration of arbitrary distances between "columns" and between "rows".

Figure 15A:
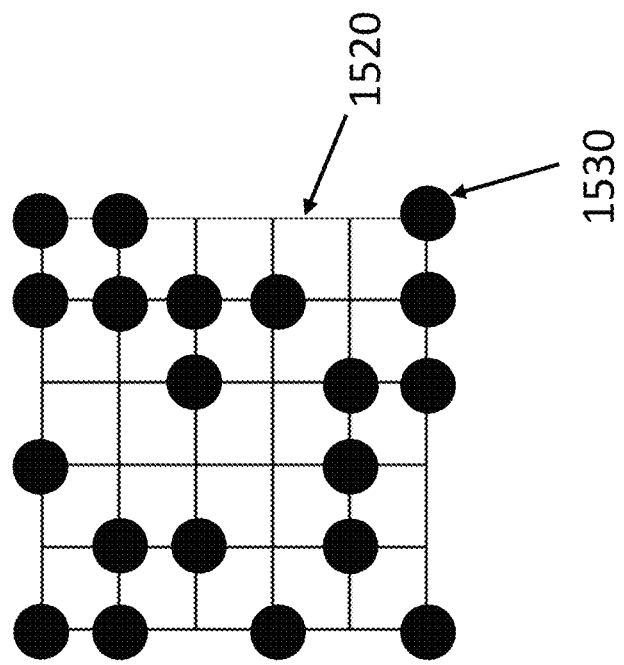
Figure 15C:
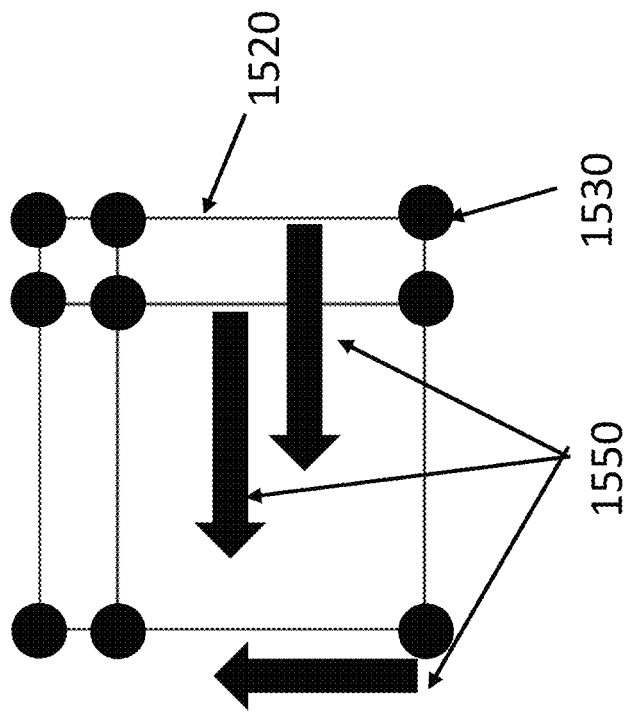

FIGS. 15A-15D show a procedure for trapping a plurality of atoms in a 2D array using the system shown in FIG. 14, according to some embodiments. In particular, FIGS. 15A-15D show a procedure to create a 3×3 array of traps all of which are filled with atoms. It should be appreciated that the similar techniques may be used to create other configurations, such as somewhere some spaces are left empty. FIG. 15A shows the output of AODs 1410 and 1420 at a right angle to produce a square trap configuration 1510a having 6 rows and 6 columns. The position of the traps is indicated by the intersection of straight lines 1520 in square pattern 1510, and atoms are indicated by filled circles 1530. FIG. 15B shows an array 1510B with rows and columns 1540 marked with "Xs" that may be removed while leaving each remaining row and column with three trapped atoms. FIG. 15C shows array 1510C without rows and columns 1540, which may be dropped as described herein by dropping associated tone frequencies applied to one of AODs 1410 and 1420. Frequencies of the remaining rows and columns may be adjusted to cause motion in directions 1550 to create an even spacing of a 3×3 array of atoms 1510D, as shown in FIG. 15D. It should be appreciated that these techniques may be scaled up to larger arrays and may be used to create configurations where not all intersections of lines (i.e., traps) are filled. According to some embodiments, rows and columns are paired so as to control the position of exactly one atom at the intersection point. Atoms may be arranged in a desired pattern by adjusting the frequencies of the associated rows/columns.

Figure 15E:
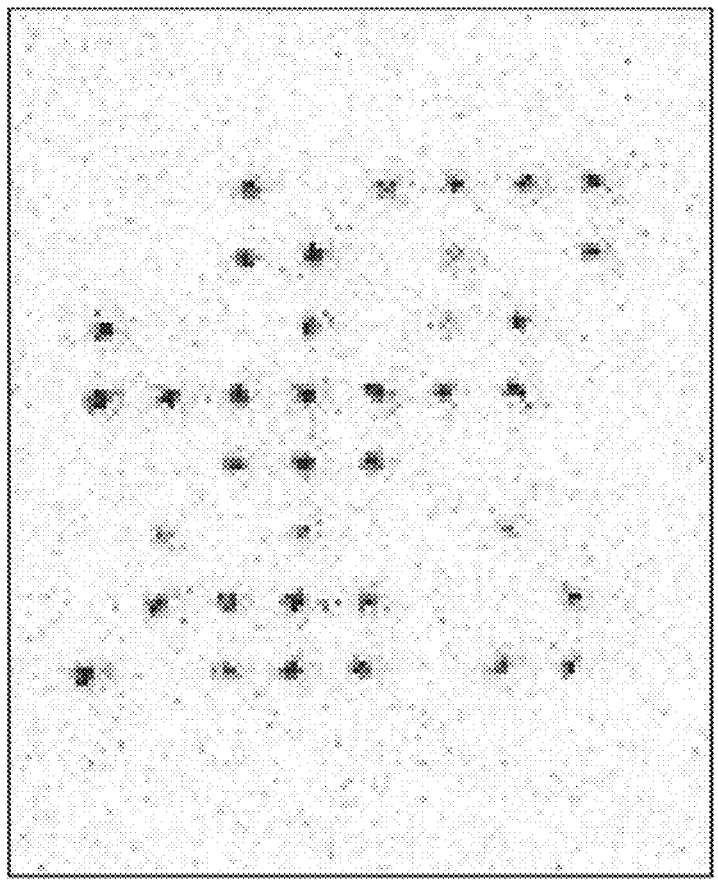
Figure 15F:
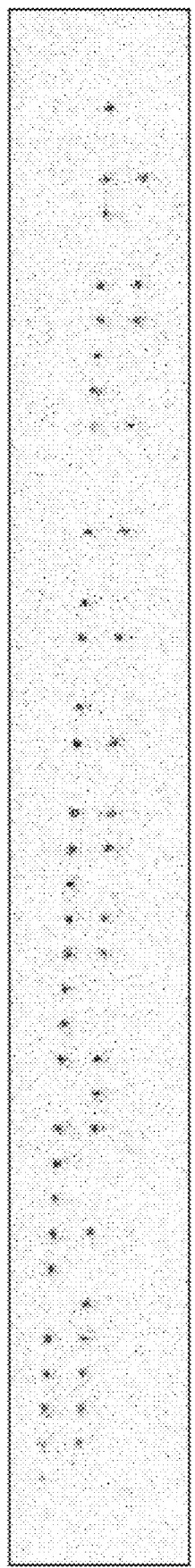
Figure 15G:
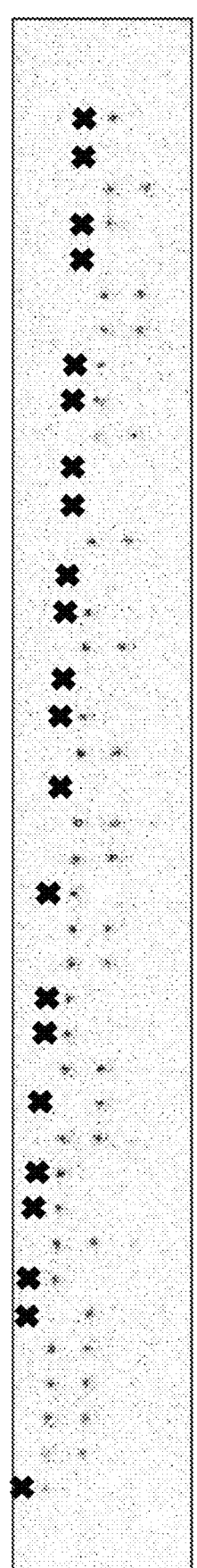
Figure 15H:
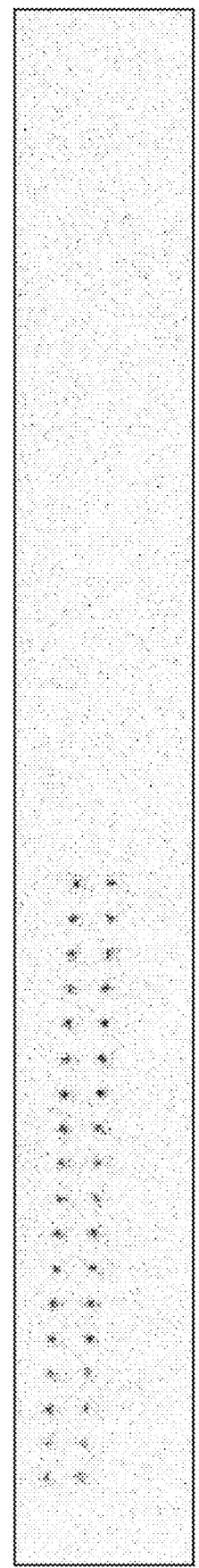

FIG. 15E shows an instance of a randomly loaded 8×8 array. The fluorescence of atoms is shown as dark spots, in an underlying pattern that can be inferred from the position of the atoms present. FIGS. 15F-15H show a randomly loaded 2×40 array, where the fluorescence of trapped atoms is shown by the dark regions. The crosses in FIG. 15G indicate all the "columns" which are turned off. A final fluorescence image in FIG. 15H shows the atoms as dark regions in their new positions after being rearranged into a 2×18 fully loaded array.

Figure 16:
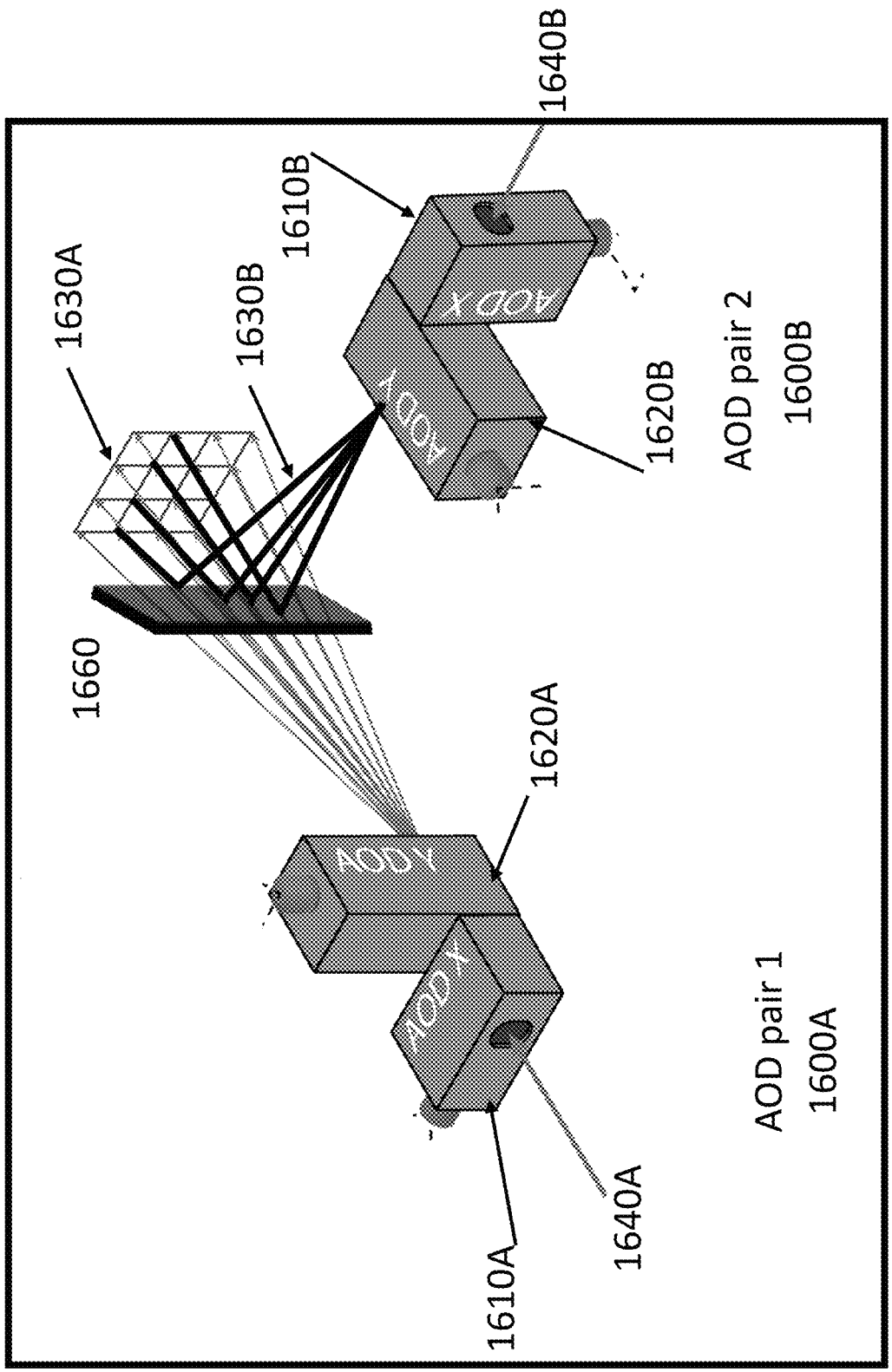
FIG. 16 shows a system for two-dimensional ordering of atoms, according to an embodiment.
Figure 17B:
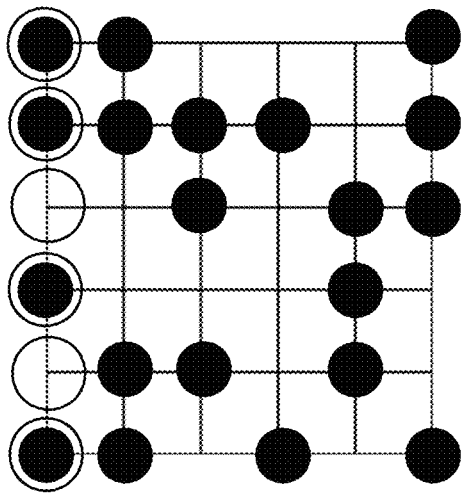
FIGS. 17A-17E show methods for two-dimensional ordering of atoms, according to some embodiments.
Figure 17A:
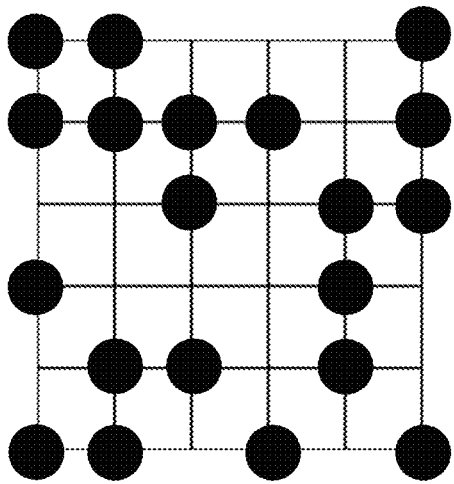
Figure 17E:
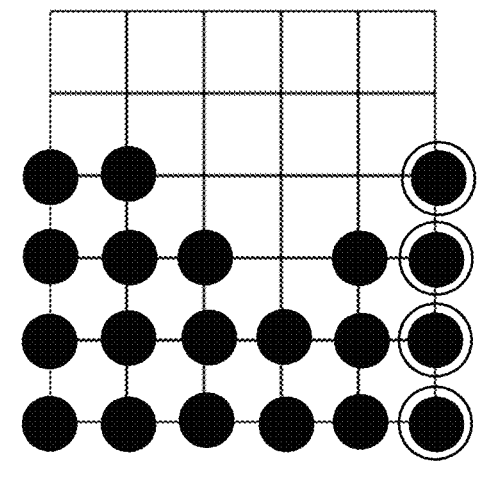
Figure 17D:
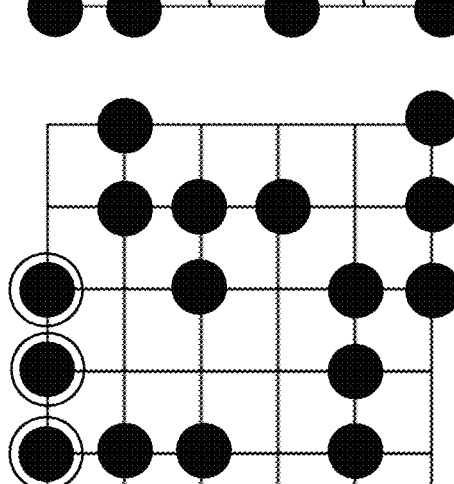
Figure 17C:
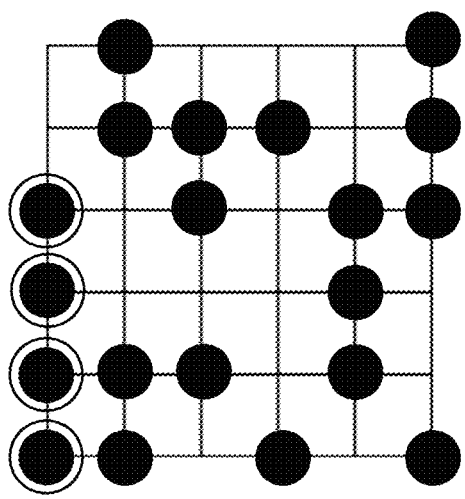

Row-by-ow rearrangement in two pairs of crossed AODs: According to some embodiments, a two sets of AOD pairs as described above can be used to generate a two-dimensional array of tweezers to load a 2D array. As shown in FIG. 16, two AOD pairs 1600A and 1600 B may be used. AOD pair 1600A may be include AODs 1610A, 1620A close to one another is used to generate a 2D set of traps 1630A. The relative angle between the two AODs 1610A, 1620A determines the relative orientation of the "rows" and "columns" of the 2D trapping pattern 1630, as discussed above. Atoms may be loaded into the set of traps generated in this way as discussed above with reference to AODs 1410 and 1420. Another pair of AODS 1600B (pair 2) is used to generate a different set of traps 1630B using AODs 1610B, 1620B. These traps can be overlapped with the traps generated with pair 1. This can be accomplished, for instance, by using an optical element 1660 such as, but not limited to, a semi-reflective surface (for example, a non-polarizing beam splitter), a surface which transmits one light polarization and reflects the perpendicular one (for example, a polarizing beam splitter), an optical element that transmits light at some wavelengths and reflects at others (for example, dichroic), or by having both sets of traps come from different directions and meet at their focal points. The set of traps used for rearrangement (pair 2) can be adjusted to create a stronger confinement than those used to load (pair 1), for instance, by having more optical power per beam, having a wavelength closer to the atomic resonance, or having a smaller focus (not extensive list, and combinations of these effects can be used). FIG. 17A shows an array of traps formed via AOD pair 1600A, where traps are line intersections and dots signify trapped atoms. Overlapping a line of traps (circles in FIG. 17B) generated with AOD pair 1600B on top of a "row" or "column" from the traps generated with AOD pair 1600A can allow all atoms within that "row" or "column" to be primarily controlled by the traps generated with AOD pair 1600B. Additionally, according to some embodiments, once traps from AOD pair 1600B have been overlapped with a "row" or "column", it is possible to turn off that particular "row" or "column" in AOD pair 1600A. The traps generated with AOD pair 1600B can now be rearranged using the procedure described for the 1D case (see FIG. 17C). After rearrangement, if the particular "row" or "column" from AOD pair 1600A which had been turned off, row 1 of AOD pair 1600A can then be turned back on. Turning off the traps generated with AOD pair 1600B can now allow the atoms to be held in their new positions by the underlying traps generated with AOD pair 1600A (see FIG. 17D). This procedure can now be repeated for a different "row" or "column" of traps generated with AOD pair 1600A, by changing the frequencies associated to the AODs in AOD pair 1600B, so that a new set of traps can be generated with AOD pair 1600B, which overlap with the new target "row" or "column" of traps generated with AOD pair 1600B. FIG. 17E shows the array after all rows have been shifted to the left using this procedure. It should be appreciated that where manipulation by AOD pair 1600B is only required in 1D, AOD pair 1600B may be replaced by a single AOD. This AOD (or AOD pair) may be referred to as a "control AOD" while the AOD pair 1600A that is used to maintain the traps may be referred to as a "hold AOD." According to some embodiment, the hold AOD may be treated as a set of pixels to be filled by control of the control AOD so as to create any desired pattern with resolution based on the hold AOD. According to some embodiments, trapped atoms are moved based on other configurations of the control AOD that do not correspond to entire rows or columns (for example, a square having atoms at each edge).

Figure 18A:
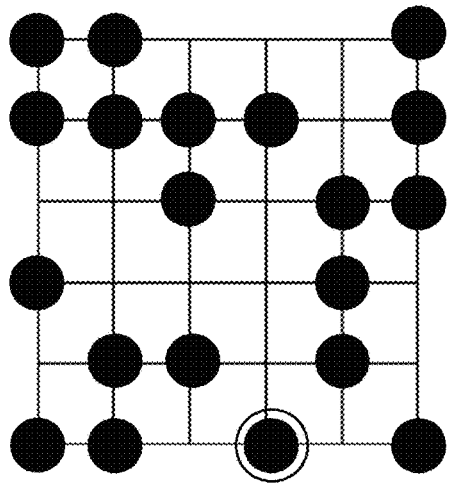
FIGS. 18A-18H show methods for two-dimensional ordering of atoms, according to some embodiments.
Figure 18B:
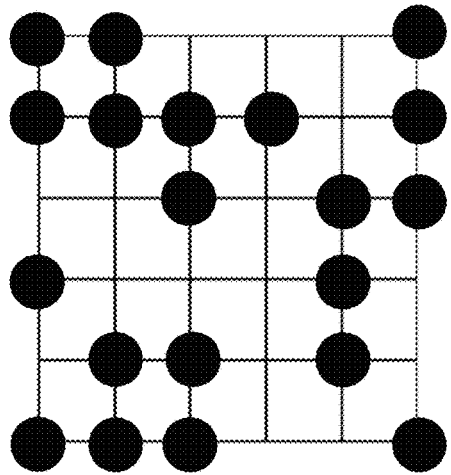
Figure 18C:
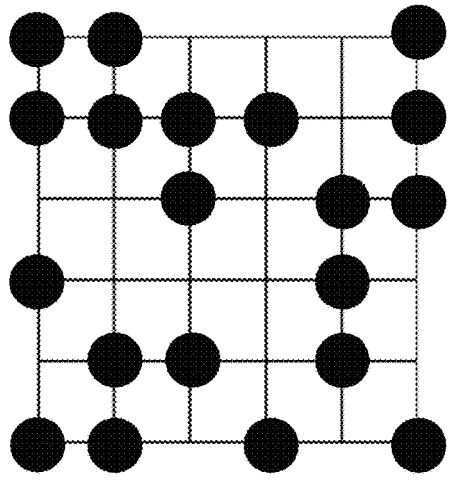
Figure 18D:
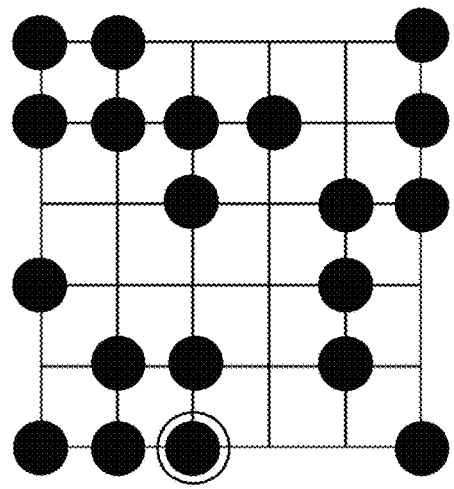
Figure 18F:
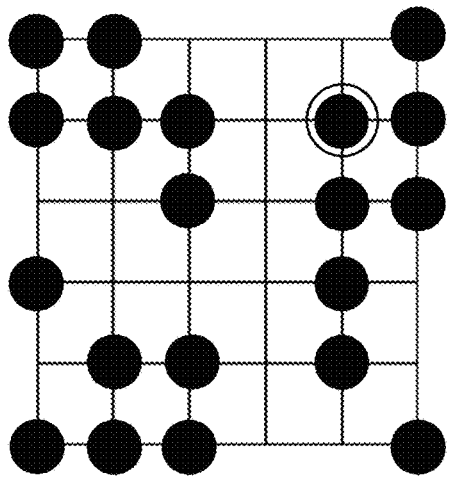
Figure 18H:
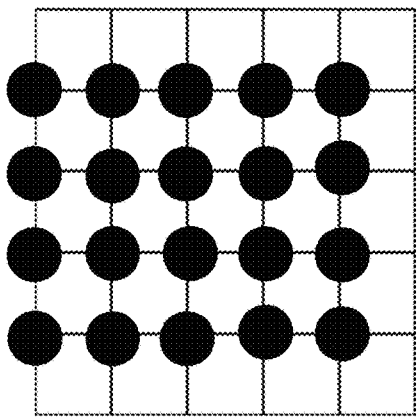
Figure 18E:
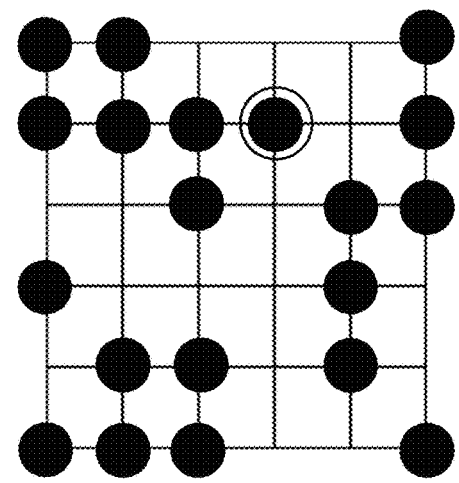
Figure 18G:
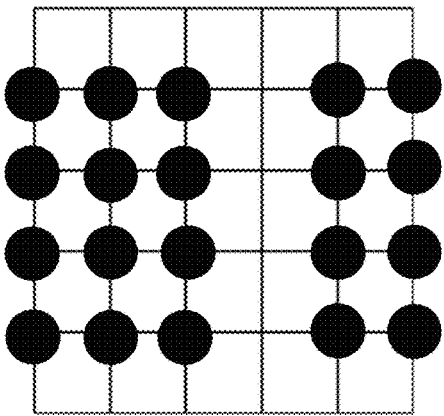

A similar procedure is shown with respect to FIGS. 18A-18H, but with movement of single atoms via a control AOD. As shown in FIG. 18A, a hold AOD has an initial set of atoms trapped therein. As shown in FIG. 18B, an individual atom is selected by the control AOD (shown with a circle). FIG. 18C shows the individual atom is moved by the control AOD, and then released by turning off control AOD in FIG. 18D. In FIG. 18E, another atom is selected, moved in FIG. 18F, and then released in FIG. 18G. FIG. 18H shows the array trapped in hold AOD after arrangement. The resulting array of atoms may have a higher yield.

According to some embodiments, the methods described above could also be conducted without turning off rows or columns of the hold AOD. Instead, the control AOD may be formed with deeper (stronger) traps than the hold AOD. Thus, when a trap of the control AOD that is overlapping a hold AOD trap is moved, the atom will follow the deeper trap of the control AOD as if it is not trapped by the hold AOD. However, if moved to another hold AOD trap followed by a shutdown of the control AOD trap, the atom may remain trapped by the hold AOD.

Figure 19B:
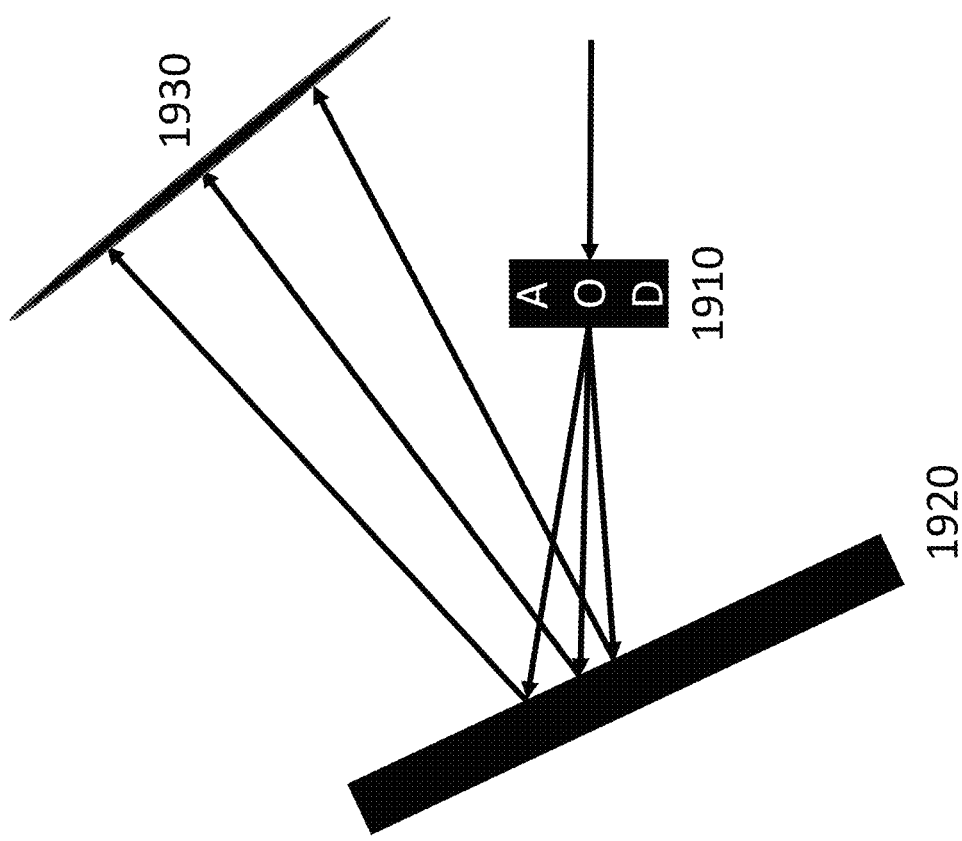
FIGS. 19A-19B show a system for two-dimensional ordering of atoms, according to an embodiment.
Figure 19A:
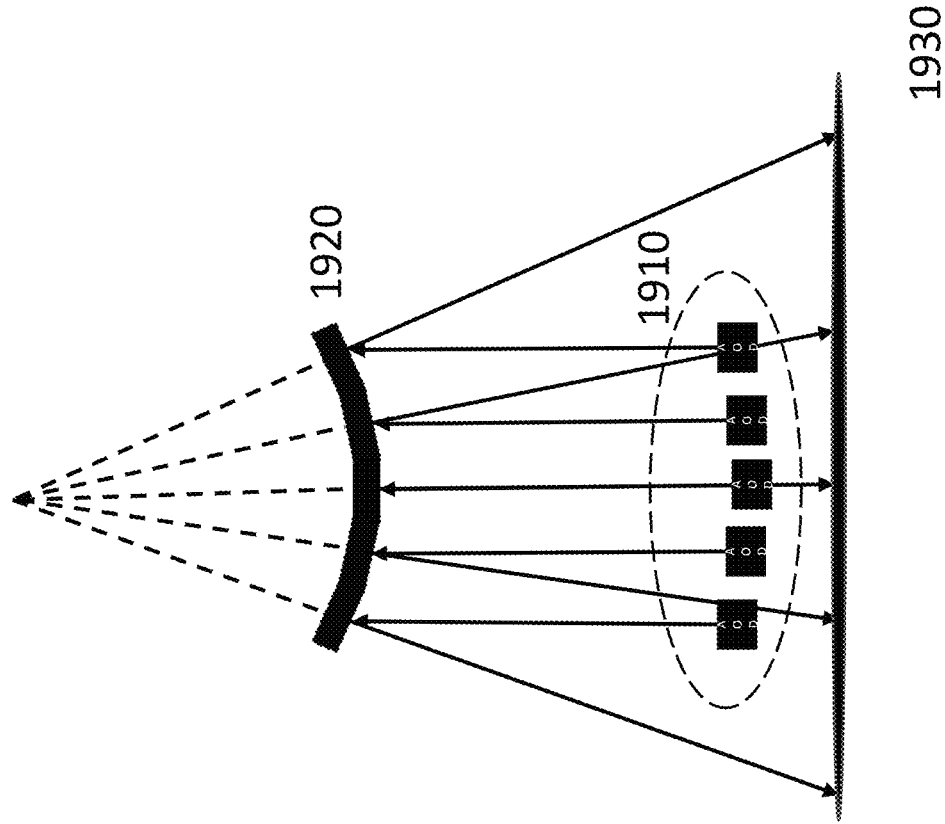

Stacked AODs: According to some embodiments, multiple (N) AODs may be stacked on top of one another. Multiple AODs can be used in parallel to generate independent 1D sets of traps in which to trap and rearrange atoms. FIGS. 19A and 19B show an exemplary system to combine the different 1D sets of traps into a 2D pattern. As shown in FIG. 19A, a set of 5 AODs 1910 viewed from a top angle are aligned so as to send light arrays to multifaceted reflective surface 1920. The light is then reflected of the multifaceted reflective surface 1920 to lens 1930, which focuses the beams of light. FIG. 19B shows the same elements with a side view. Multifaceted reflective surface 1920, can be, for example, a polished reflective substrate, a combination of several reflective surfaces, the previous two but with a non-reflective substrate coated in a reflective material, a deformable mirror or mirror array (list is not extensive). Each 1D set of traps from AODs 1910 can be redirected via multifaceted reflective surface 1920. A transmissive multifaceted surface with controllable index of refraction may also be used, such as, a dielectric of variable density or width, or a patterned dielectric with holes or with alternating sections with distinct indices of refraction, or other suitable surfaces. Such a structure can be used to create a wavefront equivalent to that of multiple beams overlapping in a well-defined volume. Lens 1930 may be used to focus all beams onto a desired plane. Using N independent AODs 1910, each creating an independent 1D pattern of traps, it is possible to load atoms into such traps, and rearrange each independent 1D set of traps in a desired way to position atoms in a desired pattern. The rearrangement of all 1D sets of traps can happen simultaneously, or in any desired order.

FIGS. 20A-20C show methods of operating the system of FIGS. 19A-19B, according to some embodiments. As shown in FIG. 19A, a 6×6 array of traps is produced. N rows correspond to 1D AODs 2010A-2010N (in this case 6). The independent 1D sets of traps from AODs 2010A-2010N are indicated by small empty circles connected by a straight line and atoms are indicated by filled circles. As shown in FIG. 19B, the square 6×6 array of traps is randomly loaded. As shown in FIG. 19C, the traps are rearranged to collect all atoms on the left of each 1D set of traps. Rearrangement may occur by adjusting the tone frequencies associated with the traps for each of AODs 2010A-2010N. It should be appreciated that these individual AOD arrays may be implemented as the control and/or hold AODs as described above.

Figure 21A:
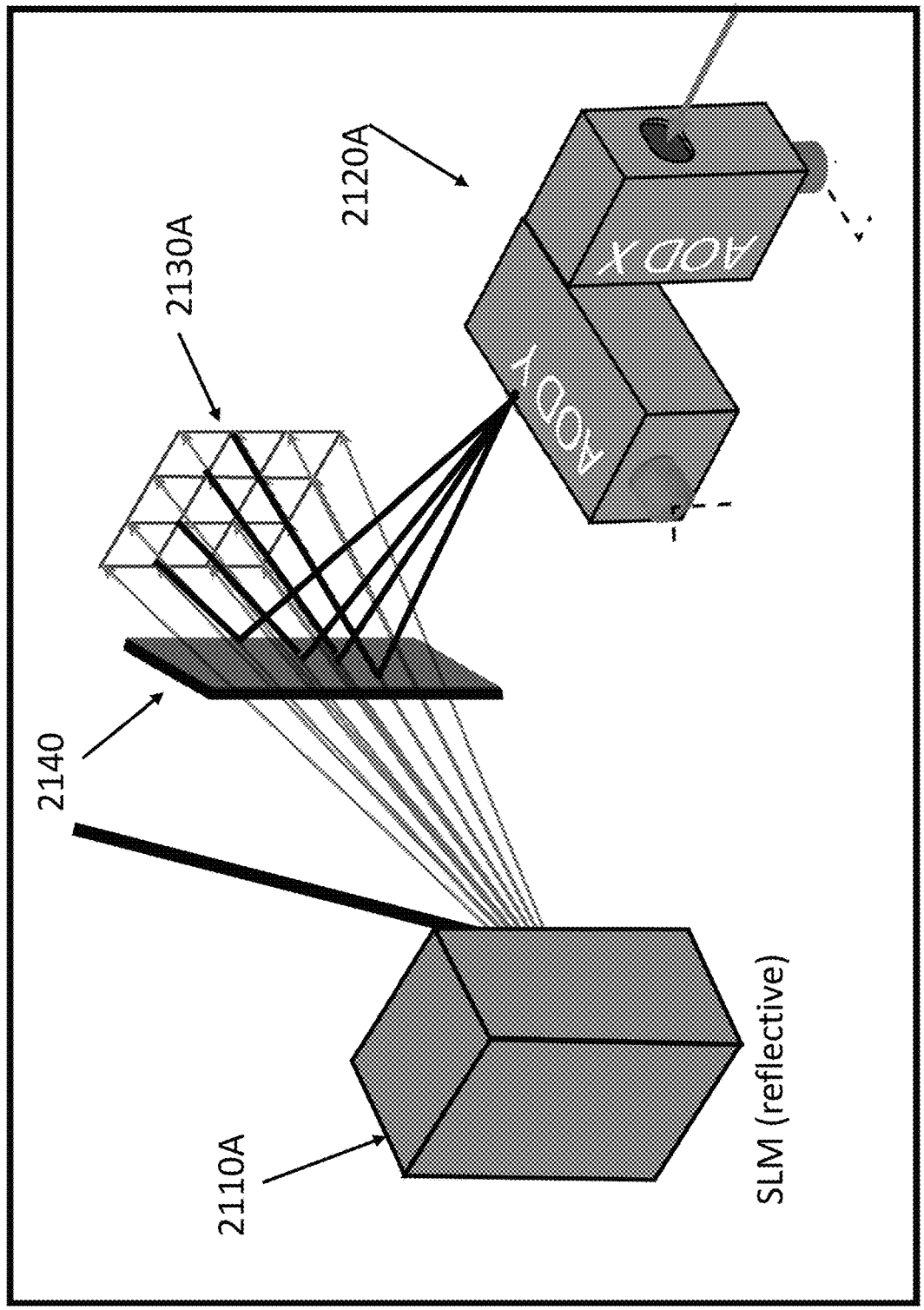
FIGS. 21A-21B show methods for two-dimensional ordering of atoms, according to some embodiments.
Figure 21B:
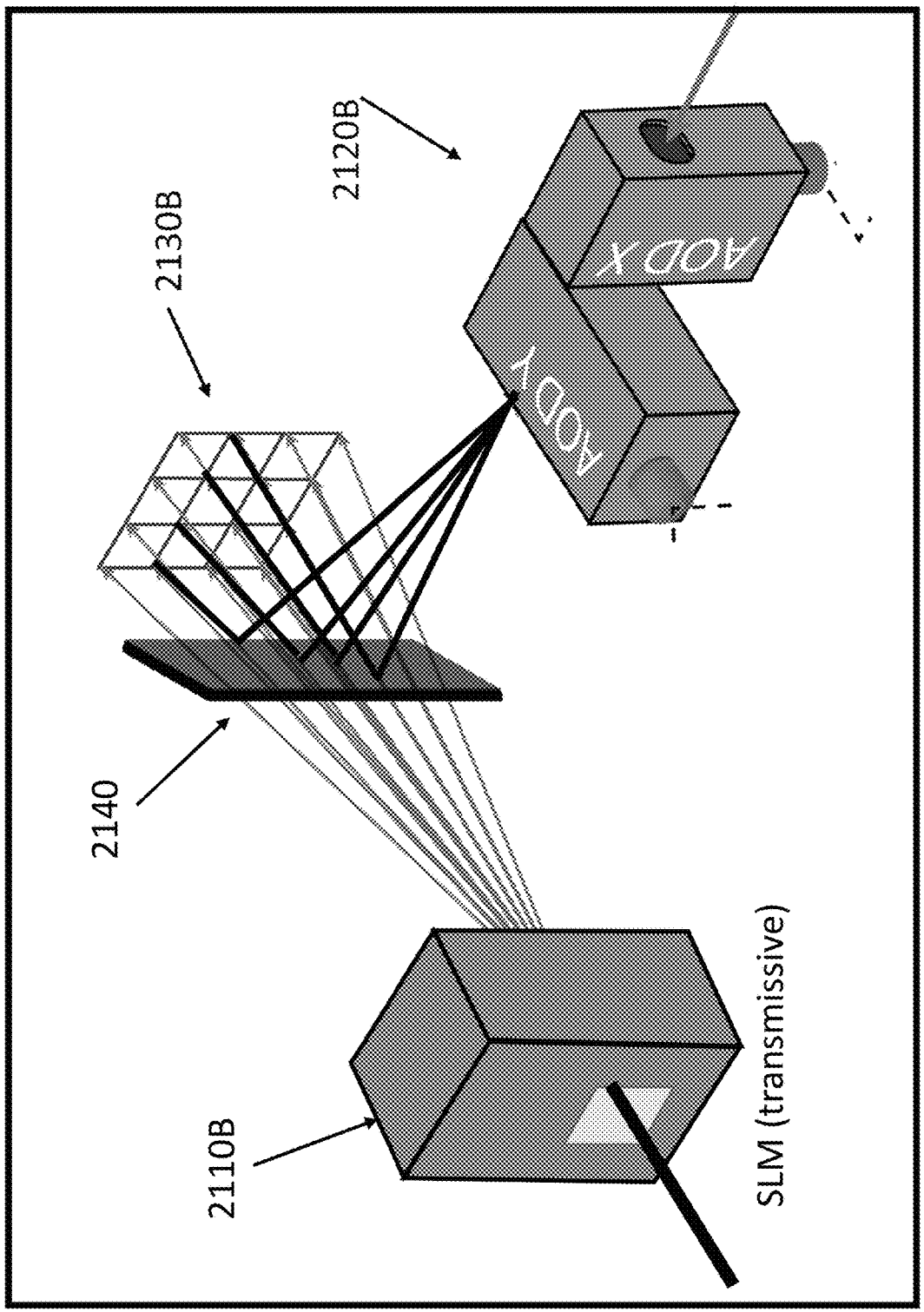

Trap generation in SLM and rearrangement with crossed AODs: According to some embodiments, a spatial light modulator (SLM) may be used to generate a 2D array of traps. The SLM can be used to modify the wavefront of a light beam to generate arbitrary spatial patterns of light intensity that may be used in place of a hold AOD as described above as a hold trap array. There exist different types of SLMs, which affect the local intensity (example: digital micromirror device, DMD), phase (Liquid Crystal On Silicon, LCOS), or both, of the transmitted or reflected light field to alter its wavefront in a programmable way. Using such a device, a 2D pattern of traps with arbitrary geometries can be generated, and atoms can be loaded into the set of traps generated in this way, such as via a control AOD or control AODs as discussed above. FIG. 21A shows an embodiment where a reflective SLM 2110A is used as a hold SLM, and a pair of AODs 2120A is used to manipulate the position of atoms in the array 2130A. FIG. 22B shows an embodiment where a transmissive SLM 2110B is used as a hold SLM, and a pair of AODs 2120B is used to manipulate the position of atoms in the array 2130B. According to some embodiments, the pair of AODs 2120A or 2120B can be used to generate a different set of traps that are loaded with atoms. The traps 2130A or 2130B shown in FIGS. 22A and 22B can be overlapped with the traps generated with the SLM. This can be accomplished, for instance, by an element 2140, such as a semi-reflective surface (example: non-polarizing beam splitter), a surface which transmits one light polarization and reflects the perpendicular one (example: polarizing beam splitter), an optical element that transmits light at some wavelengths and reflects at others (example: dichroic), or by having both sets of traps come from different directions and meet at their focal points. The set of traps used for rearrangement generated with the AOD 2120A or 2120B can be adjusted to create a stronger confinement than those generated with the SLM 2110A or 2110B used to load, for instance, by having more optical power per beam, having a wavelength closer to the atomic resonance, and/or having a smaller focus (not extensive list, and combinations of these effects can be used). Overlapping a line of traps generated with the AOD pair 2120A or 2120B on top of a subset of the traps generated with SLM 2110A or 2110B, can allow all atoms within that subset to be primarily controlled by the traps generated with the AOD pair. The traps generated with the AOD pair 2120A or 2120B can thus be rearranged within the 2D plane of traps to overlap them either simultaneously, or sequentially, with other traps generated by the SLM 2110A or 2110B. Turning off the specific traps generated with the AOD pair 2120A or 2120B, while they are overlapped with other traps generated by the SLM 2110A or 2110B, can allow the atoms to be held in their new positions by the underlying traps generated the SLM 2110A or 2110B. This procedure, which mimics that shown in FIGS. 17A-18D or 18A-18H if the SLM 2110A or 2110B is regular in spacing between traps, can be repeated for a different subset of traps generated by the SLM 2110A or 2110B, by changing the frequencies associated to the AOD pair, so that a new set of traps can be generated with the AOD pair 2120A or 2120B, which overlap with the new target subset of traps generated with the SLM 2110A or 2110B.

Figure 22D:
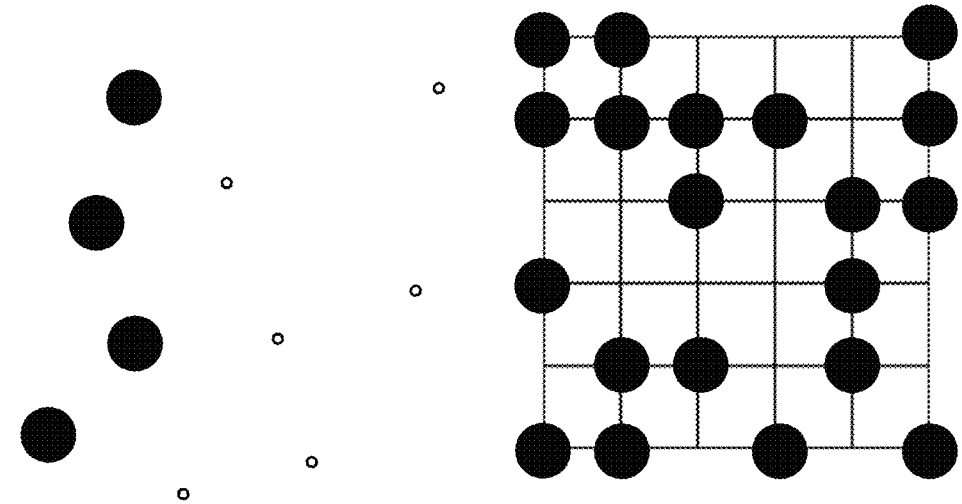
FIGS. 22A-22P show systems for two-dimensional ordering of atoms, according to some embodiments.
Figure 22C:
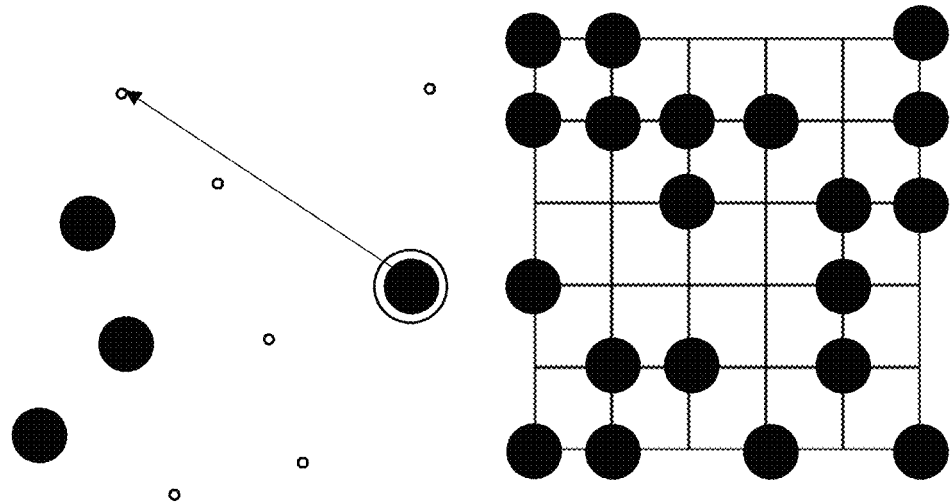
Figures 22E, 22F:
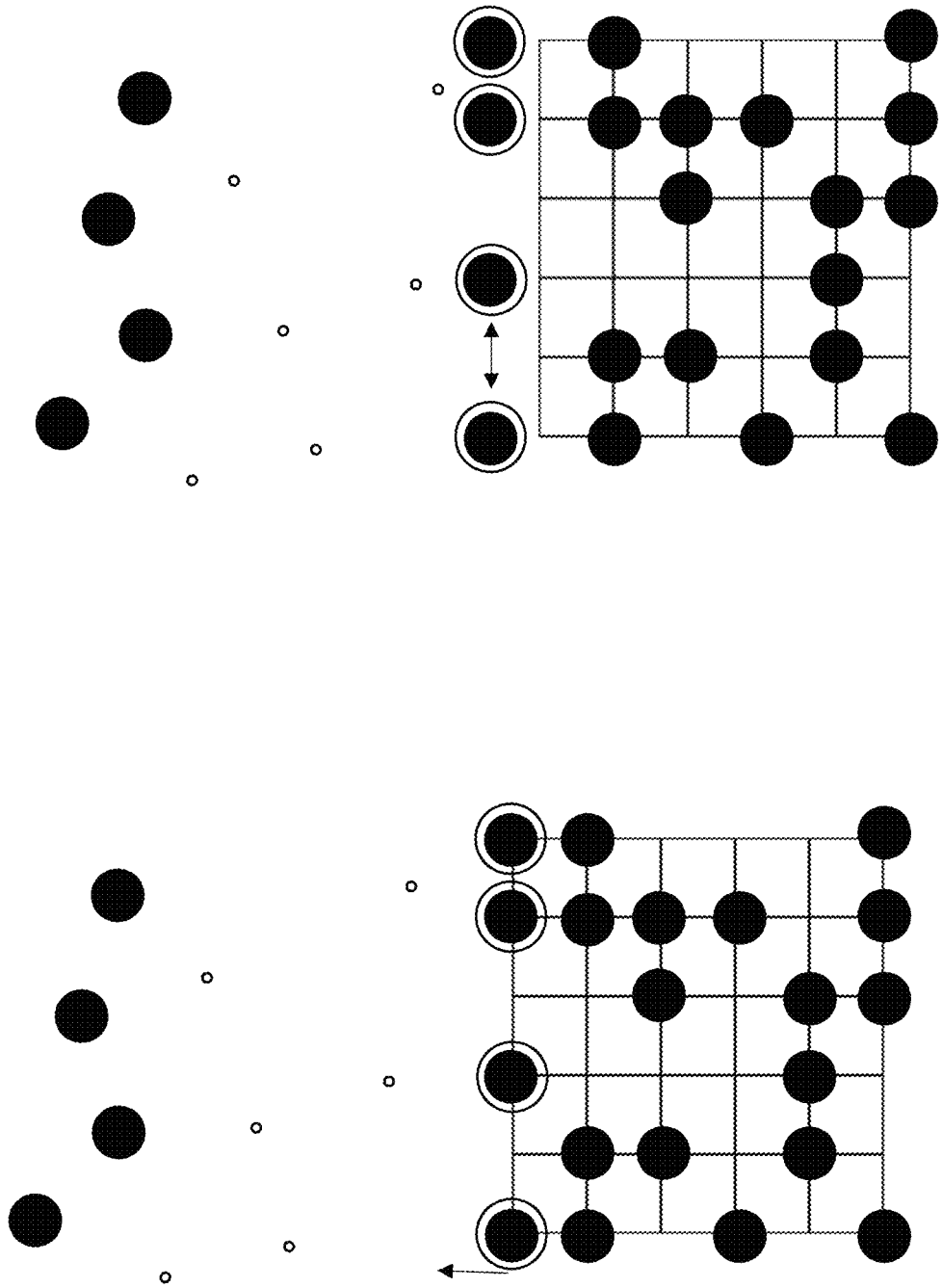
Figure 22H:
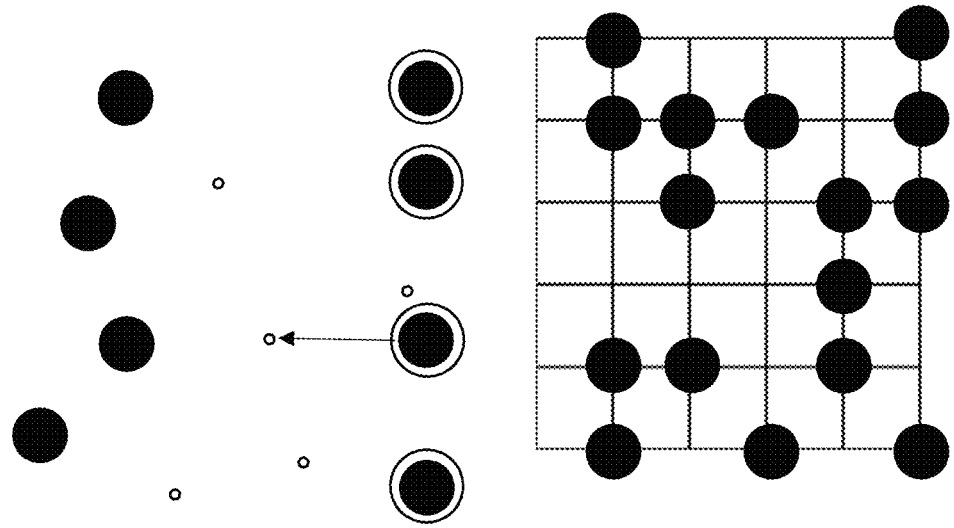
Figure 22G:
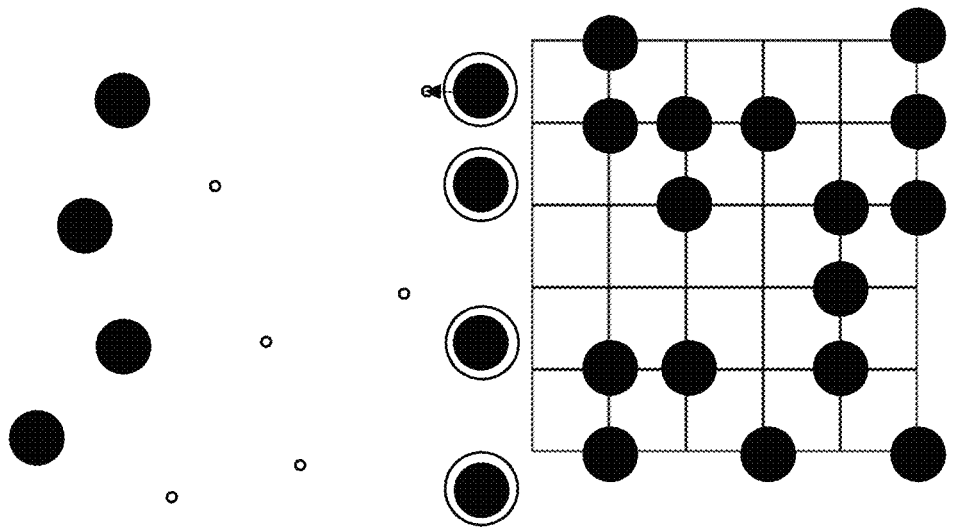
Figure 23:
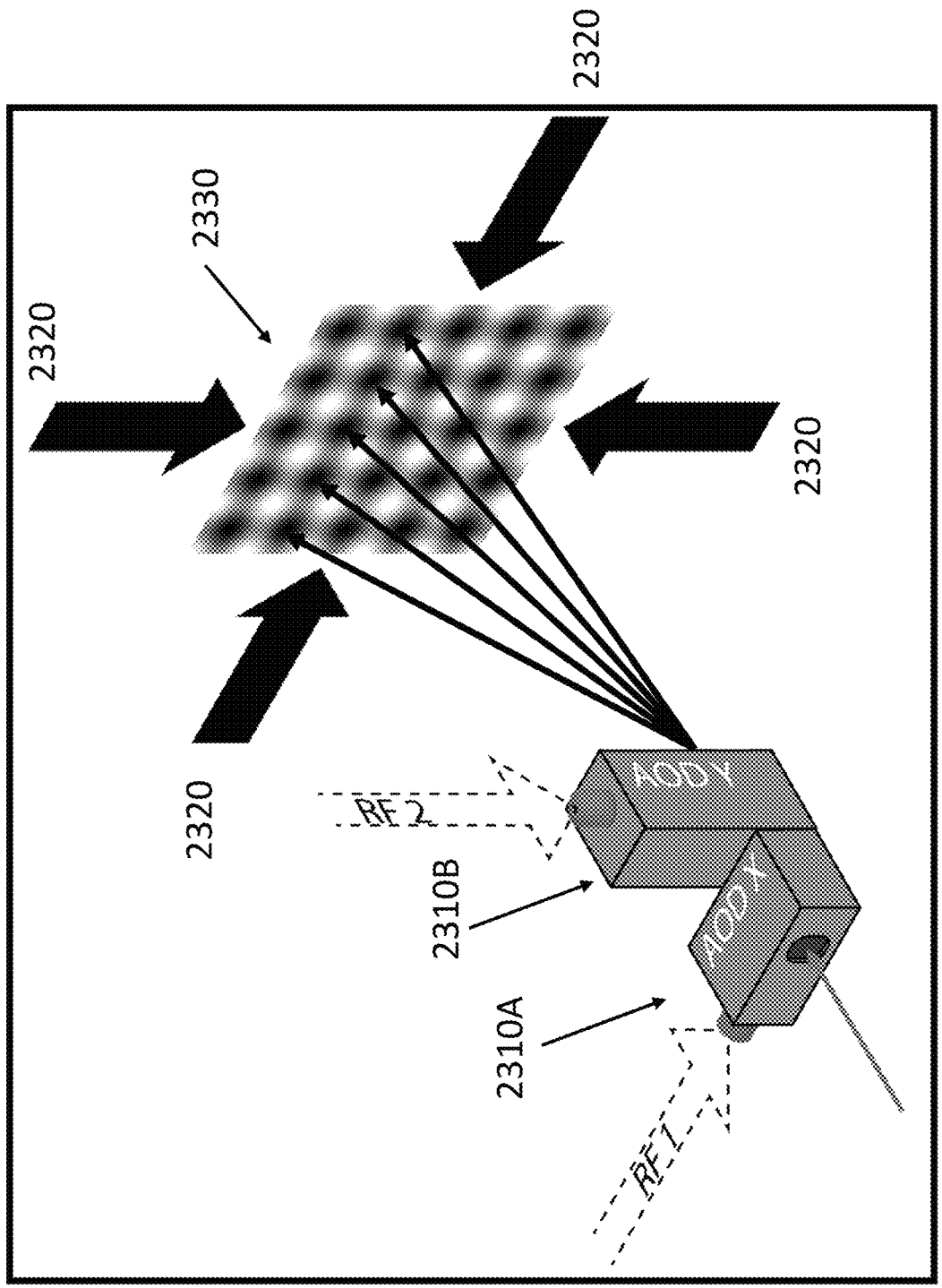
FIG. 23 shows a system for two-dimensional ordering of atoms, according to an embodiment.
Figure 25B:
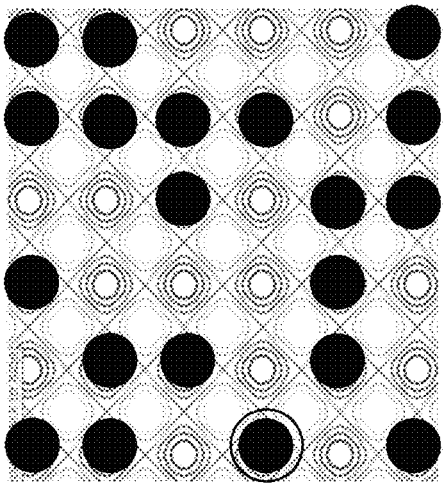
FIGS. 25A-25H show methods for two-dimensional ordering of atoms, according to some embodiments.
Figure 25D:
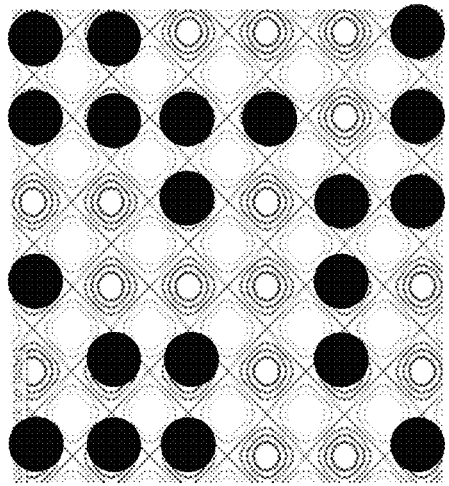
Figure 25A:
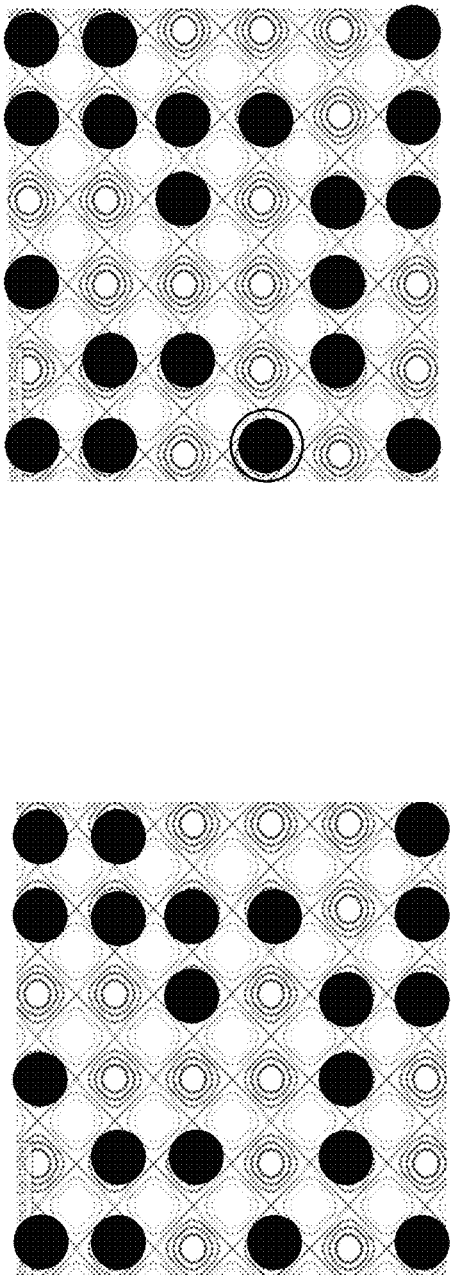
Figure 25C:
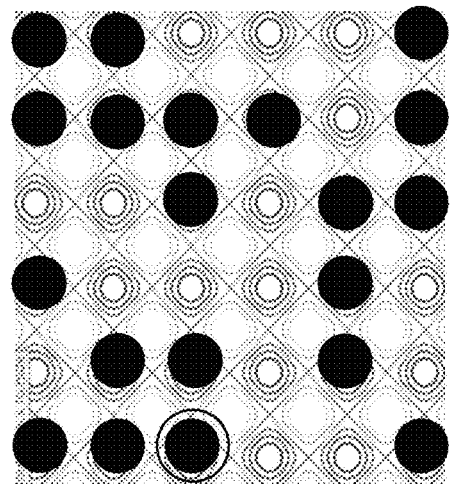
Figure 25F:
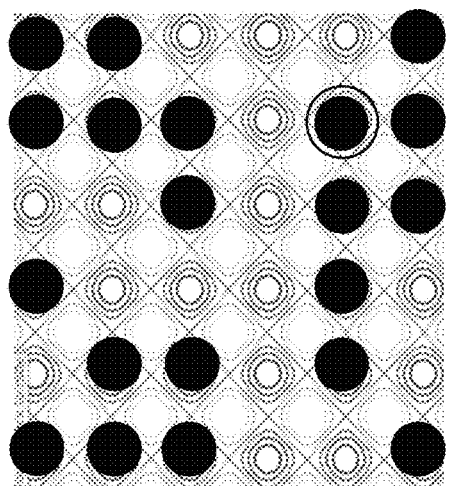
Figure 25H:
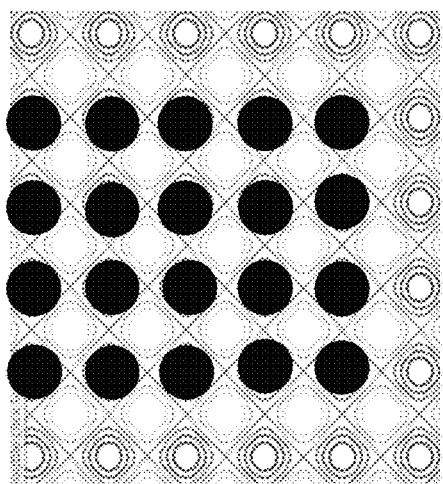
Figure 25E:
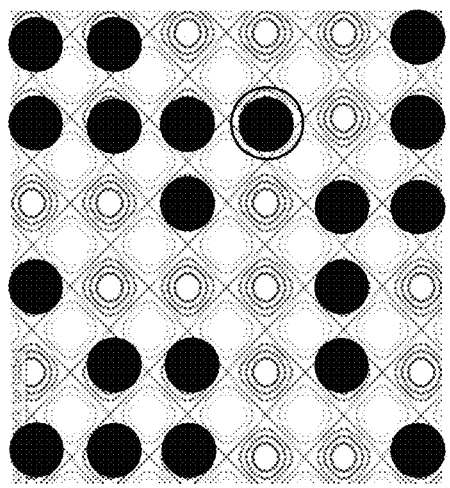
Figure 25G:
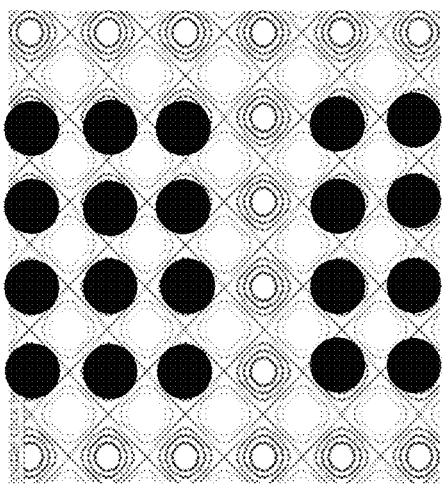
Figure 26:
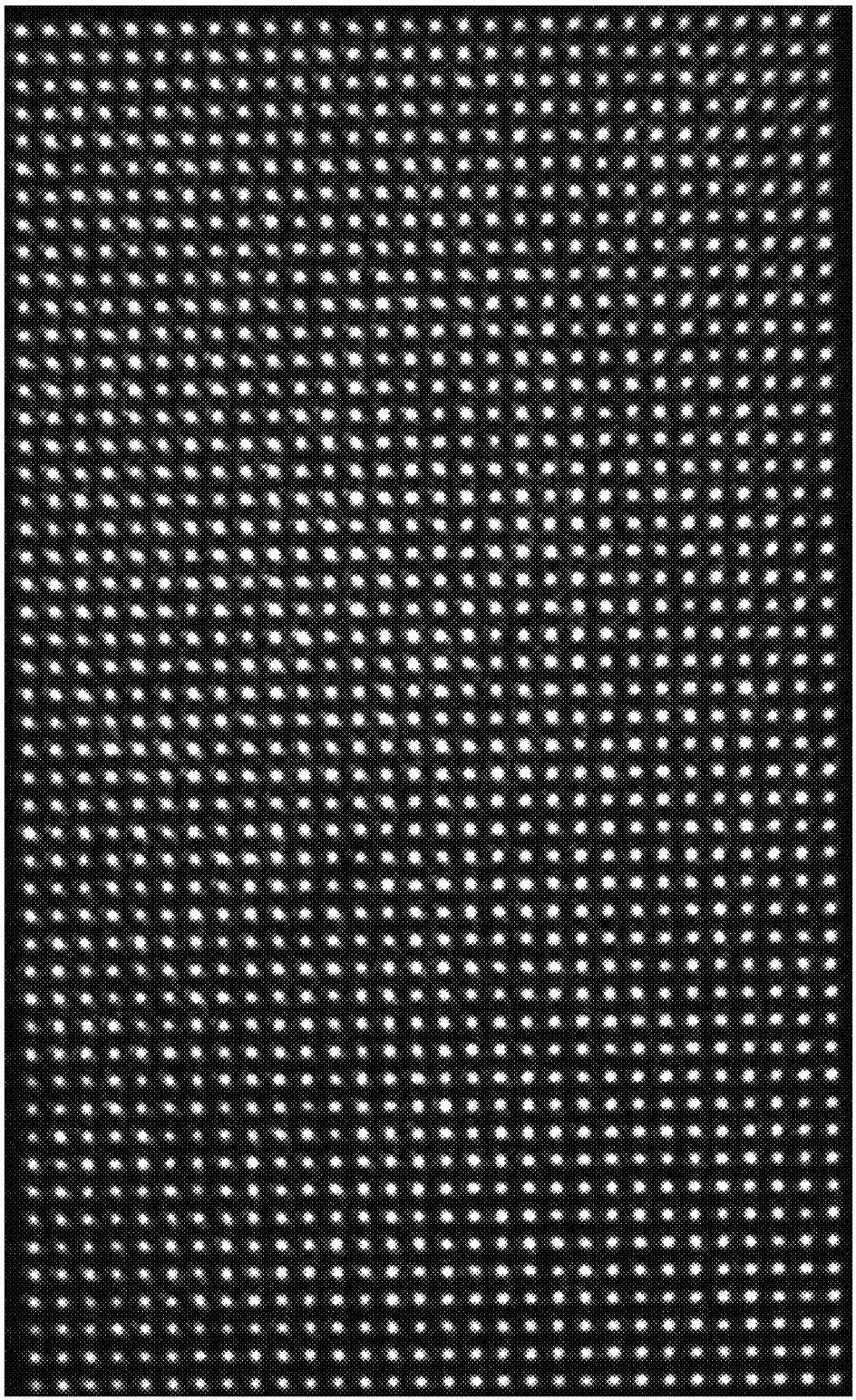
FIG. 26 shows an image of an array of traps generated with an SLM, according to an embodiment.
Figure 27:
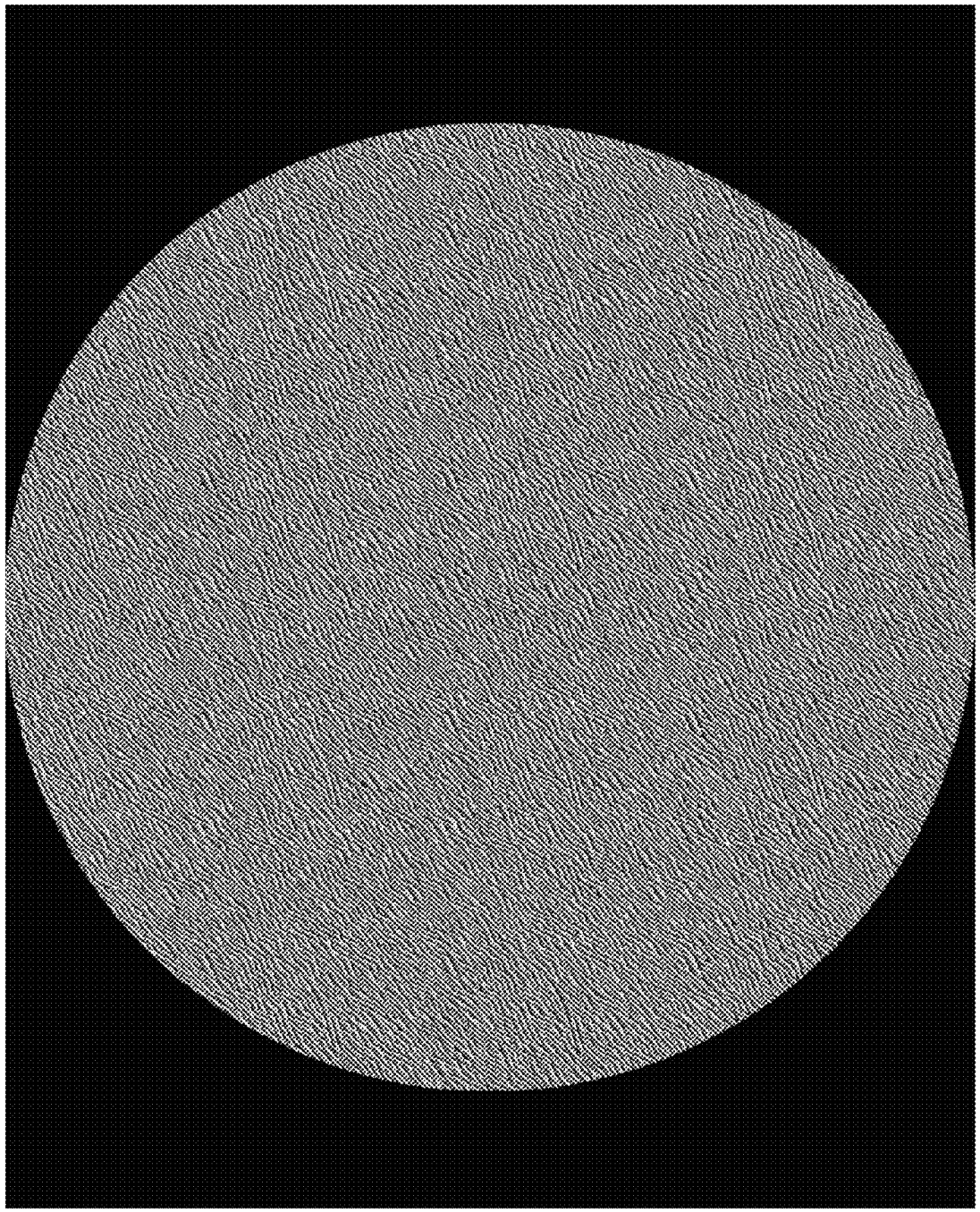
FIG. 27 shows a spatial phase pattern, according to an embodiment.

According to some embodiments, the position of the traps in the SLM 2110A or 2110B includes separate arbitrary and regular positions. FIG. 22A shows a pattern generated by the arbitrary portion of SLM 2110A or 2110B, which is indicated by small empty circles near the top. Furthermore, the array of atoms trapped in the regular portion of SLM 2110A or 2110B is shown below (the distance between the two may or may not be to scale). The position of the traps in the regular array is indicated by the intersection of straight lines and atoms are indicated by filled circles. According to some embodiments, a control AOD may be used (shown as large empty circles) to reposition the atoms in the arbitrary array as shown in FIGS. 22A-22D, and to take atoms from the regular array and move them to the arbitrary array for repositioning as shown in FIGS. 22E-22P. Note that multiple atoms may be moved from the regular portion for placement in the irregular portion and the same time, as shown in FIGS. 22E-22F and 22L-22M. After moving to the irregular portion, the horizontal spacing between the controlled atoms may first be adjusted, as shown in FIGS. 22F and 22M-N. FIG. 26 shows an exemplary instance of a 30×50 regular array of traps generated with a reflective LCOS-SLM, with the corresponding phase pattern imprinted on the wavefront of reflected light beam by the LCOS-SLM. FIG. 27 shows a corresponding spatial phase pattern added to the laser light field to transform a single input beam into a 30×50 array of traps Generate Optical Lattice and Use Traps to Rearrange Atoms within it:

According to some embodiments, a 2D trap array may instead be generated by using a large-lattice-spacing optical lattice. The interference from two light sources can create patterns of light intensity, which can be used to trap cold neutral atoms, which are called optical lattices. These traps may function in place of the hold AOD as a hold trap array. Thus, the optical lattice can be used to hold trapped atoms and combined with, for example, a control AOD as discussed above in order to rearrange atoms within the optical lattice, such as with the methods and systems described with respect to FIGS. 17A-17E (shown similarly in FIGS. 24A-24E) and 18A-18H (shown similarly in FIGS. 25A-25H). As shown in FIG. 23, light sources 2320 may create an interference form 2330 that forms a hold trap array. AODs 2310A, 2310B may be used to manipulate trapped atoms in the interference form 2330. The pair of AODS is used to generate a set of traps. These traps can be overlapped with the trapping regions of the optical lattice. This can be accomplished, for instance, by using a semi-reflective surface (example: non-polarizing beam splitter), a surface which transmits one light polarization and reflects the perpendicular one (example: polarizing beam splitter), an optical element that transmits light at some wavelengths and reflects at others (example: dichroic), or by having both sets of traps come from different directions and meet at their focal points. The set of traps used for rearrangement can be adjusted to create a stronger confinement than that provided by the optical lattice used to load, for instance, by having more optical power per beam, having a wavelength closer to the atomic resonance, or having a smaller focus (not extensive list, and combinations of these effects can be used). Overlapping a line of traps generated with the AOD pair on top of a "row" or "column" from the optical lattice, can allow all atoms within that "row" or "column" to be primarily controlled by the traps generated with the AOD pair. The traps generated with the AOD pair can be rearranged using the procedure described for the 1D case. Turning off the traps generated with the AOD pair can allow the atoms to be held in their new positions by the underlying optical lattice. This procedure can be repeated for a different "row" or "column" of the optical lattice, by changing the frequencies associated to the AODs, so that a new set of traps can be generated with the AOD pair, which overlap with the new target "row" or "column" of the optical lattice.

Section 2. Excitation and Evolution

According to an embodiment, the arranged atom arrays may then be excited and evolved to compute the answer to the encoded problem. Lasers with photon energy approximately equal to a transition energy of an outermost electron of the atoms may be used to excite the outermost electrons in the atoms so as to transition the atoms into an excited state. Particular laser control and application techniques are described in more detail in the present disclosure. Interactions between the atoms may be so strong that only some of the atoms, and in particular, only some of the atoms in particular regions may transition into an excited state. For example, proximity to another excited atom may increase the excitation energy of a nearby non-excited atom such that a transition of the nearby atom is unlikely. The likelihood of a transition of the atoms may be controlled initially by the distances between individual atoms. According to an embodiment, the exited atoms may be diffused away from the traps, and the remaining atoms may be imaged in order to determine which of the atoms did not become excited. This final result can produce a solution to the encoded problem.

According to an embodiment, atom-by-atom assembly may be used to deterministically prepare arrays of individually trapped cold neutral $^{87}$Rb atoms in optical tweezers. As show in FIG. 1A, controlled, coherent interactions between atoms 190 may be introduced by coupling them to Rydberg states. This results in repulsive van der Waals interactions ($V_i = C/R^6$, $C>0$) between Rydberg atom pairs at a distance $R_{ij}$. The quantum dynamics of this system is described by the following Hamiltonian Equation (1):

$$\frac{\mathcal{H}}{h} = \sum_i \frac{\Omega_i}{2}\sigma_x^i - \sum_i \Delta_i n_i + \sum_{i<j} V_{ij} n_i n_j \quad (1)$$

where $\Omega i$ are the Rabi frequencies associated with individual atoms, $\Delta i$ are the detunings of the driving lasers from the Rydberg state (see FIG. 1B), $\sigma i=|gi\rangle\langle ri|+|ri\rangle\langle gi|$ describes the coupling between the ground state $|g\rangle$ and the Rydberg state $|r\rangle$ of an atom at position i, and $ni=|ri\rangle\langle ri|$. In general, within this platform, control parameters $\Omega i$, $\Delta i$ may be programmed by changing laser intensities and detunings in time. According to an embodiment, homogeneous coherent coupling may be used ($|\Omega i|=\Omega$, $\Delta i=\Delta$). The interaction strength Vij may be tuned by either varying the distance between the atoms or carefully choosing the desired Rydberg state.

Figure 1F:
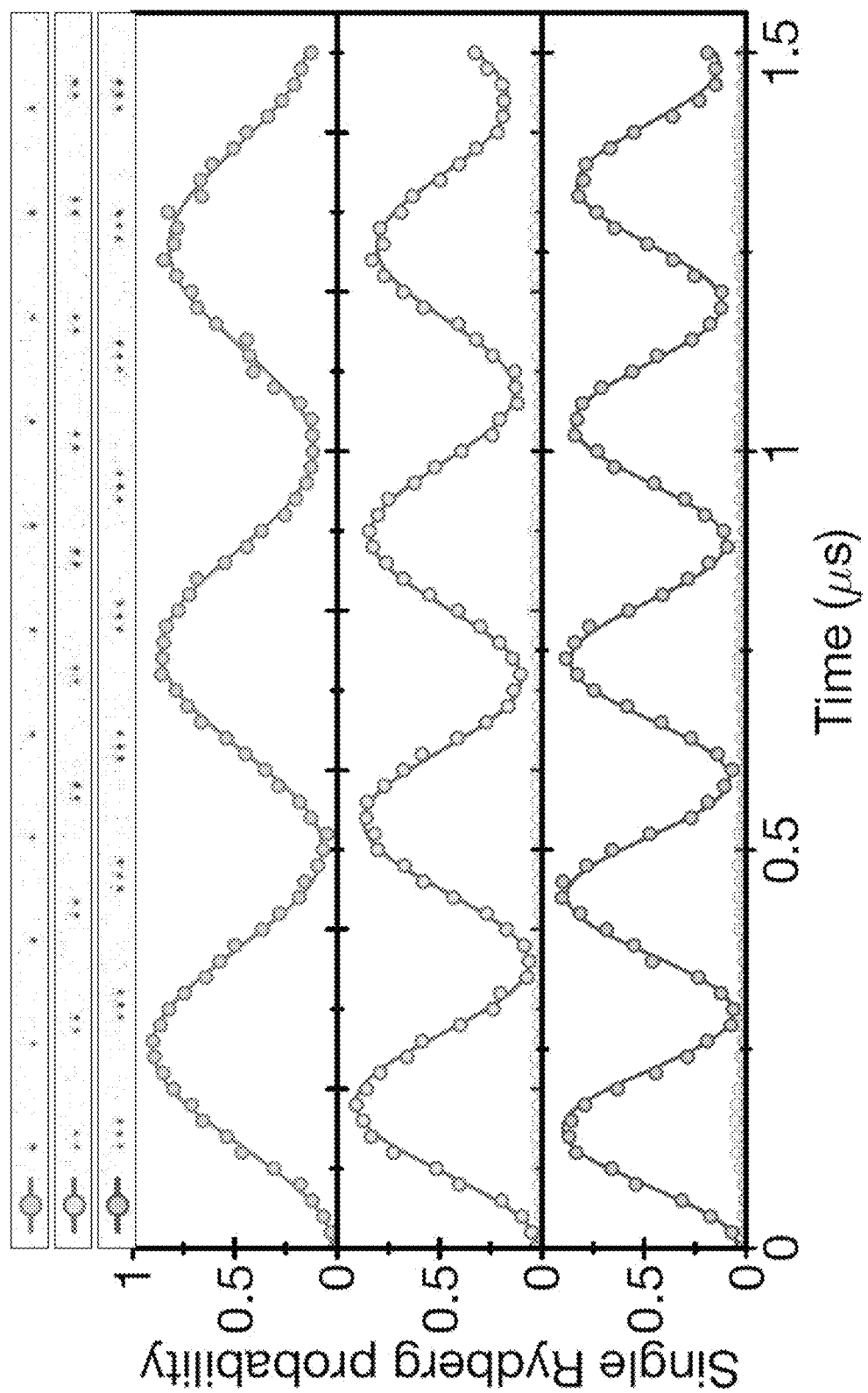

The ground state $|g\rangle$ and the Rydberg state $|r\rangle$ can be used as qubit states to encode quantum information. The coherent coupling between these states is provided by the laser light and allows for manipulation of the qubits. Furthermore, the Rydberg states of multiple atoms strongly interact with each other, enabling engineered, coherent interactions. These strong, coherent interactions between Rydberg atoms can provide an effective constraint that prevents simultaneous excitation of nearby atoms into Rydberg states. FIG. 1F shows such an effect, which is also sometimes called Rydberg blockade. When two atoms are sufficiently close so that their Rydberg-Rydberg interactions Vij exceed the effective Rabi frequency R, then multiple Rydberg excitations can be suppressed. This provides the Rydberg blockade radius, Rb, for which Vij=$\Omega$(Rb=9 µm for $|=|r\rangle=|70S\rangle$ and $\Omega=2\pi\times2$ MHz as used here). In the case of resonant driving of atoms separated by a distance of a=24 µm, we observe Rabi oscillations associated with non-interacting atoms as shown in the top curve of FIG. 1F. However, the dynamics change significantly as we bring multiple atoms close to each other (a=2.95 µm<Rb). In this case, Rabi oscillations between the ground state and a collective W-state with exactly one excitation $\sim \sum_i \Omega_i |g_1 \ldots r_i \ldots g_N\rangle$ with the characteristic $N^{1/2}$-scaling of the collective Rabi frequency can be observed. These observations allow quantification of the coherence properties of the system. In particular, the contrast of Rabi oscillations in FIG. 1F is mostly limited by the state detection fidelity (93% for r and 98% for g). The individual Rabi frequencies and detunings are controlled to better than 3% across the array, while the coherence time is ultimately limited by the probability of spontaneous emission from the state $|e\rangle$ during the laser pulse (scattering rate 0.022/µs).

As shown in FIG. 1A, individual $^{87}$Rb atoms are trapped using optical tweezers and arranged into defect-free arrays. Coherent interactions Vij between the atoms are enabled by exciting them to a Rydberg state, with strength $\Omega$ and detuning $\Delta$.

FIG. 1B shows a two photon process can be used to couple the ground state $|g\rangle=|5S_{1/2}, F=2, mF=-2\rangle$ to the Rydberg state $|r\rangle=|71S_{1/2}, J=\frac{1}{2}, m=-\frac{1}{2}\rangle$ via an intermediate state $|e\rangle=|6P_{3/2}, F=3, m_F=-3\rangle$ using circularly polarized 420 nm and 1013 nm lasers (typically $\delta\sim2$ $\pi\times560$ MHz»$\Omega_B$, $\Omega_R\sim2$ $\pi\times60$, 36 MHz).

As shown in FIG. 1C, the experimental protocol may include loading the atoms into a tweezer array (1) and rearranging them into a preprogrammed configuration (2). After this, the system may evolve under U (t) with tunable parameters $\Delta$(t), $\Omega$(t), Vij. This can be implemented in parallel on several non-interacting sub-systems (3). The final state can be detected by a suitable technique, such as using fluorescence imaging (4).

As shown in FIG. 1F, for resonant driving ($\Delta=0$), isolated atoms (top points) display Rabi oscillations between $|g\rangle$ and $|r\rangle$. Arranging the atoms into fully blockaded clusters N=2 (as shown in the middle plot) and N=3 (as shown in the bottom plot) atoms result in only one excitation being shared between the atoms in the cluster, while the Rabi frequency is enhanced by $N^{1/2}$. Multiple excitations (middle and bottom points) are strongly suppressed. Error bars indicate 68% confidence intervals (CI) and are smaller than the marker size.

Section 2.A: Exemplary Control and Evolution of 1D Arrays of Atoms

Finding ways to engineer and control large quantum systems is a major challenge to quantum computing. The control and evolution examples discussed below allow for arrays of up to 51 atoms or more, which can serve as qubits, with a very large amount of controllability and engineered, coherent interactions between them. Furthermore, as discussed in the present disclosure, this system lends itself well for scaling up to larger numbers of atoms as well as controllability at the single atom level. The techniques and experiments described in the present disclosure show that engineering and controlling such large quantum systems is possible. Such control is required for performing quantum simulations. Such quantum simulations can be used to solve other real-world problems, for example finding new materials (a famous example is high temperature super conductivity), understanding complex molecule structures and designing new once. Other applications include optimization problems, such as the maximum independent set problem discussed in more detail below. These optimization problems map directly to real world problems.

According to some embodiments, Rydberg crystals, or controlled arrays of Rydberg atoms, can be created as discussed in more detail below. These Rydberg crystals provide a good test-bed for the large quantum systems produced using the methods and systems discussed herein. In general, it is very hard to characterize a large quantum system due to the exponentially increasing complexity as the system size is increased. Since the solution to the ordered state of the Rydberg crystal is known, creation and characterization of Rydberg crystals provide for benchmarking of the systems and techniques used to create and manipulate the Rydberg crystals. As discussed below, these systems and methods demonstrate coherent control and that this large quantum system (the Rydberg crystal) shows a high degree of coherence. In addition, it is demonstrated that the Rydberg crystals created and controlled using the systems and methods described herein have special quantum states that show surprisingly robust dynamics as they are driven out of equilibrium. This unique property is discussed in more detail below.

Figures 2A, 2B:
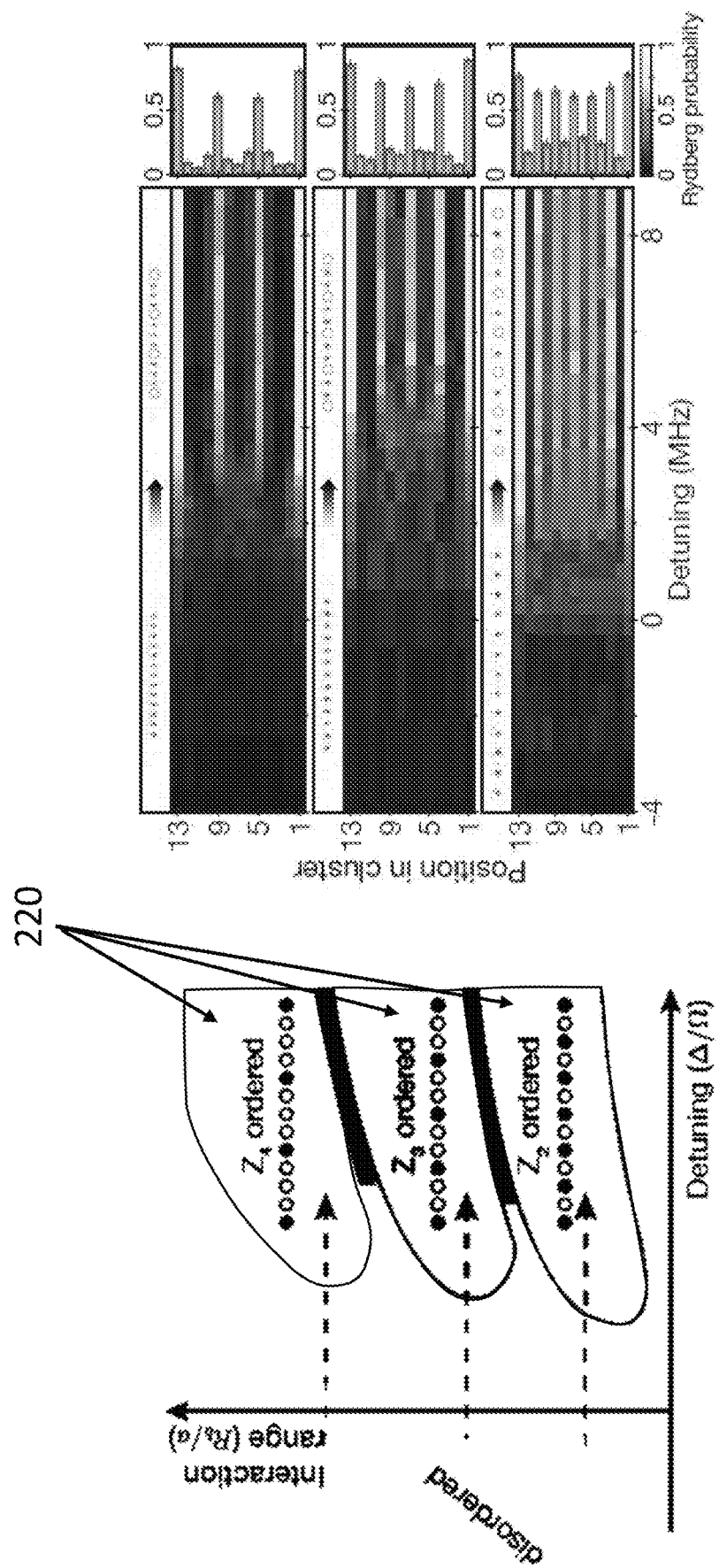
FIGS. 2A-B show a phase diagram and buildup of crystalline phases, according to some embodiments.

According to some embodiments, arranged 1D arrays of atoms may be excited and evolved to produce solutions to quantum computing problems and may be used as a quantum simulator. Described below are techniques for exciting and controlling a 1D array of atoms, as well as characterization of the interaction between the atoms. In the case of homogeneous coherent coupling, the Hamiltonian Equation (1) closely resembles the paradigmatic Ising model for effective spin-1/2 particles with variable interaction range. Its ground state exhibits a rich variety of many-body phases that break distinct spatial symmetries, as shown in FIG. 2A. For example, at large, negative values of $\Delta/\Omega$ its ground state corresponds to all atoms in the state g, corresponding to paramagnetic or disordered phase. As $\Delta/\Omega$ is increased towards large positive values, the number of atoms in r rises and interactions between them become significant. This gives rise to spatially ordered phases where Rydberg atoms are regularly arranged across the array, resulting in 'Rydberg crystals' with different spatial symmetries as shown in FIG. 2A. The origin of these correlated states can be understood by first considering the situation when $V_{i,i+1} \gg \Delta \gg \Omega \gg V_{i,+2}$, i.e. blockade for neighboring atoms but negligible interaction between second-next neighbors. In this case, the Rydberg blockade reduces nearest-neighbor excitation, while long-range interactions are negligible, resulting in a Rydberg crystal breaking $Z_2$ translational symmetry that is analogous to antiferromagnetic order in magnetic systems. Moreover, by tuning the parameters such that $V_{i,i+1}, V_{i,i+2} \gg \Delta \gg \Omega \gg V_{i,i+3}$ and $V_{i,i+1}, V_{i,i+2}, V_{i,i+3} \gg \Delta \gg V_{i,i+4}$, arrays with broken Z3 and Z4 symmetries may be obtained, respectively, as shown in FIG. 2A. The boxed areas 220 in FIG. 2A indicate potential incommensurate phases.

To prepare the system in these phases, the detuning $\Delta(t)$ of the driving lasers may be dynamically controlled to adiabatically transform the ground state of the Hamiltonian from a product state of all atoms in g into crystalline Rydberg states. First, all atoms may be prepared in state $|g=_{S1/2}, F=2, m_F=2\rangle$ by optical pumping. The laser fields may then be switched on and swept the two-photon detuning from negative to positive values using a functional form shown in FIG. 3A.

As shown in FIG. 2B, the resulting single atom trajectories in a group of 13 atoms for three different interaction strengths as the detuning $\Delta$ is varied. In each of these instances, a clear transition from the initial state $|g_1, \ldots, g_{13}\rangle$ to a Rydberg crystal of different symmetry can be observed. The distance between the atoms determines the interaction strength which leads to different crystalline orders for a given final detuning. For instance, to achieve a $Z_2$ order, we arrange the atoms with a spacing of 5.9 μm, which results in a nearest neighbor interaction of $V_{i,i+1}=2\pi \times 24$ MHz$\gg \Omega=2\pi \times 2$ MHz while the next-nearest interaction is small ($2\pi \times 0.38$ MHz). This results in a buildup of antiferromagnetic crystal where every other trap site is occupied by a Rydberg atom ($Z_2$ order). By reducing the spacing between the atoms to 3.67 μm and 2.95 μm, $Z_{3-}$ and $Z_{4-}$ orders are respectively observed, as shown in FIG. 2B.

More specifically, FIG. 2B shows the buildup of Rydberg crystals on a 13-atom array is observed by slowly changing the laser parameters as indicated by the red arrows in a (see also FIG. 3A). The bottom panel shows a configuration where the atoms are a=5.9 μm apart which results in a nearest neighbor interaction of $V_{i,i+1}=2\pi \times 24$ MHz and leads to a $Z_2$ order where every other atom is excited to the Rydberg state $|r\rangle$. The right bar plot displays the final, position dependent Rydberg probability (error bars denote 68% CI). The configuration in the middle panel (a=3.67 μm, $V_{i,i+1}=2\pi \times 414.3$ MHz) results in $Z_3$ order and the top panel (a=2.95 μm, $V_{i,i+1}=2\pi \times 1536$ MHz) in a $Z_4$ ordered phase. For each configuration, a single-shot fluorescence image before (left) and after (right) the pulse is shown. Open circles highlight lost atoms, which are attributed to Rydberg excitations.

Performance of the quantum simulator may be compared to the measured $Z^2$ order buildup with theoretical predictions for a N=7 atom system, obtained via exact numerical simulations. FIGS. 3A-3C shows comparison with a fully coherent simulation. As shown in FIGS. 3A-3C, this fully coherent simulation without free parameters yields excellent agreement with the observed data when the finite detection fidelity is accounted for. As shown in FIG. 3A, the laser driving consists of a square shaped pulse $\Omega(t)$ with a detuning $\Delta(t)$ that is chirped from negative to positive values. FIG. 3B shows time evolution of Rydberg excitation probability for each atom in a N=7 atom cluster (colored points), which may be obtained by varying the duration of laser excitation pulse $\Omega(t)$. The corresponding curves are theoretical single atom trajectories obtained by an exact simulation of quantum dynamics with (1), with the functional form of $\Delta(t)$ and $\Omega(t)$ used as discussed with respect to this example, and finite detection fidelity. FIG. 3C shows evolution of the seven most probable many-body states. The evolution of the many-body states in FIG. 3C shows that the perfect antiferromagnetic target state may be measured with 54(4)% probability. When correcting for the known detection infidelity, the desired many-body state is reached with a probability of p=77(6)%. Error bars denote 68% CI.

Figure 4B:
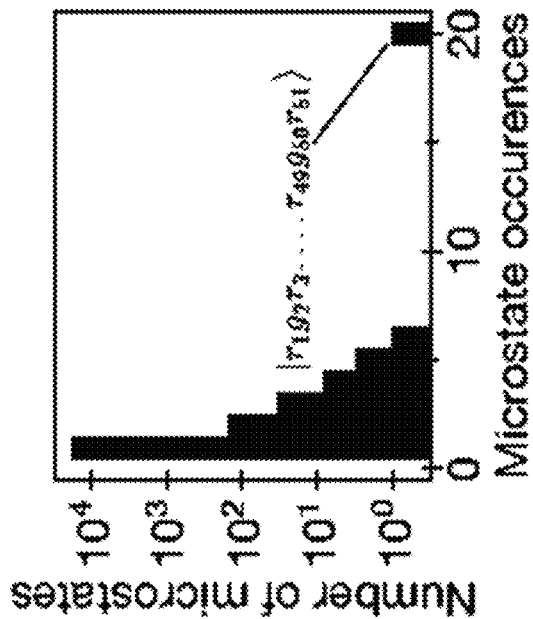
FIGS. 4A-B show scaling behavior, according to some embodiments.
Figure 4A:
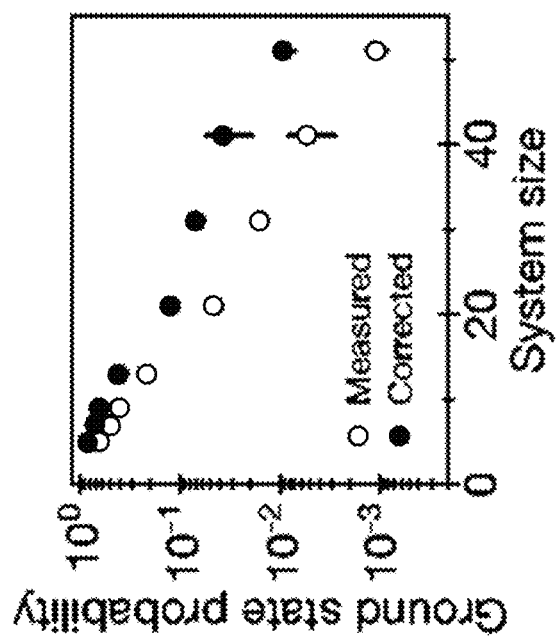

Preparation fidelity depends on system size, as shown in FIG. 4 by adiabatic sweeps on arrays of various sizes. FIG. 4A shows Preparation fidelity of the crystalline ground state as a function of cluster size. The open dots are the measured values and the filled dots are corrected for finite detection fidelity. Error bars denote 68% CI. FIG. 4B shows a histogram of the number of microstates without correction for detection errors per observed number of occurrence in a 51-atom cluster for 18439 experimental realizations. The most occurring microstate is the ground state of the many-body Hamiltonian. The probability of finding the system in the many-body ground state at the end of the sweep decreases as the system size is increased. However, even at system sizes as large as 51 atoms or more, the perfectly ordered crystalline many-body state is obtained with p=0.11 (2)% (p=0.9(2)% when corrected for detection fidelity), which is remarkable in view of the exponentially large 251-dimensional Hilbert space of the system. Furthermore, as shown in FIG. 4B, this state with perfect $Z_2$ order is by far the most commonly prepared state.

Section 3: Observing the Resulting Final State

After a quantum computation the state of the atoms can be detected by fluorescence imaging. This may be done by state dependent atom losses and subsequent imaging to reveal the remaining atoms. In the examples described herein, the tweezer potentials may be restored after the laser pulse. Atoms that are in the ground state are recaptured by the tweezers, whereas those left in the Rydberg state are pushed away by the tweezer beams. A subsequent fluorescence detection may reveal the state of each atom. An extension of this detection may be to first map the Rydberg state to a second hyperfine state, after which state selective fluorescence may be employed to image groups of atoms in each state. This provides the additional advantage that atoms are not lost at the end of the computation.

Section 4. Laser Control System for Manipulating an Array of Atoms

Individual neutral atoms excited to Rydberg states are a promising platform for quantum simulation and quantum information processing. However, experimental progress to date has been limited by short coherence times and relatively low gate fidelities associated with such Rydberg excitations. Thus, even where the methods described above may be used to assemble a large array of atoms for quantum computing, it is still necessary to develop high-fidelity and coherent control of the assembled array of atoms in order to evolve arranged arrays of atoms to solve particular problems. Thus, according to an embodiment, high-fidelity (low-error, such as close to 0% error) quantum control of Rydberg atom qubits can be implemented using the system and methods described, for example, with respect to FIGS. 7A-7D and/or methods described above. Enabled by a reduction in laser phase noise, this approach yields a significant improvement in coherence properties of individual qubits. This high-fidelity control extends to the multi-particle case by preparing a two-atom entangled state with a fidelity exceeding 0.97(3) (i.e., an error rate of only 3/100), and extending its lifetime with a two-atom dynamical decoupling protocol. These advances provide for scalable quantum simulation and quantum computation with neutral atoms that can more accurately and consistently manipulate atoms in an ordered array.

According to some embodiments, high-fidelity quantum control of Rydberg atom qubits can be achieved by reducing laser phase noise, thus producing a significant improvement in the coherence properties of individual qubits. This high-fidelity control extends to the multi-particle case is confirmed by experimental results preparing a two-atom entangled state with a fidelity exceeding 0.97(3). The lifetime of the prepared Bell state can also be extended with a novel two-atom dynamical decoupling protocol, according to some embodiments.

Figure 7A:
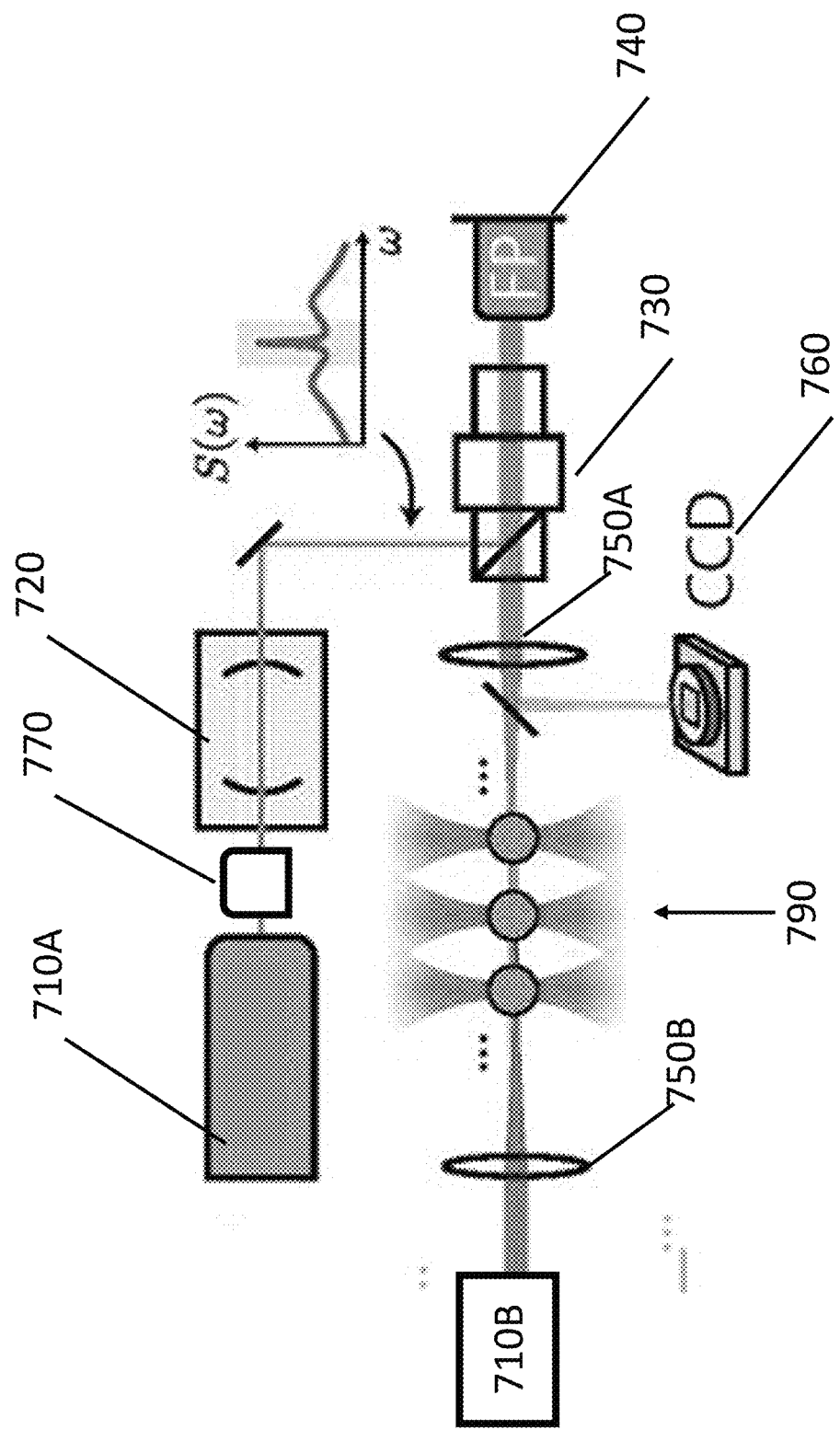
FIGS. 7A-7D show systems for and graphs characterizing control for single-atom placement and manipulation, according to some embodiments.

FIGS. 7A-7D show and characterize a control system for single-atom Rabi oscillations of individual cold Rubidium-87 atoms in optical tweezers at programmable positions in one dimension, according to an embodiment. As shown in FIG. 7A, a laser, such as an external-cavity diode laser (ECDL) 710A can provide light to a reference optical cavity (REF) 720. The light from ECDL 710A can be locked to the REF 720 using, for example, a Pound-Drever-Hall technique. For this, the light of the ECDL may be phase modulated and the reflection of the cavity 720 detected on a photo diode PD 770. This signal is demodulated to create an error signal that is used to lock the laser. This type of lock can create a very narrow linewidth. However, it may also produce high frequency phase noise at the bandwidth of the lock. To mitigate this noise, the cavity Ref 720 can be used as a filter cavity, whose narrow transmission window (shaded region in inset) suppresses high-frequency phase noise To enhance the output power of the REF 720, the transmitted light can be used to injection lock a Fabry-Perot (FP) laser diode 740. This can be achieved by prodding the light from REF 720 through an optical isolator (ISO) 730 to FP 740. Using this technique, the light from FP 740 will inherit the spectral properties of the light from REF 720 albeit at a higher power. The light from FP 740 can be provided through ISO 730 and focusing optics 750A to an array of atoms 790. A second laser source 710B can provide laser light at a different frequency, which can be focused through optics 750B onto the array of atoms 790. In certain embodiments, the light from optics 750A and 750B can be provided in a counter-propagating configuration to minimize the Dopler sensitivity of transitions. According to some embodiments, it is desirable to ensure good alignment of the excitation beams relative to the array of atoms 790. To achieve this, an active feedback scheme may be employed that controls the alignment of the incoming beams. A small amount of light from optics 750A can be picked off and provided to a spatially resolved imaging device, such as CCD 760, for alignment. This narrow and accurate control system for the lasers 710A and 710B allows for control of atoms internal states |g> and |r>. Additional components may be added, such as cooling lasers and magnetic field generation structures such as field coils.

According to some embodiments, the atoms 790 initialized in a Zeeman sublevel $|g\rangle = |S_{1/2}, F=2, m_F=-2\rangle$ of the ground state via optical pumping in a 1.5 G magnetic field. The tweezer potential is then rapidly switched off, and a laser field from both lasers 710A and 710B is applied to couple the atoms 790 to the Rydberg state $|r\rangle = |70S, J=\frac{1}{2}, m_J=-\frac{1}{2}\rangle$. After the laser pulse, for example, of duration 3-8 µs, the tweezer potentials are restored. Atoms 790 that are in the ground state are recaptured by the tweezers, whereas those left in the Rydberg state are pushed away by the tweezer beams. According to some experimental embodiments, this detection method has Rydberg state detection fidelity $f_r=0.96(1)$ and ground state detection fidelity $f_g$ ranging from 0.955(5) to 0.990(2), depending on the trap-off time.

Figure 7B:
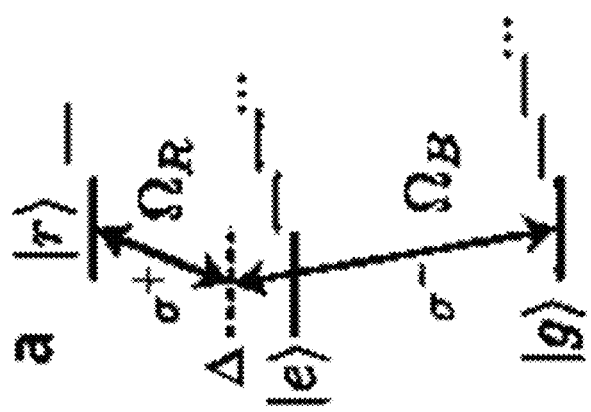

According to some embodiments, the Rydberg states are excited via a two-photon transition. The ECDL 710A may be a 420 nm laser that is detuned by $\Delta$ above the frequency of the transition from $|g\rangle$ to $|e\rangle = |6P_{3/2}, F=3, m_F=-3\rangle$. The second laser source 710B provides a laser field, for example, at 1013 nm couples $|e\rangle$ to $|r\rangle$. The two lasers 710A and 710B are polarized to drive $\sigma^-$ and $\sigma^+$ transitions, respectively, such that only a single intermediate sublevel and Rydberg state can be coupled, avoiding the population of additional levels and associated dephasing. These transitions are shown in FIG. 7B.

The two lasers 710A, 710B may any known lasers, such as external-cavity diode lasers sold by MOG Laboratories Pty Ltd. The lasers 710A may be frequency stabilized by a Pound-Drever-Hall (PDH) 770, such as a PDH provided by Stable Laser Systems, lock to an ultra-low expansion reference cavity. Laser 710B may also be stabilized by a similar PDH (not shown). The PDH 770 lock strongly suppresses laser noise at frequencies below the effective bandwidth of the lock, resulting in narrow linewidths of <1 kHz, as estimated from in-loop noise. However, noise above the lock bandwidth cannot be suppressed, and can be amplified at high locking gain. This results in broad peaks in phase noise around $\sim 2\pi \times 1$ MHz (see inset of FIG. 7A). This high-frequency phase noise presents a coherence limitation in Rydberg experiments and experiments with trapped ions. To suppress this phase noise, a reference cavity 730 may be used as a spectral filter. In particular, the transmission function of the cavity may be a Lorentzian with a full-width at half maximum of $\Gamma \sim 2\pi \times 500$ kHz (corresponding to a finesse of F~3000). Other functions could be used for cavities with different functions. The smaller the linewidth, the better the filtering. When the laser is locked, its narrow linewidth carrier component is transmitted through the cavity, whereas the high-frequency noise at $2\pi \times 1$ MHz is suppressed by a factor of $\gtrsim 4$. While only shown in FIG. 7A with relation to ECDL 710A, to amplify this light at both 420 and 1013 nm, the two colors may be split, and each beam used to injection lock a separate laser diode, which inherits the same spectral properties. This amplifies the spectrally pure transmitted light to 5 mW of 420 nm and 50 mW of 1013 nm light. While the 420 nm power is sufficient to drive the blue transition directly, in some embodiments the 1013 nm may be further amplified by a tapered amplifier (not shown).

The lasers 710A, 710B may be provided onto the atom array 790 in a counterpropagating configuration to minimize Doppler shifts due to finite atomic temperature. The lasers 710A, 710B may be focused to a waist of 20 or 30 µm, respectively. According to an experimental embodiment, single photon Rabi frequencies of $\Omega_B \simeq 2\pi \times 60$ MHz ($\Omega_R \simeq 2\pi \times 40$ MHz) can be achieved. At intermediate detuning of $\Delta \simeq 2\pi \times 600$ MHz, this leads to a two-photon Rabi frequency of $\Omega = \Omega_B \Omega_R/(2\Delta) \simeq 2\pi \times 2$ MHz. Each beam is power-stabilized to <1% by an acousto-optic modulator that is also used for fast (~20 ns) switching. To minimize sensitivity to pointing fluctuations, well-centered alignment onto the atoms can be ensured using the reference camera 760 and an automatic beam alignment procedure, where the beam position is stabilized to a fixed position on the reference camera using one steering mirror mount with piezo actuators. The optimal position may be established by measuring the Rabi frequency on the atoms for different beam positions on the camera and choosing the position that maximizes the coupling to the Rydberg state.

Figure 7C:
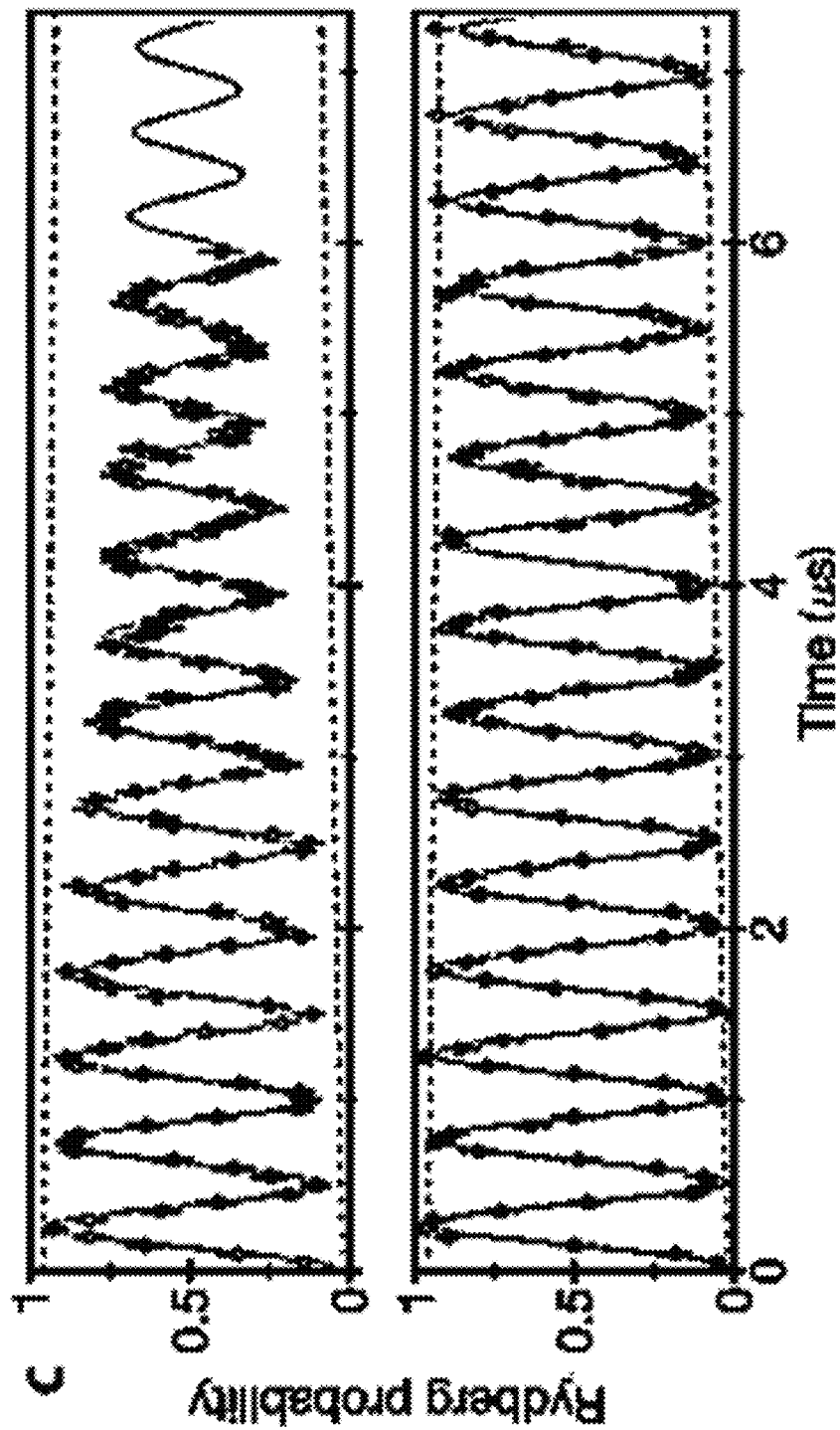
Figure 7D:
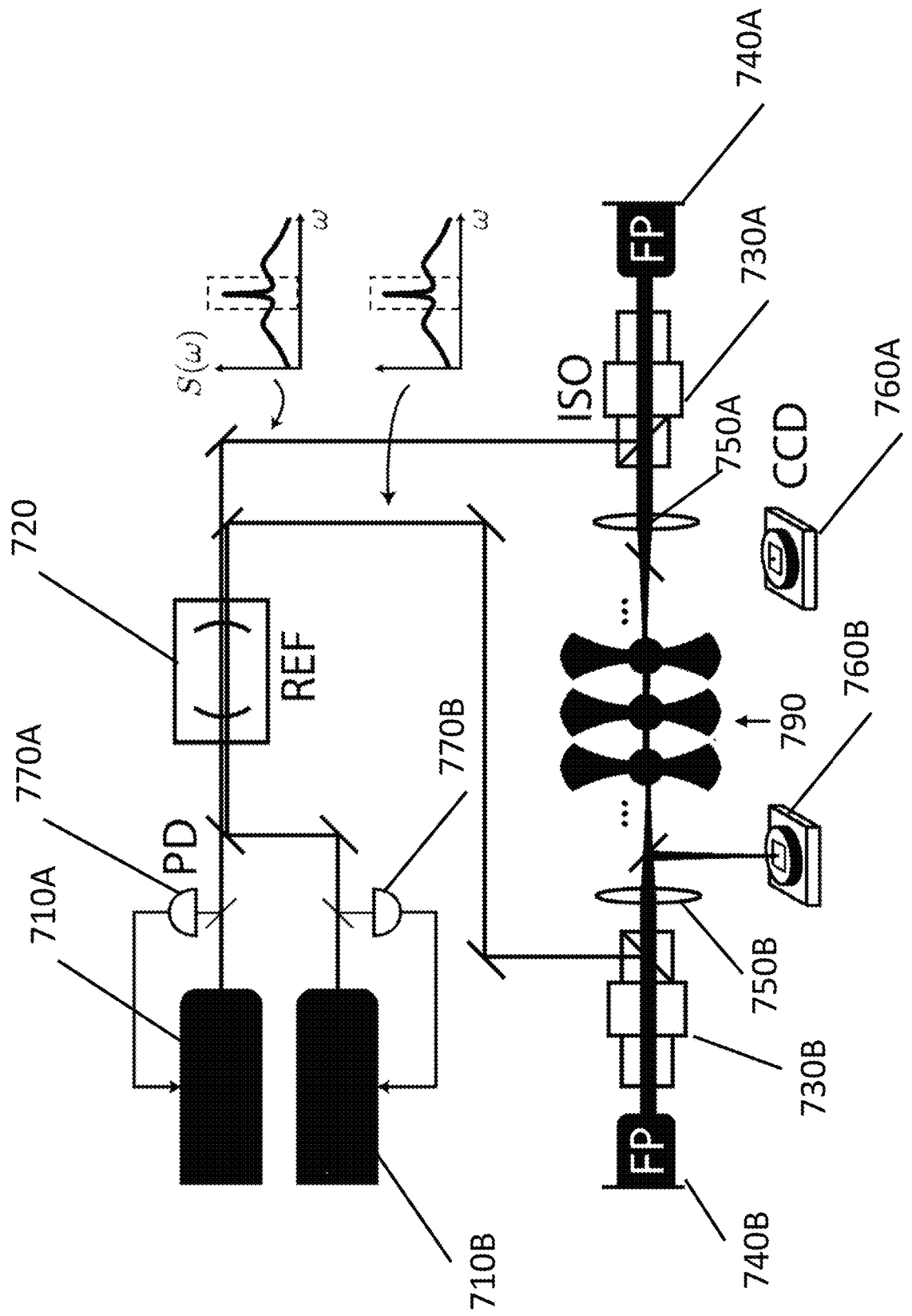

FIG. 7D shows a similar system to 7A with the addition of further control of the laser 710B, according to some embodiments. FIG. 7D shows two lasers at 420 nm 710A and 1013 nm 710B. Each laser 710A, 710B may be, for example, an external cavity diode laser. Lasers 710A, 710B are used to coherently excite atoms 790 to Rydberg states. Both lasers are stabilized to a reference optical cavity 720 by Pound-Drever-Hall (PDH) locks. The mirror coatings of the REF 720 may be chosen such that the cavity is suited for multiple wavelengths and may be used by both 710A and 710B. For this purpose, the lasers are each phase modulated with an electro-optic modulator (EOM) placed between each laser source and the reference cavity. (not shown), and the light reflected from the optical cavity is measured on photodetectors (PD) 770A, 770B, respectively, and used to feedback on the laser by tuning the current through the laser diode. This stabilizes each laser to narrow linewidths of <1 kHz, as measured from noise on the error signal of the PDH lock. However, high frequency noise from the laser diode cannot be suppressed and can instead be amplified by the PDH lock due to its finite bandwidth. This leads to broad peaks in noise at around +/−1 MHz relative to the central narrow carrier linewidth (shown in the power spectrum insets).

While the lasers 710A, 710B are locked to the reference cavity, the light is primarily transmitted through the cavity 720. However, the cavity 720 acts as a low pass filter with a bandwidth of ~500 kHz, and its transmission therefore suppresses noise outside this 'transmission window' (schematically shown as the boxed region with dashed line in the power spectrum insets). The transmitted light through the cavity therefore has a narrow linewidth but also suppressed high frequency noise.

Since high power is beneficial for control of the atoms 790, the transmitted light of each laser 710A, 710B is split and injection locked through optical isolators (ISOs) 730A, 730B, respectively, into independent Fabry-Perot (FP) laser diodes 740A, 740B, respectively. These laser diodes 740A, 740B inherit the same high-quality spectral properties of the light used to seed them, and effectively amplify this seed light to ~5 mW of 420 nm light and ~50 mW of 1013 nm light. The 1013 nm power may be additionally amplified by a tapered amplifier positioned after the laser diode 740B (not shown). The two lasers 710A, 710B may then be focused by lenses 750A, 750B onto the array of atoms 790 in a counter-propagating configuration to minimize the Doppler sensitivity of the transition.

This laser stabilization and filtering scheme enables high fidelity coherent control of Rydberg atom qubits to date. The scheme could be further improved by using a commercially available higher finesse optical cavity that has a narrower linewidth arising from mirrors of higher reflectivity, and therefore a higher factor of noise suppression. According to some embodiments, intrinsically lower noise laser sources, such as Titanium-Sapphire lasers or dye lasers, can be used to drive this transition without needing to spectrally filter the high frequency laser phase noise.

Section 4.A: Experimental Results from Improved Laser Control

According to some embodiments, various control methods and systems disclosed herein may be implemented to extend coherence times and improve control over atoms. According to an experimental embodiment implementing the system and methods described above, such as the control system shown in FIGS. 7A-7D, long-lived Rabi oscillations were measured to have a 1/e lifetime of τ=27(4) µs, to be compared with a typical ≲7 µs lifetime in previous experiments. This is shown in FIG. 7C, which shows resonant two-photon coupling induces Rabi oscillations between $|q\rangle=$ and $|r\rangle$. Each plot shows the Rydberg probability as a function of time in microseconds. The upper plot is a measurement from a setup used in the art. The lower plot shows typical results with the setup described above, with a fitted coherence time of 27(4) µs. Each data point is calculated from 50-100 repeated measurements, averaged over two identically-coupled atoms separated by 23 µm such that they are non-interacting. Error bars are 68% confidence intervals. The solid lines are fits to experimental data, while the dotted lines indicate the expected contrast from a numerical model. As shown in FIG. 7D, there is excellent agreement between these new measurements and a simple numerical model for the single-atom system, indicated by dotted lines in FIG. 7D. The numerical model implemented had no free parameters and accounts only for the effects of random Doppler shifts at finite atomic temperature, off-resonant scattering from the intermediate state $|e\rangle$, and the finite lifetime of the Rydberg state $|r\rangle$. The results from the numerical model are additionally scaled to account for detection fidelity.

According to another experimental embodiment, the coherence of single atoms and single-qubit control can be characterized. To begin, the lifetime of the Rydberg state is measured, as shown in FIG. 8A, in order to demonstrate and determine the timescale during which quantum control may be performed. As shown in FIG. 8A, the lifetime of $|r\rangle$ can characterized by exciting from $|g\rangle$ to $|r\rangle$ with a π-pulse, and then de-exciting after a variable delay. The probability to end in $|g\rangle$ (denoted $P_g$) decays with an extracted lifetime of $T_1$=51(6) µs. The measured $T_1=T_{r \to g}$=51(6) µs is consistent with the 146 µs Rydberg state lifetime when combined with the ~80 µs timescale for off-resonant scattering of the 1013 nm laser from $|e\rangle$. A Ramsey experiment shows Gaussian decay 810 that is well-explained by thermal Doppler shifts (see FIG. 8B). As shown in FIG. 8B, a Ramsey experiment plotted as line 810 shows Gaussian decay with a 1/e lifetime of $T_2^*$=4.5(1) µs, limited by thermal Doppler shifts. Inserting an additional π-pulse 830 between the π/2-pulses 832, 834 cancels the effect of the Doppler shifts and results in a substantially longer coherence lifetime of T2=32(6) µs (fitted to an exponential decay down to 0.5). At 10 µK, the random atomic velocity in each shot of the experiment appears as a random detuning $\delta^D$ from a Gaussian distribution of width 2π×43.5 kHz, resulting in dephasing as $$|\psi\rangle \to \frac{1}{\sqrt{2}}(|g\rangle + e^{i\delta^D t}|r\rangle).$$

However, since the random Doppler shift is constant over the duration of each pulse sequence, its effect can be eliminated via a spin-echo sequence (see plot 820 in FIG.

8B). The spin-echo measurements display some small deviations from the numerical simulations (dotted lines), indicating the presence of an additional dephasing channel. Assuming an exponential decay, the fitted $T_2=32(6)$ µs and the pure dephasing time $T_\phi=(1/T_2-1/(2T_{r\to g}))^{-1}=47(13)$ µs. This dephasing may result from residual laser phase noise. Apart from resonantly manipulating the atoms between their states |g> and |r> it is also desirable to be able to manipulate the phase between these states, which can be referred to as a phase gate. FIG. 8C shows such a single-atom phase gate implemented by applying an independent 809 nm laser 840. According to some embodiments, other wavelengths that are far away from atomic transitions, but sufficiently close to induce a light shift on the ground state that are different to that of the Rydberg state may be used. This induces a light shift $\delta=2\pi\times 5$ MHz on the ground state for time t, resulting in an accumulated dynamical phase $\phi=\delta t$. The gate may be embedded in a spin-echo sequence to cancel Doppler shifts. In each measurement shown here, the 1013 nm laser remains on for the entire pulse sequence, while the 420 nm laser is pulsed according to the sequence shown above each plot. Each data point is calculated from 200-500 repeated measurements on single atoms, with error bars denoting 68% confidence intervals. In FIGS. 8B and 8C, the solid lines are fits to experimental data. Dotted lines show the contrast expected from the numerical model, including finite detection fidelity. Such long coherence times and single qubit control gates are useful for quantum computing.

According to some embodiments, a single-atom phase gate can be implemented by applying an independent focused laser that shifts the energy of the ground state |g⟩ by 5 MHz. By controlling the duration of the applied laser pulse, a controlled dynamical phase can be imparted on |g⟩ relative to |r⟩. The contrast of the resulting phase gate (embedded in a spin-echo sequence) is close to the limit imposed by detection and spin-echo fidelity.

Figure 9B:
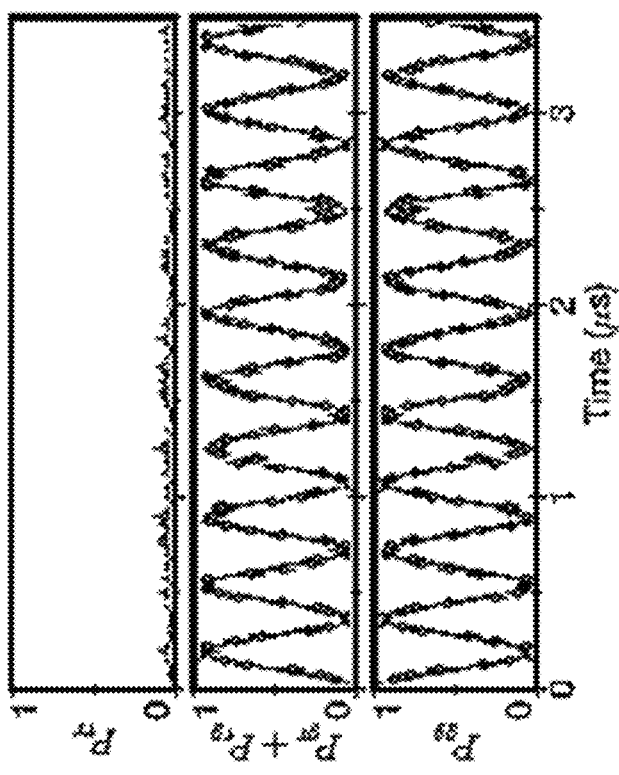
FIGS. 9A-9C show graphs characterizing entanglement generation with two atoms.
Figure 9A:
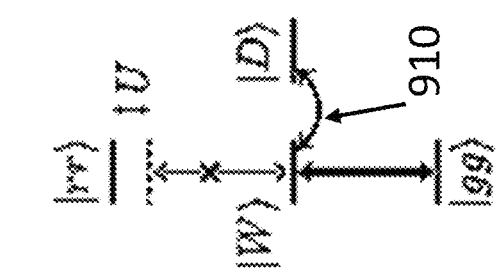

According to some embodiments, two-atoms may be controlled. It should be appreciated that such techniques and systems can be applied to more than two atoms. To this end, two atoms may be positioned at a separation of 5.7 µm, at which the Rydberg-Rydberg interaction is $U/\hbar=2\pi\times 30$ MHz$\gg\Omega=2\pi\times 2$ MHz. In this regime, which may be called a Rydberg blockade regime, the laser field globally couples both atoms from |gg⟩ to the symmetric state $$|W\rangle = \frac{1}{\sqrt{2}}(|gr\rangle + |rg\rangle)$$

at an enhanced Rabi frequency of $\sqrt{2}\Omega$ (see FIG. 9A). FIG. 9A shows the level structure for two nearby atoms, which features a doubly excited state |rr⟩ which is shifted by the interaction energy $U\gg\hbar\Omega$. In this Rydberg blockade regime, the laser field only couples |gg⟩ to |W⟩. The symmetric and antisymmetric states |W⟩.

$$|D\rangle = \frac{1}{\sqrt{2}}(|gr\rangle + |rg\rangle)$$

can be coupled by a local phase gate on one atom (denoted via arrow 910).

The probabilities can be measured for the states |gg⟩, |gr⟩, |rg⟩, and |rr⟩ (denoted by $P_{gg}$, $P_{gr}$, $P_{rg}$, and $P_{rr}$, respectively), and show that no population enters the doubly-excited state see FIG. 9B top ($P_{rr}<0.02$, consistent with only detection error). Instead, there are oscillations between the manifold of zero excitations, FIG. 9B bottom, and the manifold of one excitation, FIG. 9B center, with a fitted frequency of $2\pi\times 2.83$ MHz$\approx\underline{2\Omega}$ (see FIG. 9B). After driving both atoms on resonance for variable time, the probability of the resulting two-atom states can be measured. Population oscillates from |gg⟩ to |W⟩ at the enhanced Rabi frequency $\underline{2\Omega}$. This demonstrates high fidelity two qubit control.

These collective Rabi oscillations can be used to directly prepare the maximally entangled Bell state |W⟩ by applying a π-pulse at the enhanced Rabi frequency (denoted by $X_\pi^w$). To determine the fidelity of this experimentally prepared entangled state, given by $F=\langle W|\rho|W\rangle$, it may be expressed in terms of diagonal and off-diagonal matrix elements of the density operator ρ:

$$F = \frac{1}{2}(\rho_{gr,gr} + \rho_{rg,rg}) + \frac{1}{2}(\rho_{gr,rg} + \rho_{rg,gr}) \quad (3)$$

where $\Sigma_{\alpha\beta,\gamma\delta}=\langle\alpha\beta|\rho|\gamma\delta\rangle$ for α, β, γ, δ ∈ {g, r}. The diagonal elements can be directly measured by applying a π-pulse and then measuring the populations. The results closely match those of a perfect |W⟩ state after accounting for state detection errors, with $\rho_{gr,gr}+\tau_{rg,rg}=0.94(1)$, relative to a maximum possible value of 0.95(1).

Figure 9C:
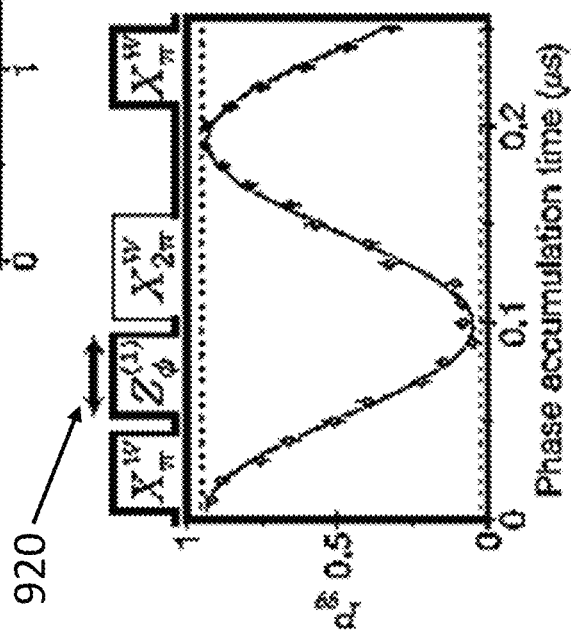

To measure the off-diagonal elements of the density matrix, the single-atom phase gate $Z_\phi^{(1)}$ 920 may be used, as demonstrated in FIG. 9C, which introduces a variable phase on one atom. For example, a local beam adds a light shift δ to |gr⟩ but not to |rg⟩, such that $$|W\rangle \to \frac{1}{\sqrt{2}}(e^{i\delta t}|gr\rangle + |rg\rangle).$$

This phase accumulation rotates |W⟩ into the orthogonal dark state $$|D\rangle = \frac{1}{\sqrt{2}}(|gr\rangle + |rg\rangle)$$

according to:

$$|W\rangle \to \cos(\delta t/2)|W\rangle + i\sin(\delta t/2)|D\rangle \quad (4)$$

Since |D⟩ is uncoupled by the laser field, a subsequent π-pulse maps only the population of |W⟩ back to |gg⟩. The probability of the system to end in |gg⟩ therefore depends on the phase accumulation time as $P_{gg}(t)=A\cos^2(\delta t/2)$. Here, the amplitude of the oscillation A precisely measures the off-diagonal matrix elements ($\rho_{gr,rg}=\rho_{rg,gr}$). In order to mitigate sensitivity to random Doppler shifts, this entire sequence may be embedded in a spin-echo protocol (see FIG. 9C). FIG. 9C shows a measurement of the entanglement fidelity of the two atoms after a resonant π-pulse in the blockade regime. A local phase gate $Z_\phi^{(1)}$ rotates |W⟩ into |D⟩, which is detected by a subsequent π-pulse. The fitted contrast 0.88(2) measures the off-diagonal density matrix elements. The phase gate is implemented by an off-resonant laser focused onto one atom, with a crosstalk of <2%. The measurement is embedded in a spin-echo sequence to cancel dephasing from thermal Doppler shifts. As described above, the phase gate is a useful single qubit gate for quantum computation. Here, it may be used to be able to characterize the entanglement between the two atoms. The echo sequence used here helps to cancel noise from Doppler shifts which thereby increases the coherence of the system.

The resulting contrast was $A=0.88(2)=2\rho_{gr,rg}=2\rho_{rg,gr}$. Combining these values with the diagonal matrix elements, entanglement fidelity of $F=0.91(2)$ was measured. The maximum measurable fidelity given the experimental state detection error rates would be 0.94(2), so after correcting for imperfect detection, the entangled Bell state was found to have been created with fidelity of $F=0.97(3)$. This fidelity includes errors introduced during the pulses that follow the initial $\pi$-pulse, and therefore constitutes a lower bound on the true fidelity.

Figure 10:
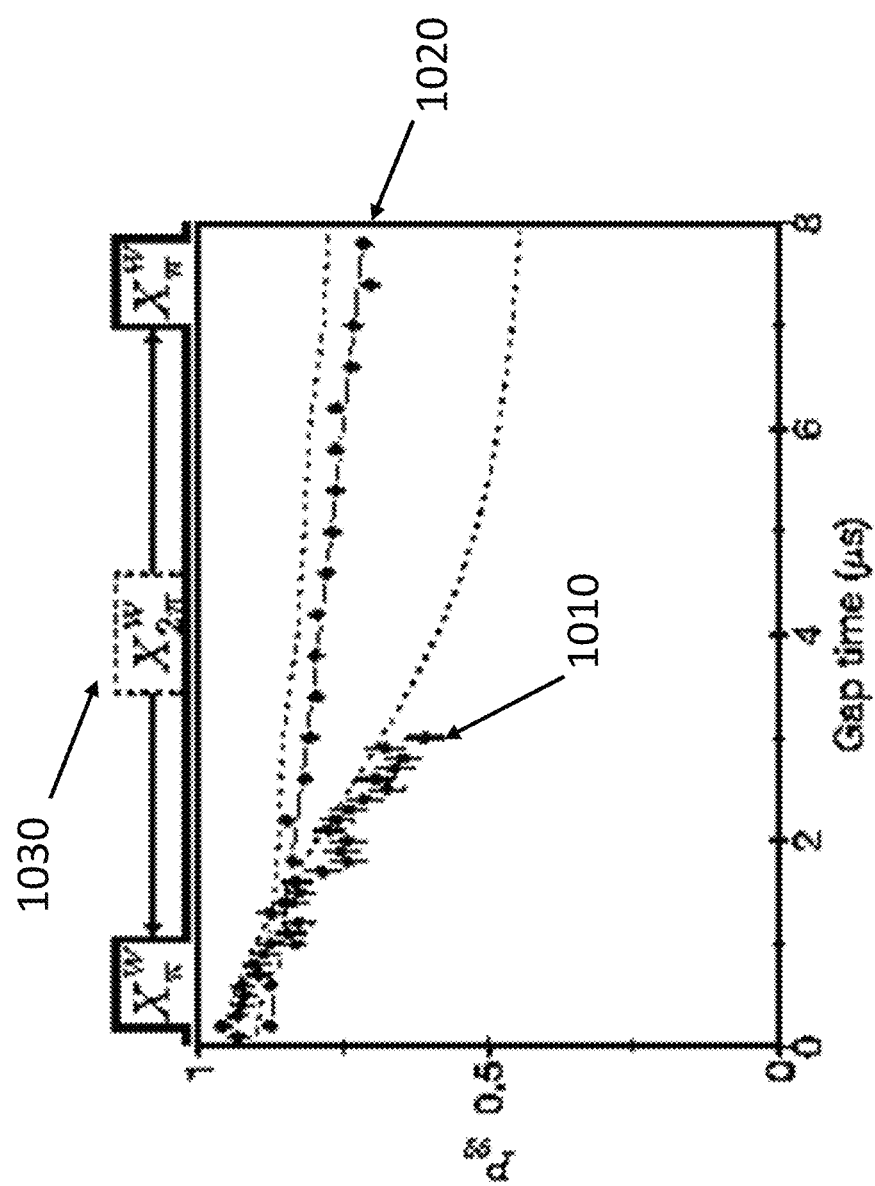
FIG. 10 shows a graph representing extension of entangled-state lifetime via dynamical decoupling, according to an embodiment.

Entanglement is a useful resource in quantum computation. However, entangled states can be very fragile and subject to fast dephasing. The method discussed herein may be used to protect entangled states against certain noise sources. According to some embodiments, the lifetime of the entangled state by exciting $|W\rangle$ may be explored with a $\pi$-pulse and then de-exciting after a variable delay (see FIG. 10). FIG. 10 shows extension of entangled-state lifetime via dynamical decoupling. The lifetime of $|W\rangle$ can be measured by exciting $|gg\rangle$ to $|W\rangle$ and then de-exciting after a variable time as shown in the plot 810. The lifetime is limited by dephasing from random Doppler shifts. Inserting an additional $2\pi$-pulse 1030 in the blockade regime swaps the populations of $|gr\rangle$ and $|rg\rangle$ to refocus the random phase accumulation, extending the lifetime to ~36 µs as shown in plot 1020 (fitted to an exponential decay, shown as the solid). The initial offset in each curve 1010, 1020 is set by the ground state detection fidelity associated with the given trap-off time. All data points are calculated from 30-100 repeated measurements, averaging over nine independent identically-coupled atom pairs, with error bars indicating 68% confidence intervals. Dotted lines near the plots and fit lines show predictions from the numerical model, including detection error. The decay in contrast is in good agreement with numerical predictions associated with random Doppler shifts. In particular, the two components $|gr\rangle$ and $|rg\rangle$ of the $|W\rangle$ state dephase as $$|W\rangle \to \frac{1}{\sqrt{2}}\left(e^{i\delta_2^D t}|gr\rangle + e^{i\delta_1^D t}|rg\rangle\right)$$

where $\delta_i^D$ is the two-photon Doppler shift on atom i.

According to some embodiments, the lifetime of the two-atom entangled state can be extended with an echo sequence that acts on multiple qubits. This allows for longer periods of control. After the $|W\rangle$ state has evolved for time T, a $2\pi$-pulse can be applied to the two-atom system. In the Rydberg blockade regime, such a pulse swaps the populations of $|gr\rangle$ and $|rg\rangle$. After again evolving for time T, the total accumulated Doppler shifts are the same for each part of the two-atom wavefunction, and therefore do not affect the final $|W\rangle$ state fidelity. FIG. 10 shows that its lifetime is extended far beyond the Doppler-limited decay to $T_2^W=36(2)$ µs. As in the single atom case, a pure dephasing timescale $T_\phi^W=(1/T_2^W-1/T_{r\to g})^{-1}>100$ µs is extracted.

The Bell state dephasing time $T_\phi^W>100$ µs of the two atoms is significantly longer than the single atom dephasing time $T_\phi=47(13)$ µs. This can be understood by noting that the states $|gr\rangle$ and $|rg\rangle$ form a decoherence-free subspace that is insensitive to global perturbations such as laser phase and intensity fluctuations that couple identically to both atoms. In contrast, a single atom in a superposition $$|\psi\rangle = \frac{1}{\sqrt{2}}(|g\rangle + |r\rangle)$$

is sensitive to both the laser phase and the laser intensity. Such decoherec free subspaces may be used to protect quantum information from certain noise sources. These measurements provide further indications that even though the laser noise is significantly reduced in these experiments, it is still not completely eliminated in our experiment A higher finesse cavity REF 720 may be used to filter out even more laser noise and enable even longer coherence times. Additionally, these coherent manipulation techniques between the ground and Rydberg states are nonetheless significantly better than those previously reported.

These measurements establish Rydberg atom qubits as a platform for high-fidelity quantum simulation and computation. The techniques demonstrated in this disclosure show methods of controlling a neutral atom arrays. The fidelities demonstrated by these techniques can be further improved by increasing laser intensities and operating at larger detunings from the intermediate state, thereby reducing the deleterious effect of off-resonant scattering, or by using a direct single-photon transition. In addition, sideband cooling of atoms in tweezers can dramatically decrease the magnitude of Doppler shifts, while low-noise laser sources such as Titanium-Sapphire lasers or diode lasers filtered by higher-finesse cavities can further eliminate errors caused by phase noise. Advanced control techniques, such as laser pulse shaping, can also be utilized to reach higher fidelities. Finally, state detection fidelities, the major source of imperfections in the present work, can be improved by field ionization of Rydberg atoms or by mapping Rydberg states to separate ground state levels.

Section 5.A: Examples—Quantum Dynamics Across a Phase Transition

The system and methods described herein provide for identifications for solutions of the Ising Problem, as discussed below. The techniques applied herein may also be transferred to other models, such as the maximum independent set problem described below.

Figure 5A:
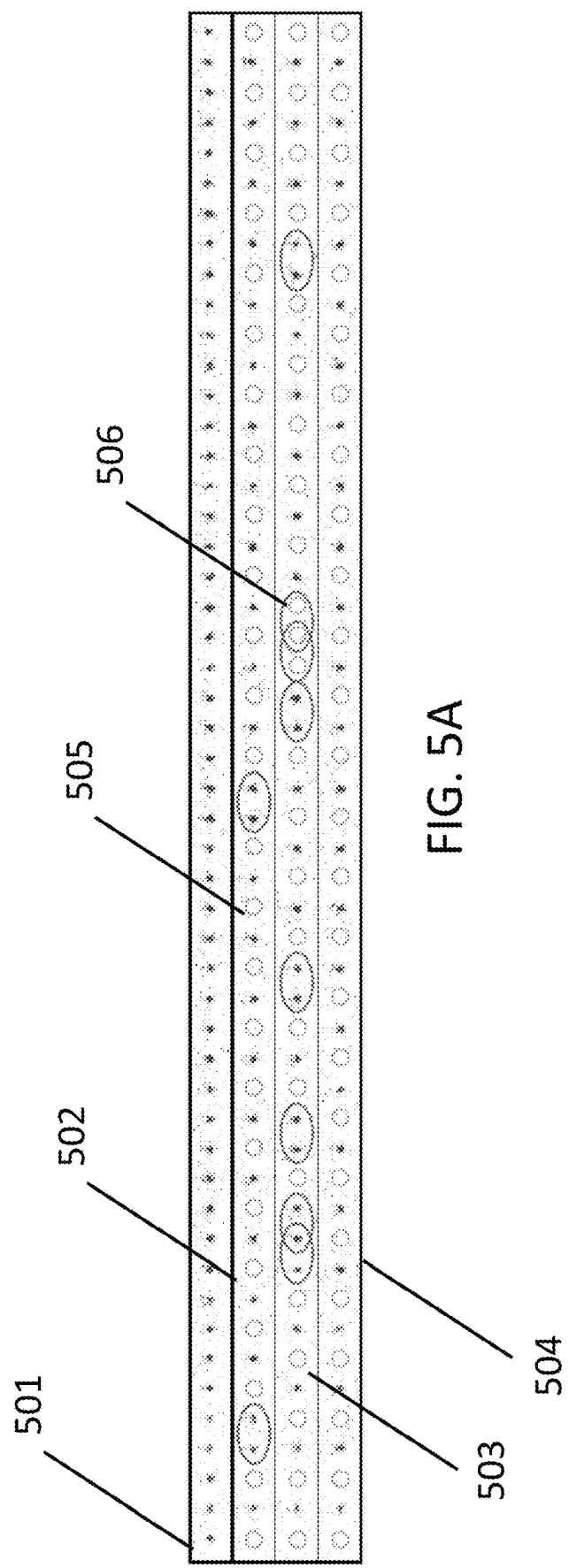
FIGS. 5A-D show arrays of atoms before and after adiabatic evolution, and characteristics thereof, according to some embodiments.

Once atoms can be arranged in large arrays, such as a 1D array of as many as 51 atoms or more, phase transitions can be observed as atoms alternate between the Rydberg and ground state. These transitions are discussed in more detail below. FIGS. 5A-D shows characteristics of the transition into the $Z_2$-phase in an array of 51 atoms, according to an embodiment. Long ordered chains where the atomic states alternate between Rydberg and ground state may appear. As shown in FIG. 5A, these ordered domains can be separated by domain walls that consist of two neighboring atoms in the same electronic state.

FIG. 5A shows single-shot fluorescence images of a 51-atom array before applying the adiabatic pulse (top row 501, i.e., the evolution step 116 as discussed with respect to FIG. 1D) and after the pulse (bottom three rows 502, 503, 504 correspond to three separate instances, i.e., the detection step 118 in FIG. 1D), according to an exemplary embodiment. Small circles 505 mark lost atoms, which may be attributed to Rydberg excitations. Domain walls are defects in the perfectly ordered Rydberg crystal. Domain walls allow for characterization of how well the system reaches the ground state at the end of an adiabatic sweep. Observing these domain walls themselves are useful as well. For example, the system can be better characterized by how the sweep speed influences the number of domain walls or whether there are correlations between domain walls. Domain walls 506 (circled dots) are identified as either two neighboring atoms in the same state or a ground state atom at the edge of the array and are indicated with an ellipse. Long $Z_2$ ordered chains between domain walls can be observed.

Figure 5B:
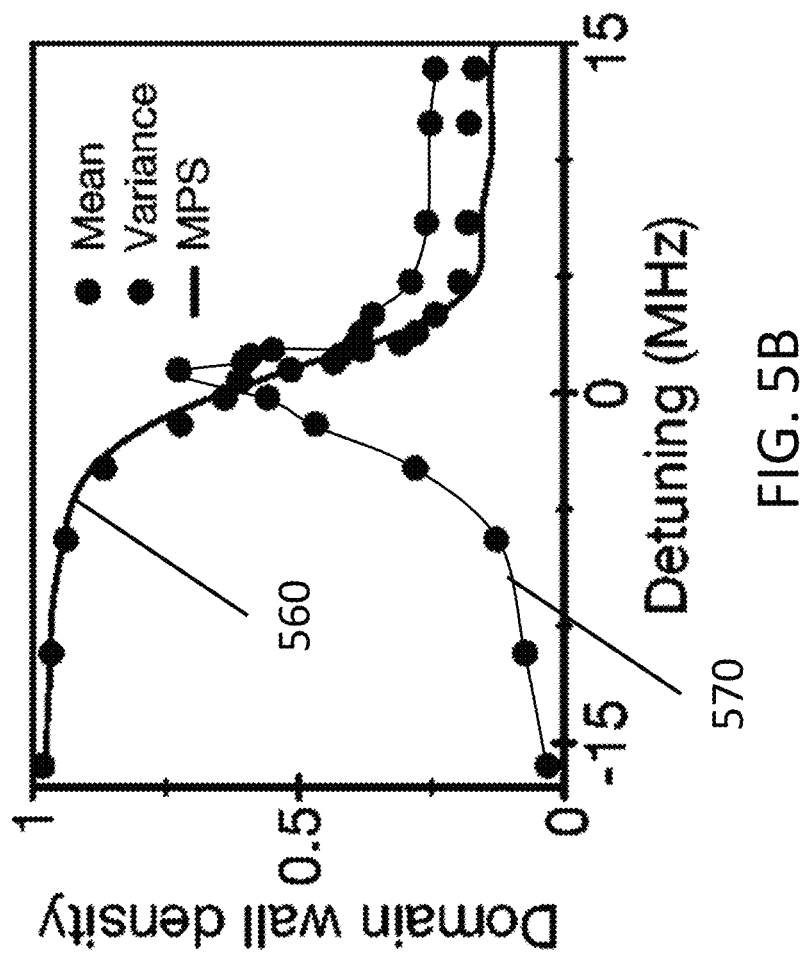

FIG. 5B shows domain wall density as a function of detuning during the frequency sweep, according to an exemplary embodiment. The points on curve 560 are the mean of the domain wall density as a function of detuning during the sweep. Error bars are standard error of the mean and are smaller than the marker size. The points on curve 570 are the corresponding variances where the shaded region represents the jackknife error estimate. The onset of the phase transition is witnessed by a decrease in the domain wall density and a peak in the variance. Each point is obtained from 1000 realizations. The solid curve 560 is a fully coherent MPS simulation without free parameters (bond dimension D=256), taking measurement fidelities into account.

The domain wall density can be used to quantify the transition from the disordered phase into the ordered $Z_2$-phase as a function of detuning $\Delta$ and serves as an order parameter. As the system enters the $Z_2$-phase, ordered domains grow in size, leading to a substantial reduction in the domain wall density (points on curve 560 in FIG. 5B). Consistent with expectations for an Ising-type second order quantum phase transition, domains of fluctuating lengths close to the transition point between the two phases can be observed, which is reflected by a pronounced peak in the variance of the density of domain walls. This peak is shifted towards positive values of $\Delta \approx 0.5\Omega$, consistent with predictions from finite size scaling analysis. The observed domain wall density is in excellent agreement with fully coherent simulations of the quantum dynamics based on 51-atom matrix product states (line 560); however, these simulations underestimate the variance at phase transition.

Figure 5C:
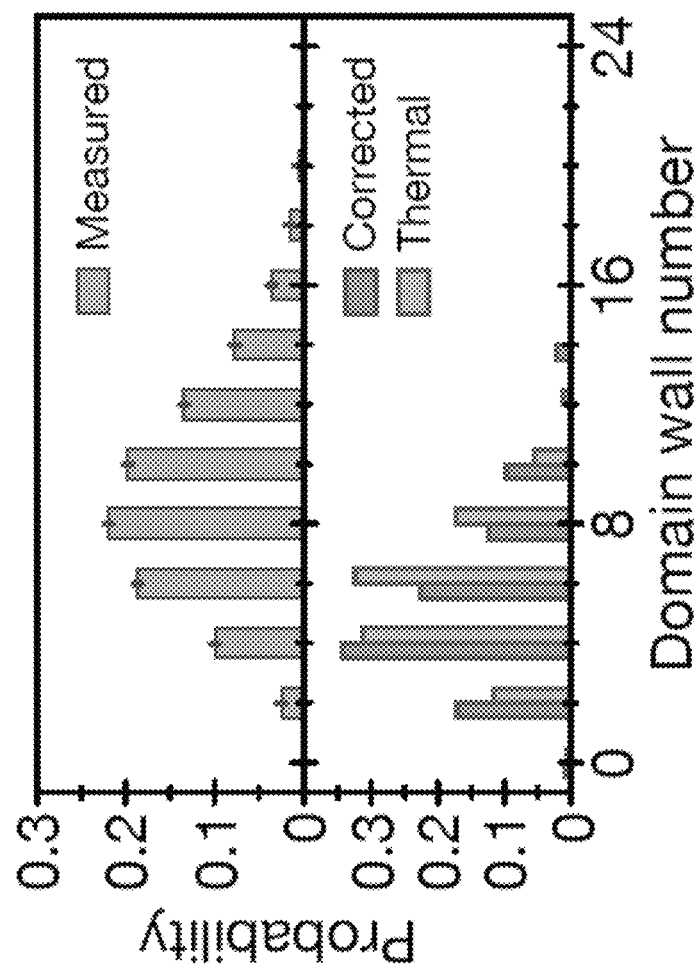

At the end of the sweep, deep in the $Z_2$ phase ($\Delta/\Omega \gg 1$), $\Omega$ can be neglected such that the Hamiltonian (1) becomes essentially classical. In this regime, the measured domain wall number distribution allows us to directly infer the statistics of excitations created when crossing the phase transition. FIG. 5C shows a histogram of the normalized number of domain walls that appeared during 18439 separate experimental realizations of the 51-atom array. The distribution is depicted in with an average of 9.01(2) domain walls. This distribution is affected by the detection fidelity of state $|g\rangle$ and state $|r\rangle$ which leads to a higher number of domain walls. In other words, a system with perfect detection fidelity would produce a different distribution of domain walls than the one employed in which imperfect detection fidelity introduces additional domain walls. Thus, to determine the real number of domain walls the effect of detection fidelity can be modeled on the domain wall distribution to determine the number of domain walls that were created without the effects of lower detection fidelity. This allows a maximum likelihood estimation to be obtained the distribution corrected for detection fidelity, which corresponds to a state that has on average 5.4 domain walls. These remaining domain walls (those not caused by lower detection fidelity) are most likely created due to non-adiabatic transitions from the ground state when crossing the phase transition, where the energy gap becomes minimal. In addition, the preparation fidelity is also limited by spontaneous emission during the laser pulse (an average number of 1.1 photons is scattered per µs for the entire array).

Figure 5D:
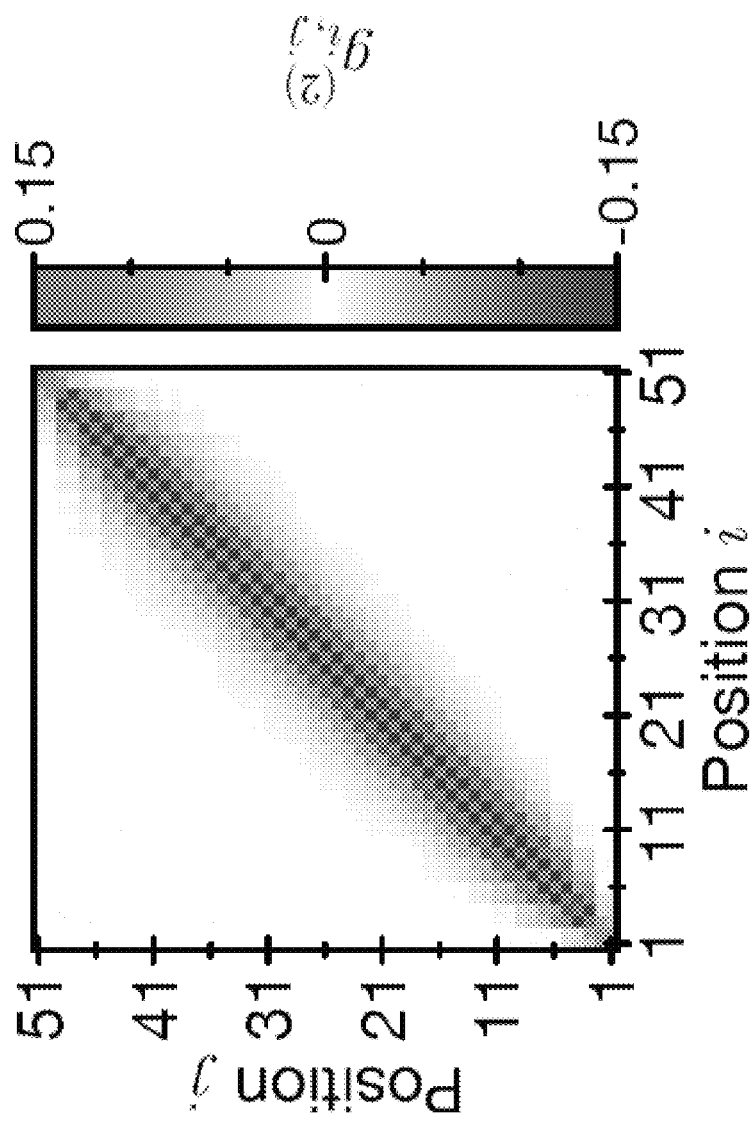

FIG. 5C shows domain wall number distribution for $\Delta=14$ MHz obtained from 18439 experimental realizations (top plot), according to an exemplary embodiment. Error bars indicate 68% CI. Owing to the boundary conditions, only even number of domain walls can appear. Bars on the right of each coupled pair in the bottom plot show the distribution obtained by correcting for finite detection fidelity using a maximum likelihood method, which results in an average number of 5.4 domain walls. Bars to the left of each coupled pair show the distribution of a thermal state with the same mean domain wall density. FIG. 5D sows measured correlation function in the $Z_2$ phase.

To further characterize the created $Z_2$ ordered state, the correlation function can be evaluated $$g_{ij}^{(2)} = \langle n_i n_j \rangle - \langle n_i \rangle \langle n_j \rangle \qquad (2)$$

where the average $\langle \ldots \rangle$ is taken over experimental repetitions. We find that the correlations decay exponentially over distance with a decay length of $\xi=3.03(6)$ sites (see FIG. 5d and SI).

FIG. 6 shows graphical demonstrates that the approach described within the present disclosure also enables the study of coherent dynamics of many-body systems far from equilibrium. FIG. 6A shows a schematic sequence (top, showing $\Delta(t)$) involves adiabatic preparation and then a sudden quench to single-atom resonance. The heat map shows the single atom trajectories for a 9-atom cluster. The initial (left inset) crystal is observed with a Rydberg excitation at every odd trap site collapses after the quench and a crystal with an excitation at every even site builds up (middle inset). At a later time, the initial crystal revives (right inset). Error bars denote 68% CI. FIG. 6B shows the density of domain walls after the quench. The dynamics decay slowly on a timescale of 0.88 µs. The shaded region represents the standard error of the mean. Solid line in the top pane is a fully coherent MPS simulation with bond dimension D=256, taking into account measurement fidelity. FIG. 6C shows a toy model of non-interacting dimers. FIG. 6D shows numerical calculations of the dynamics after a quench starting from an ideal 25 atom crystal, obtained from exact diagonalization. Domain wall density as a function of time 610, and growth of entanglement entropy of the half chain (13 atoms) 620. Dashed lines take into account only nearest neighbor blockade constraint. Solid lines correspond to the full $1/r^6$ interaction potential.

Figure 6A:
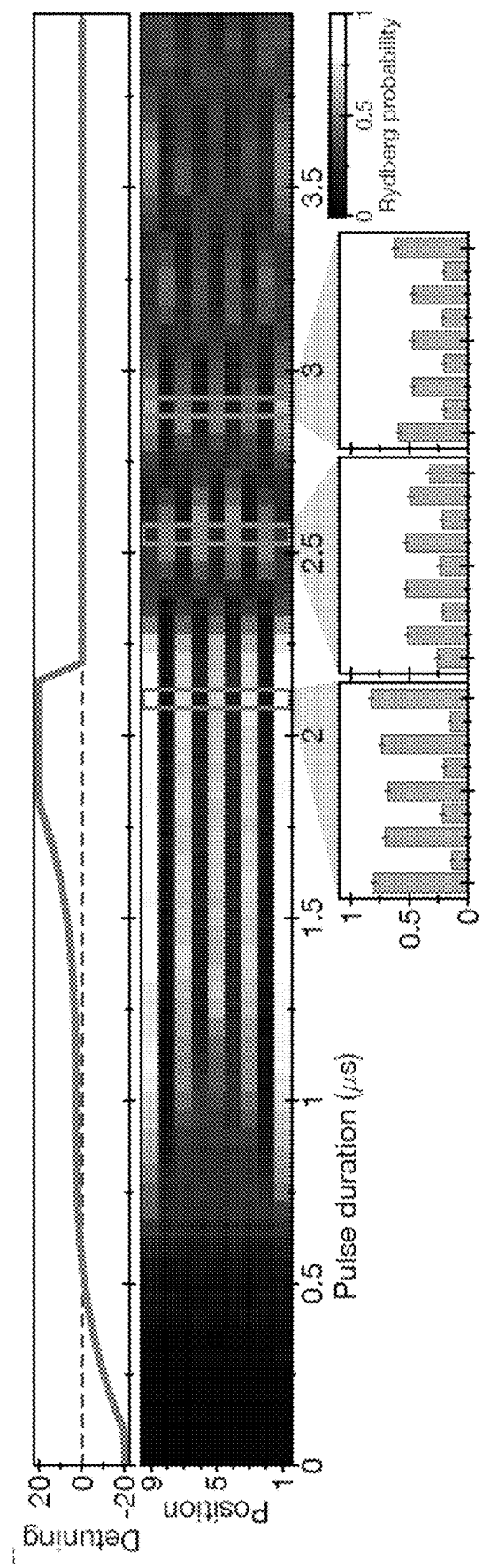
FIGS. 6A-D show graphical representations of oscillations in many-body dynamics, according to some embodiments.
Figure 6B:
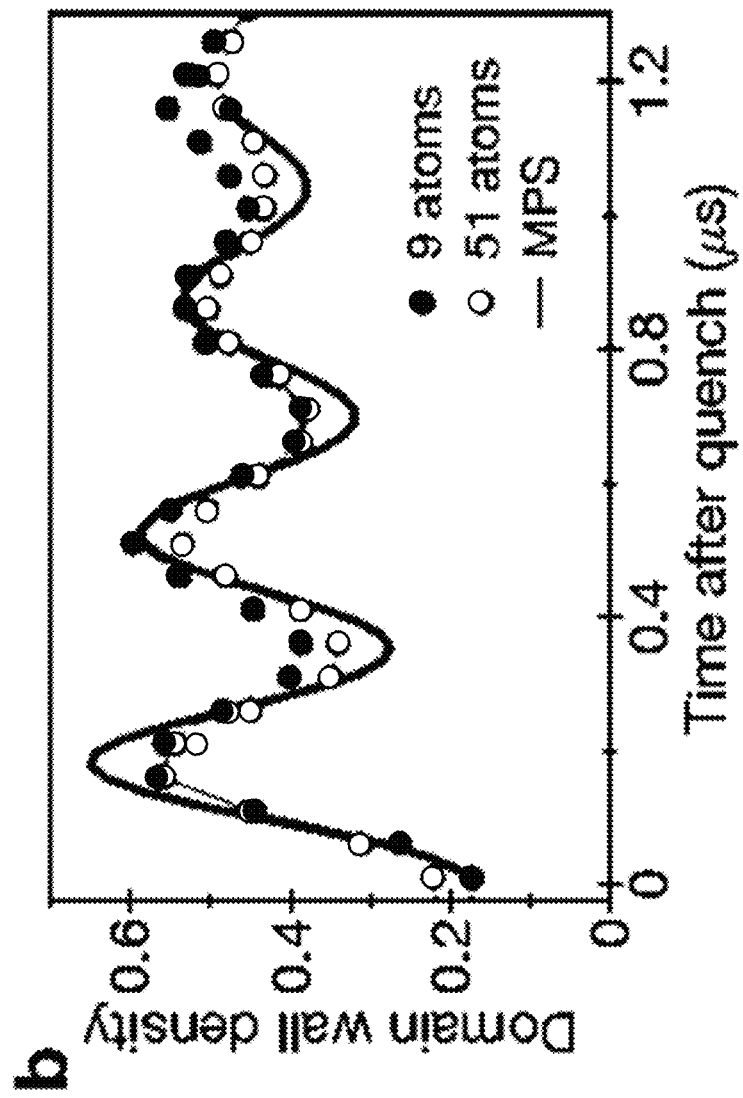

As shown in FIG. 6A, focusing on the quench dynamics of Rydberg crystals initially prepared deep in the $Z_2$ ordered phase, the detuning $\Delta(t)$ is suddenly changed to the single-atom resonance $\Delta=0$. After such a quench, oscillations of many-body states appear between the initial crystal and a complementary crystal where each internal atomic state is inverted. These oscillations are remarkably robust, persisting over several periods with a frequency that is largely independent of the system size for large arrays. This is confirmed by measuring the dynamics of the domain wall density, signaling the appearance and disappearance of the crystalline states, shown in FIG. 6B for arrays of 9 (solid dots) and 51 atoms (open dots). The initial crystal repeatedly revives with a period that is slower by a factor 1.4 compared to the Rabi oscillation period for independent, non-interacting atoms.

According to an embodiment, several important features result from the techniques described in the present disclosure. First, the $Z_2$ ordered state cannot be characterized by a simple thermal ensemble. More specifically, if an effective temperature is estimated based on the measured domain wall density, the corresponding thermal ensemble predicts correlation length $\xi_{th}=4.48(3)$, which is significantly longer than the measured value $\xi=3.03(6)$. Such a discrepancy is also reflected in distinct probability distributions for the number of domain walls (see FIG. 5c). These observations suggest that the system does not thermalize within the timescale of the $Z_2$ state preparation Second, the coherent and persistent oscillation of the crystalline order after the quantum quench. With respect to the quenched Hamiltonian ($\Delta=0$), the energy density of the $Z_2$ ordered state corresponds to that of an infinite temperature ensemble within the manifold constrained by Rydberg blockade. Also, the Hamiltonian does not have any explicit conserved quantities other than total energy. Nevertheless, the oscillations persist well beyond the natural timescale of local relaxation $\sim 1/\Omega$ as well as the fastest timescale, $1/V_{i,i+1}$.

Figure 6C:
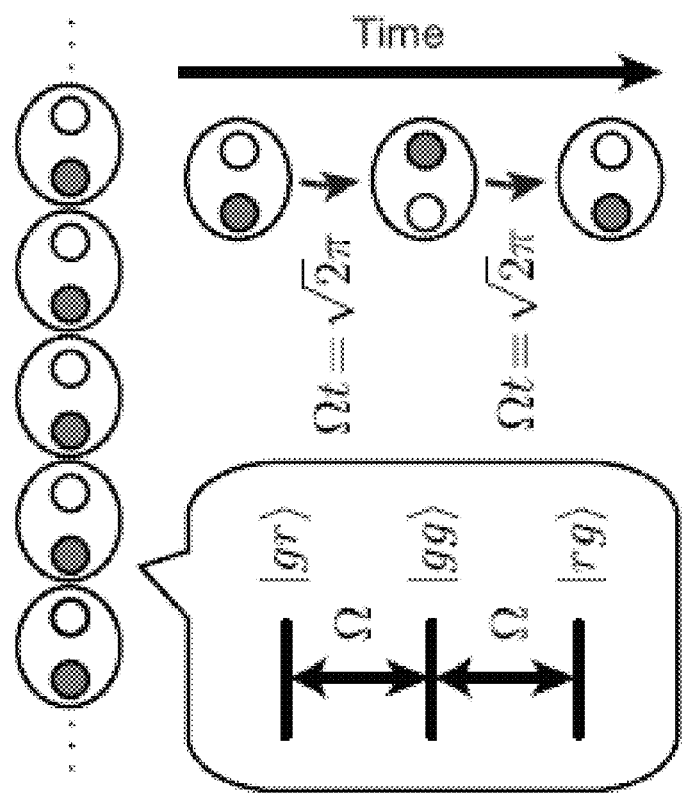
Figure 6D:
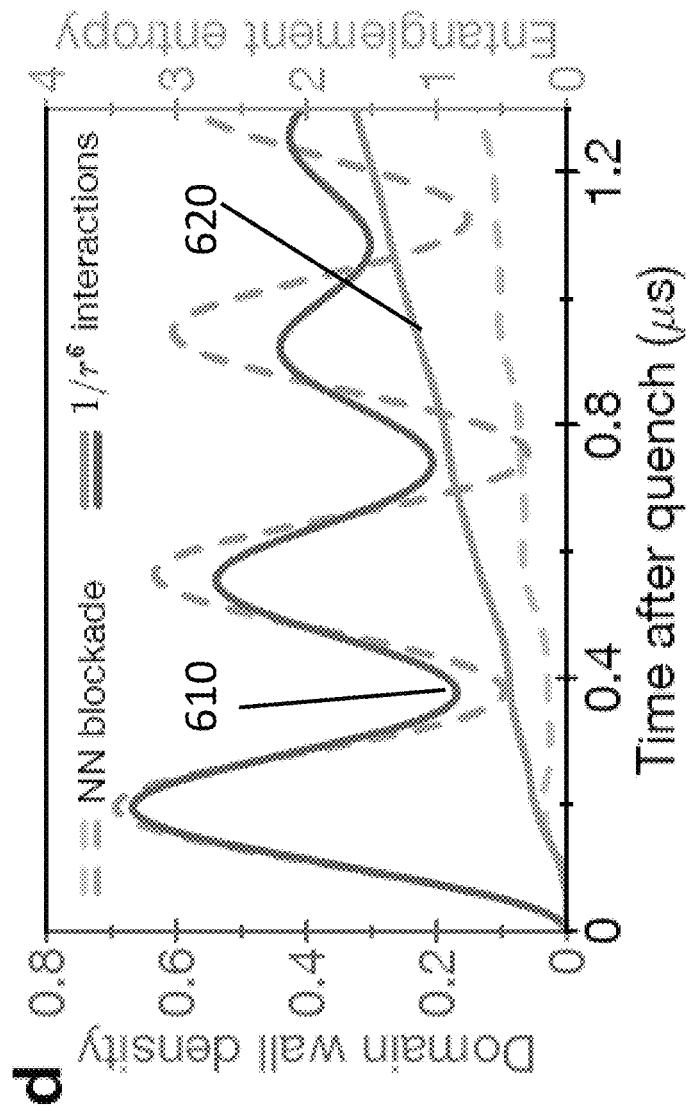

To understand these observations, consider a simplified model where the effect of long-range interactions are neglected and nearest-neighbor interactions are replaced by hard constraints on neighboring excitations of Rydberg states. In this limit, the qualitative behavior of the quenched dynamics can be understood in terms of dimerized spins (as shown in FIG. 6C); owing to the constraint, each dimer forms an effective spin-1 system with three states $|r,g\rangle$, $|gg\rangle$, and $|g\rangle$ where the resonant drive "rotates" the three states over the period $2(2\pi/\Omega)$, close to that observed experimentally. While this qualitative picture does not take into account the strong interactions (constraints) between neighboring dimers, it can be extended by considering a minimal variational ansatz for the many-body wave function based on matrix product state (MPS) that respects all Rydberg blockade constraints. Using time-dependent variational principle, analytical equations of motion may be derived and may obtain a crystalline order oscillation with frequency $\Omega/1.51$, which is within 10% of the experimental observations. These considerations may be supported by various numerical simulations. For example, an MPS simulation with large bond dimension predicts that the simplified model exhibits crystal oscillation over long time, while the entanglement entropy grows at a rate much smaller than $\Omega$, indicating that the oscillation persists over many cycles (FIG. 6D). However, the addition of long-range interactions leads to a faster decay of the oscillations, with a timescale that is determined by $1/V_{i,i+2}$, consistent with experimental observations, while the entanglement entropy also grows on this time scale.

Thus, the decay of crystal oscillation is limited by the effect of weak next-nearest-neighbor interactions. This slow thermalization is rather unexpected since our Hamiltonian, with or without long-range corrections, is far from any known integrable systems and features neither strong disorder nor explicitly conserved quantities. Instead, observations may be associated with constrained dynamics due to Rydberg blockade, resulting in large separations of timescales $V_{i,i+1} \gg \Omega V_{i,i+2}$. These give rise to so-called constrained dimer models, with Hilbert space dimension determined by Golden ratio $(1+5)^N/2^N$ and non-trivial dynamics.

According to an embodiment, the initial spacing between the atoms trapped in an array may be used in order to encode a problem, such as one governed by quantum mechanics. After adiabatic evolution of the system, the atoms may then be observed to determine a solution to the problem. The state of the atoms after evolution may be indicative of a solution to the problem.

Section 5.B: Examples—Solving Maximum Independent Set Optimization Problems Using Quantum Computers The methods and systems described above for arranging and controlling individually trapped neutral atoms and their Rydberg inter-actions may be used to solve a variety of different types of problems. For example, as described below, according to some embodiments, the systems and methods described above can be used to solve maximum independent set (MIS) optimization problems based on the quantum adiabatic principle. MIS optimization problems are challenging to solve using numerical techniques alone but can be more easily solved using quantum computing techniques. Thus, the above described systems and methods for quantum computing are well suited for finding solutions to the MIS optimization problems described below.

Adiabatic quantum computation is a new, general approach to solving combinatorial optimization problems. It consists of constructing a set of qubits and engineer a time-dependent Hamiltonian H(t) whose starting point H(0) has a ground state that can be easily prepared and whose final point H(T) has such a form that its eigenstates encode the solution to the optimization problem. The name "adiabatic" originates from the fact if H(t) is varied slowly enough, then the system will mostly stay in the ground state of the instantaneous Hamiltonian H(t) at all times t, such that at the final time t=T the system is found in the ground state of H(T), from which the solution to the optimization problem can be found. According to some embodiments, if the Hamiltonian is not changed slowly enough for a fully adiabatic evolution, the dynamics induced by the time dependent Hamiltonian may inject a finite energy into the system. As long as the cost function of the optimization problem is correctly encoded in the final Hamiltonian, and the evolution is slow enough that the injected energy is low, measuring the final state of the system gives a good approximate solution of the optimization problem. The working principle of this quantum adiabatic optimization (or approximation) is fundamentally different from known classical algorithms to find (or approximate) solutions to optimization problems and thus can lead to a quantum speedup (i.e., performing computations faster using quantum computers).

The maximum independent set problem (as discussed in more detail below) is a classical combinatorial optimization problem in graph theory. The task is to select a subset of vertices from a graph, such that none of them are not neighboring. In some embodiments, the challenge is to find such a subset that with the largest number of vertices. It is a well-studied problem in complexity theory and it is known to be NP-hard to approximate. When formulated as decision problem it is NP-complete (i.e., belonging both to NP (nondeterministic polynomial time) problems and NP-hard (problems that are at least as hard as NP problems) problems).

According to some embodiments, there are different variants of the maximum independent set problem. The embodiments discussed herein focus on problems where the class of graphs can be restricted to disc graphs for which optimization of the maximum independent set problem is desired. Unit disc graphs are a special case of geometric intersection graphs (i.e. graphs that represents the pattern of intersections of a family of sets), where only vertices that are located within a certain distance are considered neighboring. Optimization problems on such intersection graphs play an important role in a variety of applications, including, but not limited to problems arising in broadcast network design, map labelling, and determination of the optimal location for facilities. The maximum independent set problem on unit disk graphs is NP-complete. While but polynomial time approximation algorithms exist, fast algorithms that achieve good approximation ratios has not yet been achieved.

As discussed in more detail below a setup including individually trapped atoms can be used to implement quantum algorithms to solve the maximum independent set problem on unit disc graphs.

As described herein, the maximum independent set problem may include an undirected graph G=(V, E) with a set of vertices V and edges E. An independent set is a subset of vertices S⊆V such that no two vertices in S are connected by an edge. For examples of independent sets see FIGS. 11A-11B. FIG. 11A show two examples of graphs with different independent sets marked as combinations of empty and black circles. The maximum independent set in each case is depicted on the right. In other words, the maximum independent set is the largest independent set, i.e. the independent set with the largest number of vertices. Note: there is also the notion of a maximal independent set, which is an independent set to which one cannot add any other vertex without making it not independent. The maximum independent set is the largest of the maximal independent sets.

A generalization of the maximum independent set problem is the maximum-weight independent set problem. According to some embodiments, an undirected weighted graph G=(V, W, E) may be considered with a set of vertices V with associated weights W and edges E. The maximum-weight independent set is the independent set with the largest weight. The maximum independent set problem can be formulated as a decision problem: "Given a graph G, is there an independent set of size k?". This decision problem is NP-complete. It can also be formulated as an optimization problem: "Given a graph G, find the maximum size k of independent sets". Even approximate optimization is NP-hard (approximation of k, within a constant factor). Finding the maximum independent set is equivalent to finding the minimum vertex cover: these are dual problems. These principles extend to the maximum-weight independent set problems.

Figure 12:
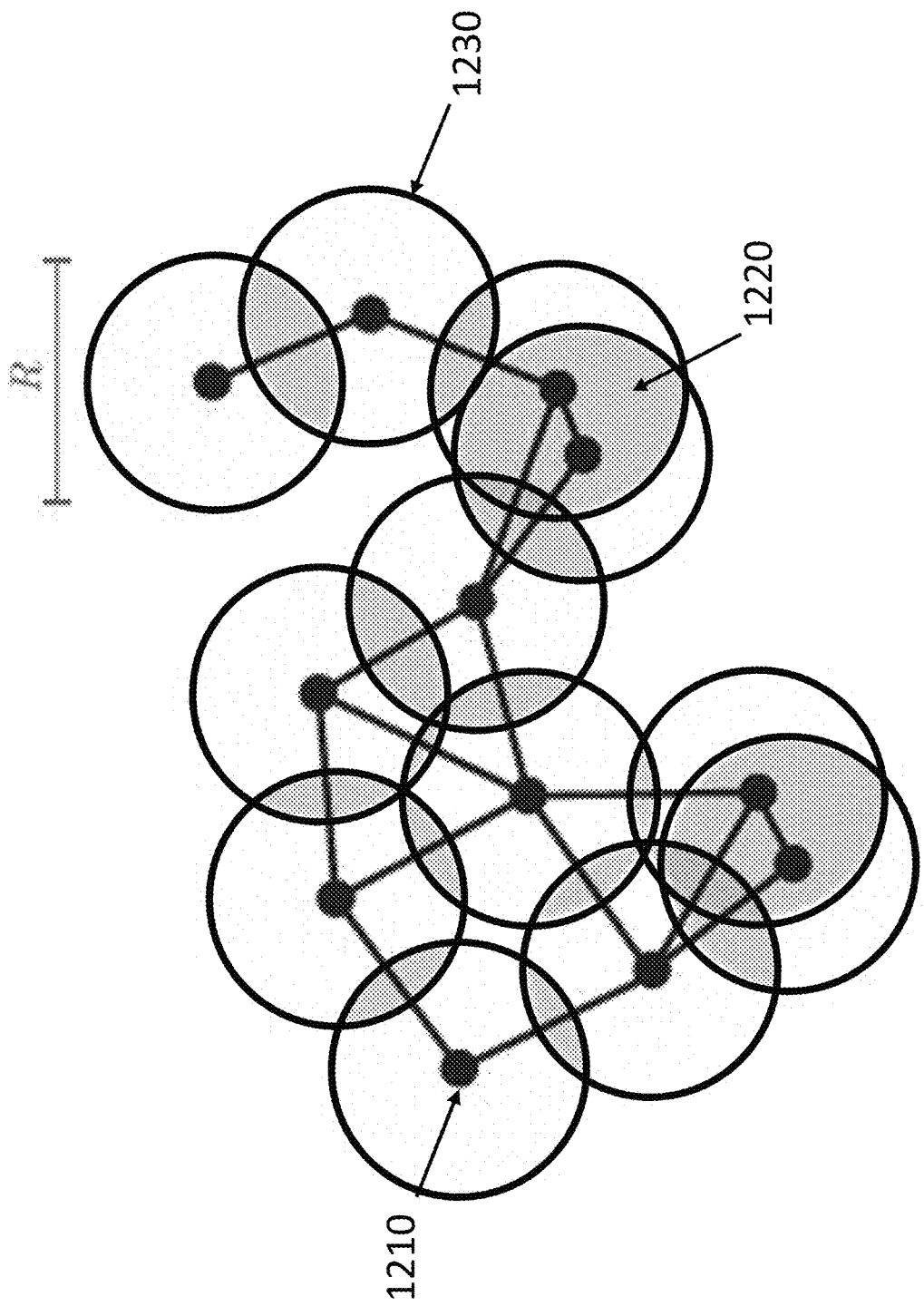
FIG. 12 shows an example of a unit disc graph, according to an embodiment.

A graph may be called a unit disc graph if only vertices that are within a unit distance R in an Euclidian space are connected by an edge. FIG. 12 shows an example of a unit disc graph. As shown in FIG. 2, every pair of vertices 1210 that is closer that a distance R is connected by an edge 1220. This is equivalent to drawing discs 1230 of radius R/2 around each vertex and connecting them if two discs overlap. Note that finding the maximum independent set of unit disc graphs is still NP-complete.

According to some embodiments, arrays of atoms may be arranged in order to solve problems such as those presented by unit disc graphs. According to some embodiments, Rydberg atoms may be used, in which the Rydberg implementation R plays the role of the blockade radius, which corresponds to the discs 1230. Such implementations are discussed in more detail below.

Given a graph, the maximum independent set can be found from the ground state of a classical Hamiltonian. To this end a classical Ising variable to may be assigned to each vertex, $n_v \in \{0, 1\}$. The Hamiltonian is shown below $$H = \sum_{v \in V} -\Delta n_v + \sum_{(u,w) \in E} U_{u,w} n_u n_w \quad (5)$$

with $U_{u,w} > \Delta > 0$. The configuration $\{n_v\}$ that minimizes H encodes the maximum independent set: all vertices that in the ground state have $n_v = 1$ form the maximum independent set. Note that the value of $U_{n,m}$ is not important as long as it is larger than $\Delta$.

Moreover note that (for $U_{n,m} \gg \Delta$) the lowest lying energy states encode different independent sets, and note further that the corresponding energy is directly related to the size of the independent set k as E=−kΔ.

To design a quantum adiabatic algorithm for MIS, the Hamiltonian can be promoted to an operator level including the addition of a term that couples different configurations of the Ising spin. For example, the Hamiltonian may be written as $$\hat{H}(t) = \sum_{v \in V} (-\Delta(t)\hat{n}_v + \Omega(t)\hat{\sigma}_v^x) + \sum_{(u,w) \in E} U_{u,w} \hat{n}_u \hat{n}_w \quad (6)$$

Instead of classical Ising spins, there are now qubits with states $|0\rangle$ and $|1\rangle$ such that $\hat{n}|x\rangle = x|x\rangle$, $(x \in \{0,1\})$, and $\sigma^x = |0\rangle\langle 1| + |1\rangle\langle 0|$. An adiabatic algorithm can be thus obtained by initializing all qubits at time t=0 in $|0\rangle$ and then evolving the system under the time dependent Hamiltonian H(t) for a time T with parameters chosen such that $\Delta(0) < 0$, $\Delta(T) > 0$, $\Omega(0) = \Omega(T) = 0$ and $\Omega(0 < t < T) > 0$. As a specific example consider $\Delta(t) = (2t/T-1)\tilde{\Delta}$ with $\tilde{\Delta} > 0$, $\Omega(t) = \tilde{\Omega} \sin^2(\pi t/T)$. Note that this is immediately generalized to the maximum-weight independent set problem by making the parameter $\Delta(t)$ different for each vertex.

According to some embodiments, the system and method of arranging and manipulating individual atoms described in more detail above may be used to encode and evolve such problems. For example, a set of individually positioned optical tweezers as discussed in more detail above may be used to each trap a single atom with a ground state $|0\rangle$ and Rydberg state $|1\rangle$. The atoms can be coherently driven with Rabi frequency $\Omega(t)$ coupling the ground state to the Rydberg state. The frequency of the driving field can be changed time dependently, giving rise to a time dependent detuning $\Delta(t)$. This driving can be either global, or alternatively each atom can be individually driven with a particular field at particular times. If two atoms u and v are in a Rydberg state they interact, shifting the energy of this configuration by an amount $W_{u,v}$ which depends on the geometric distance $d_{u,v} = |\vec{x}_u - \vec{x}_v|$ between the two trap locations, e.g. $W_{u,v} = C/d_{u,v}^6$. The Hamiltonian describing the dynamics of this array for trapped atoms is thus:

$$\hat{H}(t) = \sum_{v \in V} (-\Delta(t)\hat{n}_v + \Omega(t)\hat{\sigma}_v^x) + \sum_{(u,w) \in V} W_{u,w} \hat{n}_u \hat{n}_w \quad (7)$$

For two atoms that are trapped in close proximity it is energetically extremely costly to simultaneously populate the Rydberg state.

Since the unit disc graph has a geometric interpretation, the traps may be arranged according to the arrangement of the vertices in the unit disc graph. The unit of length is chosen such that the Rydberg blockade radius corresponds to the unit distance in the graph, that is such that $$W_{u,v} \gg \Delta(T), \text{ if } d_{u,v} < R \quad (8)$$

$$W_{u,v} \gg \Delta(T), \text{ if } d_{u,v} > R \quad (9)$$

The quantum optimization algorithm can be implemented experimentally by slowly changing the parameters $\Omega(t)$ and $\Delta(t)$, and measuring at the end which atoms are in the Rydberg state. If the evolution is slow enough, this will be the maximum independent set. If the evolution is not perfectly adiabatic but the injected energy is low, the final state will in general be a superposition of "independent set states", that is configurations with atoms in the Rydberg state if they are not within the Blockade radius. The larger the time T, the better the approximation ratio that the protocol can achieve will be.

The above-described method of encoding MIS problems neglects interactions that are smaller than the blockade interaction. If the long tail interactions are included, a geometric arrangement of the traps may be chosen such that all traps v are defined by $0<\Delta+\delta_v<W_{v,w}$ $\forall w|(v, w)\in E$, where $\delta_v = \Sigma_{u|(u,v)\in E} W_{v,u}$ is the largest possible energy shift that can arise for an atom in the Rydberg state at vertex v due to interactions outside the Blockade radius. Thus as long as $\delta_v$ is small (i.e. interactions between atoms outside the blockade Radius can be neglected), the quantum algorithm gives (or approximates) solutions to the maximum independent set problem.

Figures 13A, 13B:
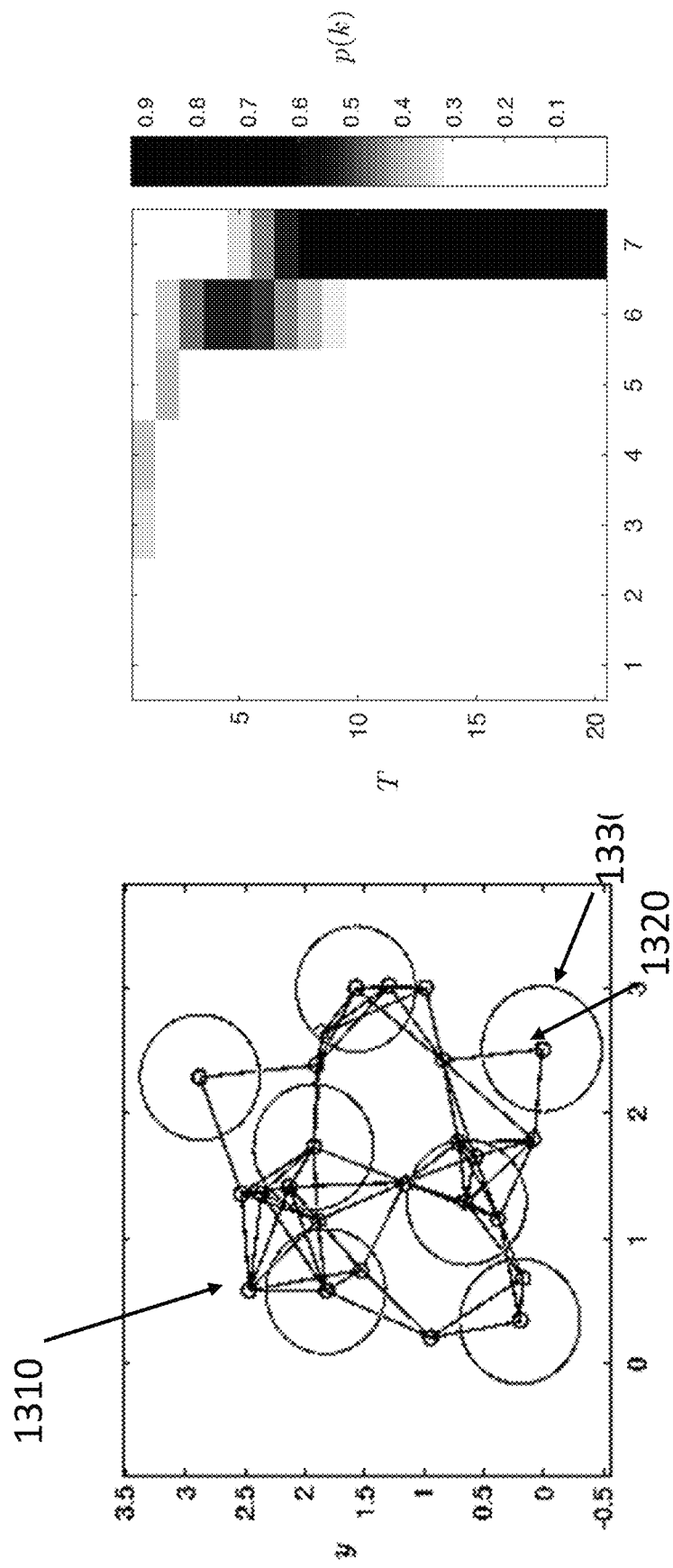
FIGS. 13A-B show an example of a unit disc graph indicating the maximum independent set the probability distribution of finding an independent set, according to some embodiments.

FIG. 13A shows an example of a unit disc graph and indicates the maximum independent set. As shown in FIG. 13A, a unit disc graph has 25 vertices (small circles 1310) and vertex density of 2.7. The vertices 1320 at the center of the larger circles 1330 consist of a maximum independent set (there is more than one). The larger circles 1330 indicate the blockade radius. FIG. 13B shows the probability distribution of finding an independent set of size k when the quantum algorithm is run for a time T. The longer time T, the higher the probability that the algorithm reveals a large (or even the maximum) independent set. The probability distribution of the size of the independent set was found by the adiabatic algorithm after an evolution under Hamiltonian 2 with a time T. Here units are such that $\tilde{\Delta}=7.5$ and $\tilde{\Omega}=1$. Already for a time T~5 the probability to find the global optimum is substantial.

The techniques described in the present disclosure can also include a number of variations or applications. For example, coherence properties of atoms can be improved by increasing intermediate state detuning to further suppress spontaneous emission and by Raman sideband cooling atomic motion to the ground state to eliminate the residual Doppler shifts. Individual qubit rotations around the z-axis can be implemented using light shifts associated with trap light, while a second AOD can be used for individual control of coherent rotations around other directions. Further improvement in coherence and controllability can be obtained by encoding qubits into hyperfine sublevels of the electronic ground state and using state-selective Rydberg excitation. Implementing two-dimensional (2d) may be implemented to make thousands of traps. Such 2d configurations may be implemented by directly using a 2d-AOD or by creating a static 2d lattice of traps and sorting atoms with an independent AOD.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The techniques and systems disclosed herein, such as particular AODs or laser systems, may controlled, for example, by using a computer program product for use with a network, computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a network, computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

In the foregoing description, certain steps or processes can be performed on particular servers or as part of a particular engine. These descriptions are merely illustrative, as the specific steps can be performed on various hardware devices, including, but not limited to, server systems and/or mobile devices. Alternatively or in addition, any or all of the steps described herein can be performed on a virtualized machine that runs on a physical server itself. Similarly, the division of where the particular steps are performed can vary, it being understood that no division or a different division is within the scope of the invention. Moreover, the use of "module" and/or other terms used to describe computer system processing is intended to be interchangeable and to represent logic or circuitry in which the functionality can be executed.

The invention claimed is:

1. A method comprising:
    selectively arranging a plurality of atomic qubits into a spatial structure to encode a quantum computing problem, the spatial structure comprising a plurality of vertex qubits, wherein each vertex qubit corresponds to a vertex in the quantum computing problem, and wherein spatial proximity of the plurality of atomic qubits represents edges in the quantum computing problem;
    initializing the plurality of atomic qubits into an initial state;
    driving the plurality of atomic qubits into a final state by applying a sequence of resonant light pulses to at least some of the plurality of atomic qubits, wherein the final state comprises a solution to the quantum computing problem; and
    measuring at least some of the plurality of atomic qubits in the final state.

2. The method of claim 1, wherein the resonant light pulses have a variable detuning.

3. The method of claim 1, wherein the resonant light pulses have a variable Rabi frequency.

4. The method of claim 1, wherein the spatial structure comprises a one-dimensional or a two-dimensional array of qubits.

5. The method of claim 1, wherein the encoded quantum computing problem comprises one or more of an unweighted maximum independent set problem, a maximum-weight independent set problem, a maximum clique problem, and a minimum vertex cover problem.

6. The method of claim 5, wherein weights in the maximum-weight independent set problem are encoded by applying a different detuning for each vertex qubit.

7. The method of claim 5, wherein the final state of the plurality of atomic qubits comprises one or more of a solution to the encoded unweighted maximum independent set problem, a solution to the encoded maximum-weight independent set problem, a solution to the encoded maximum clique problem, and a solution to the encoded minimum vertex cover.

8. The method of claim 1, wherein the solution to the quantum computing problem comprises an approximate solution to the quantum computing problem.

* * * * *